US012764728B2

(12) United States Patent
Hu et al.

(10) Patent No.: US 12,764,728 B2
(45) **Date of Patent: *Oct. 13, 2026**

(54) RESOURCE UNIT INDICATION METHOD, ACCESS POINT, AND STATION

(71) Applicant: HUAWEI TECHNOLOGIES CO., LTD., Shenzhen (CN)

(72) Inventors: Mengshi Hu, Shenzhen (CN); Jian Yu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

This patent is subject to a terminal disclaimer.

(21) Appl. No.: 18/607,855

(22) Filed: Mar. 18, 2024

(65) Prior Publication Data

US 2024/0306134 A1 Sep. 12, 2024

Related U.S. Application Data

(63) Continuation of application No. 18/178,136, filed on Mar. 3, 2023, now Pat. No. 12,004,140, which is a (Continued)

(30) Foreign Application Priority Data

Sep. 4, 2020 (CN) ......................... 202010923701.8
Dec. 2, 2020 (CN) ......................... 202011395419.3
Jan. 5, 2021 (CN) ......................... 202110009966.1

(51) Int. Cl.
*H04W 84/12* (2009.01)
*H04W 72/0453* (2023.01)

(52) U.S. Cl.
CPC ........ *H04W 72/0453* (2013.01); *H04W 84/12* (2013.01)

(58) Field of Classification Search
CPC ............... H04L 5/0007; H04L 5/0044; H04W 72/0453; H04W 84/12
(Continued)

(56) References Cited

U.S. PATENT DOCUMENTS 10,201,009 B1 2/2019 Wang et al.
11,438,968 B2 9/2022 Chen et al.
(Continued)

FOREIGN PATENT DOCUMENTS

CN 107509252 A 12/2017
CN 108781445 A 11/2018
(Continued)

OTHER PUBLICATIONS

Jang et al., "Discussion on EHT Trigger based UL MU," IEEE 802.11-20/0413r0, Mar. 16, 2020, 13 pages.
(Continued)

*Primary Examiner* — John Pezzlo
(74) *Attorney, Agent, or Firm* — Fish & Richardson P.C.

(57) ABSTRACT

This application provides a resource unit indication method, an access point, and a station. In the method, a resource unit allocation subfield in a trigger frame includes a frequency band range indication and a resource unit indication. The resource unit indication is used to indicate an MRU allocated to a station. The frequency band range indication is used to indicate a frequency band range in which an RU in the MRU is located. For example, the frequency band range indication is used to indicate 80 MHz in which a smallest RU in the MRU is located. In this way, the frequency band range indication indicates a frequency band range related to the MRU, and can further carry more information, for example, the frequency band range in which the smallest RU is located. It may be learned that this application may be applied to 802.11ax, 802.11be, and a future Wi-Fi system.

20 Claims, 20 Drawing Sheets

Related U.S. Application Data continuation of application No. PCT/CN2021/116559, filed on Sep. 3, 2021.

(58) Field of Classification Search
USPC .................................. 370/252, 329, 338, 430
See application file for complete search history.

(56) References Cited

U.S. PATENT DOCUMENTS

| | | | |
|---|---|---|---|
| 2016/0353414 A1 | 12/2016 | Choi et al. | |
| 2016/0360443 A1 | 12/2016 | Hedayat | |
| 2017/0041928 A1 | 2/2017 | Park et al. | |
| 2017/0070914 A1 | 3/2017 | Chun et al. | |
| 2017/0325202 A1 | 11/2017 | Verma et al. | |
| 2017/0339673 A1* | 11/2017 | Choi | H04W 84/12 |
| 2018/0184402 A1 | 6/2018 | Cariou et al. | |
| 2018/0205441 A1 | 7/2018 | Asterjadhi et al. | |
| 2018/0324685 A1 | 11/2018 | Patil et al. | |
| 2019/0053275 A1 | 2/2019 | Lanante et al. | |
| 2019/0124556 A1 | 4/2019 | Verma et al. | |
| 2019/0238288 A1 | 8/2019 | Liu et al. | |
| 2019/0260531 A1 | 8/2019 | Chen et al. | |
| 2019/0380117 A1 | 12/2019 | Verma et al. | |
| 2021/0258806 A1 | 8/2021 | Stacey et al. | |
| 2021/0314922 A1 | 10/2021 | Lim et al. | |
| 2021/0360628 A1* | 11/2021 | Kim | H04L 5/0005 |
| 2021/0392661 A1* | 12/2021 | Cao | H04W 72/0453 |
| 2023/0016370 A1 | 1/2023 | Kim et al. | |

FOREIGN PATENT DOCUMENTS

| | | | |
|---|---|---|---|
| CN | 110730050 | A | 1/2020 |
| CN | 110768757 | A | 2/2020 |
| CN | 110859007 | A | 3/2020 |
| JP | 2020074538 | | 5/2020 |
| JP | 2023539906 | A | 9/2023 |
| KR | 20180088470 | A | 8/2018 |
| WO | 2019079592 | A1 | 4/2019 |
| WO | 2019240416 | A1 | 12/2019 |
| WO | 2020013594 | A1 | 1/2020 |
| WO | 2020019928 | A1 | 1/2020 |
| WO | 2020027847 | A1 | 2/2020 |

OTHER PUBLICATIONS

Hu et al., "Multi-RU Indication in Trigger Frame," IEEE 802.11-20/0416r0, Mar. 12, 2020, 14 pages.

Au, "Compendium of straw polls and potential changes to the Specification Framework Document," IEEE P802.11-20/0566r54, Aug. 9, 2020, 154 pages.

Kim et al., "RU Allocation Subfield Design for EHT Trigger Frame," IEEE 802.11-20/0828r0, May 26, 2020, 24 pages.

IEEE P802.11ax/D6.0, "Draft Standard for Information technology—Tele-communications and information exchange between systems Local and metropolitan area networks- Specific requirements, Part 11: Wireless LAN Medium Access Control (MAC) and Physical Layer (PHY) Specifications," Nov. 2019, 780 pages.

IEEE Std 802.Nov. 2016, "IEEE Standard for Information technology—Telecommunications and information exchange between systems Local and metropolitan area networks-Specific requirements, Part 11: Wireless LAN Medium Access Control (MAC) and Physical Layer (PHY) Specifications," Dec. 7, 2016, 3534 pages.

International Search Report and Written Opinion in International Appln. No. PCT/CN2021/116559, mailed on Nov. 25, 2021, 15 pages (with English translation).

International Search Report and Written Opinion in International Appln. No. PCT/CN2021/116560, mailed on Oct. 26, 2021, 14 pages (with English translation).

Extended European Search Report in European Appln No. 21863716.3, dated Dec. 14, 2023, 9 pages.

Extended European Search Report in European Appln No. 21863717.1, dated Dec. 7, 2023, 9 pages.

Zhao et al., Research on Handoff Technologies for IEEE 802.11 Wireless LANs, Computer Technology and Development, Oct. 2018, 28(10):1-7, 21 pages (with English translation).

Deng et al., "IEEE 802.11be Wi-Fi 7: New Challenges and Opportunities," IEEE Communications Surveys and Tutorials, Jul. 29, 2020, 22(4):31 pages.

Notice of Allowance in U.S. Appl. No. 18/178,168, mailed on May 19, 2025, 37 pages.

Office Action in Korean Appin. No. 2023-7011255, mailed on Jun. 10, 2025, 11 pages (with English translation).

Gan et al., "Backward compatible EHT trigger frame," IEEE, 802.11-20/0840-00-00be, Jun. 2020, 16 pages.

Office Action in Korean Appln. No. 10-2023-7011255, mailed on Feb. 5, 2026, 6 pages (with English translation).

Hu et al., "Multi-RU Indication in Trigger Frame," IEEE, Mar. 2020, doc.: IEEE 802.11-20/0416r0, 14 pages.

Kim et al., "RU Allocation Subfield Design for EHT Trigger Frame," IEEE, May 2020, doc.: IEEE 802.11-20/0828r0, 24 pages.

Office Action in Japanese Appln. No. 2023-514871, mailed on Apr. 9, 2024, 16 pages (with English translation).

Office Action in Japanese Appln. No. 2025-064386, mailed on Jun. 23, 2026, 11 pages (with English translation).

* cited by examiner

Part of a schematic diagram of a (242+484+996)-tone RU in 160 MHz

RESOURCE UNIT INDICATION METHOD, ACCESS POINT, AND STATION

CROSS-REFERENCE TO RELATED APPLICATIONS

This application is a continuation of U.S. patent application Ser. No. 18/178,136, filed on Mar. 3, 2023, which is a continuation of International Application No. PCT/CN2021/116559, filed on Sep. 3, 2021, which claims priority to Chinese Patent Application No. 202010923701.8, filed on Sep. 4, 2020, and Chinese Patent Application No. 202011395419.3, filed on Dec. 2, 2020, and Chinese Patent Application No. 202110009966.1, filed on Jan. 5, 2021. All of the afore-mentioned patent applications are hereby incorporated by reference in their entireties.

TECHNICAL FIELD

This application relates to the field of communication technologies, and in particular, to a resource unit indication method, an access point, and a station.

BACKGROUND

In a conventional wireless local area network (Wireless Local Area Network, WLAN), when needing to send uplink data, a non-access point station (non-access point station, non-AP STA) occupies an entire channel for data transmission through contention, which greatly reduces frequency utilization efficiency. To improve this situation, a radio channel is divided into a plurality of subchannels (subcarriers) in frequency domain to form a resource unit (resource unit, RU), and user data is carried on some resource units instead of occupying the entire channel. In this way, a plurality of users may simultaneously perform transmission in parallel in each time period, do not need to queue and contend with each other, thereby improving frequency utilization efficiency.

In a downlink, an access point (access point, AP) may determine RU allocation based on a priority of downlink data of each non-access point station. However, in an uplink, the AP needs to notify a terminal device of an allocated resource unit by using a trigger frame. The trigger frame includes a plurality of user information fields. One user information field includes information that needs to be read by one station. For example, M user information fields are information that needs to be respectively read by a non-access point station 1 to a non-access point station M. A resource unit allocation subfield in the user information field is used to indicate a resource unit allocated to the non-access point station. The non-access point station then may send a data packet on the allocated resource unit. However, some non-access point stations need to send a relatively large amount of data, and a relatively large number of resource units need to be allocated. Therefore, how to allocate a plurality of resource units to the corresponding non-access point station by using the resource unit allocation subfield is a problem that needs to be urgently resolved.

SUMMARY

Embodiments of this application provide a resource unit indication method, an access point, and a station, to allocate a plurality of resource units to a corresponding non-access point station.

According to a first aspect, this application provides a resource unit indication method. In the method, a station receives a trigger frame from an access point, where the trigger frame includes a resource unit allocation subfield used to indicate to allocate a resource to the station, the resource unit allocation subfield includes a frequency band range indication and a resource unit indication, the resource unit indication is used to indicate a multi-resource unit MRU allocated to the station, and the frequency band range indication is used to indicate a frequency band range in which a smallest resource unit RU in the MRU is located; and then the station may determine the allocated MRU based on the resource unit indication and the frequency band range indication.

It may be learned that in the method, the MRU can be allocated to the station, so that the MRU is more flexibly allocated, to help improve frequency band utilization. In addition, the frequency band range indicated by the frequency band range indication is the frequency band range in which the smallest RU in the MRU is located. In comparison with a case in which the frequency band range indication indicates only a lowest frequency band range related to the MRU, the frequency band range indication in this application carries more information, to help reduce the number of indexes required for the resource unit indication to indicate each MRU.

In an implementation, in the resource unit indication method, the frequency band range indication is used to indicate 80 MHz in which the smallest RU in the MRU is located. In other words, a granularity of the frequency band range in which the smallest RU in the MRU is located and that is indicated by the frequency band range indication is 80 MHz. In this implementation, a location of the 80 MHz in which the smallest RU in the MRU is located may be learned of from the frequency band range indication. In this way, the resource unit indication may indicate the corresponding MRU under this condition. For a same number of MRUs, the number of indexes required for the resource unit indication is reduced.

In another implementation, in the resource unit indication method, the frequency band range indication is used to indicate 40 MHz in which the smallest RU in the MRU is located. In other words, a granularity of the frequency band range in which the smallest RU in the MRU is located and that is indicated by the frequency band range indication is 40 MHz. In this implementation, a location of the 40 MHz in which the smallest RU in the MRU is located may be learned of from the frequency band range indication. In this way, the resource unit indication may indicate the corresponding MRU under this condition. For a same number of MRUs, the number of indexes required for the resource unit indication is reduced.

If the smallest RU in the MRU is an RU (996-tone RU) including 996 subcarriers, the 40 MHz indicated by the frequency band range indication may be one of two 40 MHz frequency band ranges covered by the 996-tone RU, or is predefined to be lowest 40 MHz in two 40 MHz frequency band ranges covered by the 996-tone RU or highest 40 MHz in two 40 MHz frequency band ranges covered by the 996-tone RU.

In addition, if there are a plurality of smallest RUs in the MRU, the frequency band range indication may indicate a frequency band range in which one of the smallest RUs is located.

In still another implementation, the frequency band range indication is used to indicate 160 MHz in which the smallest RU in the MRU is located. In still another implementation, the frequency band range indication is used to indicate 240 MHz in which the smallest RU in the MRU is located. In still another implementation, the frequency band range indication is used to indicate 320 MHz in which the smallest RU in the MRU is located.

In this specification, the frequency band range indicated by the frequency band range indication is actually a specific frequency band range in a bandwidth or a location of the frequency band range in a bandwidth. For example, the 80 MHz indicated by the frequency band range indication is actually 80 MHz in the bandwidth or a location of the 80 MHz in the bandwidth.

In this application, the MRU may include but is not limited to the following several items.

The MRU indicated by the resource unit indication includes one resource unit (26-tone RU) whose size is 26 subcarriers and one resource unit (52-tone RU) whose size is 52 subcarriers, and the frequency band range indicated by the frequency band range indication is a frequency band range in which the 26-tone RU is located; or

- the MRU indicated by the resource unit indication includes one RU (106-tone RU) whose size is 106 subcarriers and one 26-tone RU, and the frequency band range indicated by the frequency band range indication is a frequency band range in which the 26-tone RU is located; or
- the MRU indicated by the resource unit indication includes one resource unit (484-tone RU) whose size is 484 subcarriers and one resource unit (242-tone RU) whose size is 242 subcarriers, and the frequency band range indicated by the frequency band range indication is a frequency band range in which the 242-tone RU is located; or
- the MRU indicated by the resource unit indication includes one resource unit (996-tone RU) whose size is 996 subcarriers and one 484-tone RU, and the frequency band range indicated by the frequency band range indication is a frequency band range in which the 484-tone RU is located; or
- the MRU indicated by the resource unit indication includes two 996-tone RUs and one 484-tone RU, and the frequency band range indicated by the frequency band range indication is a frequency band range in which the 484-tone RU is located; or
- the MRU indicated by the resource unit indication includes three 996-tone RUs, and the frequency band range indicated by the frequency band range indication is a frequency band range in which one of the 996-tone RUs is located; or
- the MRU indicated by the resource unit indication includes three 996-tone RUs and one 484-tone RU, and the frequency band range indicated by the frequency band range indication is a frequency band range in which the 484-tone RU is located; or
- the MRU indicated by the resource unit indication includes one 996-tone RU, one 484-tone RU, and one 242-tone RU, and the frequency band range indicated by the frequency band range indication is a frequency band range in which the 242-tone RU is located.

For a (3*996+484)-tone RU, in the resource unit indication method in this aspect, the frequency band range indicated by the frequency band range indication is 80 MHz in which a 484-tone RU is located, and only two indexes are required for the (3*996+484)-tone RU indicated by the resource unit indication to indicate a location of the 484-tone RU in the 80 MHz, to notify the station of the allocated (3*996+484)-tone RU; or the frequency band range indicated by the frequency band range indication is 40 MHz in which a 484-tone RU is located, and only one index is required for the (3*996+484)-tone RU indicated by the resource unit indication to notify the station of the allocated (3*996+484)-tone RU. However, in a resource unit indication method in which the frequency band range indicated by the frequency band range indication is lowest 80 MHz related to the (3*996+484)-tone RU, the resource unit indication further needs to separately indicate eight indexes, to notify the station of the allocated (3*996+484)-tone RU. Therefore, the resource unit indication method in this aspect helps reduce the number of indexes required for the resource unit indication.

According to a second aspect, this application further provides a resource unit indication method. The resource unit indication method corresponds to the resource unit indication method in the first aspect, and is described from a perspective of an access point. In the method, the access point determines a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range in which a smallest resource unit RU in the MRU is located; and the access point sends the trigger frame.

It may be learned that in the method, the MRU can be allocated to the station, so that the MRU is more flexibly allocated, to help improve frequency band utilization. In addition, when the access point needs to allocate the MRU to the station, the frequency band range indication may be used to indicate the frequency band range in which the smallest RU in the MRU is located, and then an index that needs to be indicated by the resource unit indication is determined under this condition. In comparison with a case in which the frequency band range indication indicates only a lowest frequency band range related to the MRU, the frequency band range indication in this application carries more information, for example, the frequency band range in which the smallest RU is located, to help reduce the number of indexes required for the resource unit indication to indicate each MRU.

For another related implementation of the resource unit indication method, refer to the related implementation in the first aspect. Details are not described herein.

According to a third aspect, this application further provides a resource unit indication method. The method may include: A station receives a trigger frame, where the trigger frame includes a resource unit allocation subfield used to indicate to allocate a resource to the station, the resource unit allocation subfield includes a frequency band range indication and a resource unit indication, the resource unit indication is used to indicate a multi-resource unit MRU allocated to the station, and the frequency band range indication is used to indicate a frequency band range in which the MRU is located; and the station determines the allocated MRU based on the frequency band range indication and the resource unit indication.

It may be learned that in the method, the MRU can be allocated to the station, so that the MRU is more flexibly allocated, to help improve frequency band utilization.

In addition, when determining the allocated RU/MRU based on the frequency band range indication and the resource unit indication, the station may determine a size of the allocated MRU based on the resource unit indication, determine, based on the frequency band range indication, the frequency band range in which the RU/MRU is located, and then determine, in the frequency band range, the RU/MRU corresponding to an index indicated by the resource unit indication. It may be learned that in the method, the resource unit indication may need to indicate only the RU/MRU in the frequency band range, and therefore the number of indexes that need to be indicated by the resource unit indication to indicate MRUs of this size is reduced. In other words, in the method, the frequency band range indication may carry more information, and logic of the resource unit indication is simplified as much as possible, to help reduce processing complexity of the station.

In the resource unit indication method, the MRU that may be allocated to the station includes but is not limited to the following several items: an MRU (denoted as a (52+26)-tone RU) including one resource unit (26-tone RU) whose size is 26 subcarriers and one resource unit (52-tone RU) whose size is 52 subcarriers; an MRU (denoted as a (106+26)-tone RU) including one RU (106-tone RU) whose size is 106 subcarriers and one 26-tone RU; an MRU (denoted as a (484+242)-tone RU) including one resource unit (484-tone RU) whose size is 484 subcarriers and one resource unit whose size is 242 subcarriers; an MRU (denoted as a (996+484)-tone RU) including one resource unit (996-tone RU) whose size is 996 subcarriers and one 484-tone RU; an MRU (denoted as a (2*996+484)-tone RU) including two 996-tone RUs and one 484-tone RU; an MRU (denoted as a 3*996-tone RU) including three 996-tone RUs; an MRU (denoted as a (3*996+484)-tone RU) including three 996-tone RUs and one 484-tone RU; or an MRU (denoted as a (996+484+242)-tone RU) including one 996-tone RU, one 484-tone RU, and one 242-tone RU.

In the resource unit indication method, when the frequency band range in which the MRU indicated by the resource unit indication is located is less than or equal to 80 MHz, the frequency band range indicated by the frequency band range indication is 80 MHz in a bandwidth; or when the frequency band range in which the MRU indicated by the resource unit indication is located is greater than 80 MHz and less than or equal to 160 MHz, the frequency band range indicated by the frequency band range indication is 160 MHz in a bandwidth; or when the frequency band range in which the MRU indicated by the resource unit indication is located is greater than 160 MHz and less than or equal to 240 MHZ, the frequency band range indicated by the frequency band range indication is 240 MHz or 320 MHz in a bandwidth; or when the frequency band range in which the MRU indicated by the resource unit indication is located is greater than 240 MHz and less than or equal to 320 MHz, the frequency band range indicated by the frequency band range indication is 320 MHz in a bandwidth.

In an implementation, the resource unit allocation subfield occupies 9 bits, the frequency band range indication occupies a bit 0 and a bit 1 in the 9 bits, and the resource unit indication occupies a bit 2 to a bit 8.

In an implementation, if the bandwidth is 320 MHz, and if the frequency band range indicated by the frequency band range indication is 80 MHz in the 320 MHz, four states represented by the bit 0 and the bit 1 may be used for the frequency band range indication, to respectively indicate four 80 MHz frequency band ranges in the 320 MHz. If the frequency band range indicated by the frequency band range indication is lowest 160 MHz or highest 160 MHz in the 320 MHz, two states represented by the bit 0 or the bit 1 may be used for the frequency band range indication, to respectively indicate the two 160 MHz frequency band ranges in the 320 MHz. If the frequency band range indicated by the frequency band range indication is 320 MHz, a state represented by the bit 0 or the bit 1 may not be limited for the frequency band range indication, to indicate the 320 MHz.

In another implementation, if the frequency band range indicated by the frequency band range indication is lowest 240 MHz or highest 240 MHz in the 320 MHz, two states represented by the bit 0 or the bit 1 may be used for the frequency band range indication, to respectively indicate the two 240 MHz frequency band ranges in the 320 MHz.

According to a fourth aspect, this application further provides a resource unit indication method. The method corresponds to the resource unit indication method in the third aspect, and is described from a perspective of an access point. The resource unit indication method in this aspect includes: The access point determines a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range in which the MRU is located; and the access point sends the trigger frame.

It may be learned that in the method, the MRU can be allocated to the station, so that the MRU is more flexibly allocated, to help improve frequency band utilization.

In addition, when allocating the MRU to the corresponding station, the access point may indicate, by using the frequency band range indication, the frequency band range in which the MRU is located, and then determine, in the frequency band range, an index that needs to be indicated by the resource unit indication, to notify the station of the allocated MRU. It may be learned that in the method, the resource unit indication may need to indicate only the RU/MRU in the frequency band range, and therefore the number of indexes that need to be indicated by the resource unit indication to indicate MRUs of this size is reduced. In other words, in the method, the frequency band range indication may carry more information, and indication logic of the frequency band range indication and the resource unit indication is further simplified as much as possible, to help reduce processing complexity of the station.

For another related implementation of the resource unit indication method, refer to the related implementation in the third aspect. Details are not described herein.

According to a fifth aspect, this application further provides a resource unit indication method. In the method, a station receives a trigger frame from an access point, where the trigger frame includes a resource unit allocation subfield used to indicate to allocate a resource to the station, the resource unit allocation subfield includes a frequency band range indication and a resource unit indication, the resource unit indication is used to indicate a multi-resource unit MRU allocated to the station, and the frequency band range indication is used to indicate a frequency band range, in a bandwidth, in which some or all of resource units RUs other than the MRU are located; and the station determines the allocated MRU based on the frequency band range indication and the resource unit indication.

It may be learned that in the method, the MRU can be allocated to the station, so that the MRU is more flexibly allocated, to help improve frequency band utilization. In addition, the frequency band range indicated by the frequency band range indication is the frequency band range in which some or all of the RUs other than the MRU indicated by the resource unit indication are located, or the frequency band range indicated by the frequency band range indication is a frequency band range other than a frequency band range in which the MRU indicated by the resource unit indication is located, in other words, the MRU that needs to be indicated by the resource unit indication is determined from a frequency band range less than the bandwidth. Therefore, in comparison with a case in which the MRU that needs to be indicated by the resource unit indication is determined from a frequency band range corresponding to the bandwidth, the number of indexes that need to be indicated by the resource unit indication is reduced.

In an implementation, the MRU indicated by the resource unit indication includes three resource units (996-tone RU) whose size is 996 subcarriers (denoted as a 3*996-tone RU), and the frequency band range indicated by the frequency band range indication is 80 MHz, in the bandwidth, in which one 996-tone RU other than the 3*996-tone RU is located, or the frequency band range indicated by the frequency band range indication is 80 MHZ, in the bandwidth, other than a frequency band range in which the 3*996-tone RU is located. It may be learned that in this implementation, the resource unit indication needs only one index to indicate the 3*996-tone RU, and the station may determine the allocated MRU with reference to the frequency band range indication.

If the frequency band range indicated by the frequency band range indication is lowest 80 MHz related to the 3*996-tone RU in the bandwidth, after the lowest 80 MHz related to the 3*996-tone RU in the bandwidth is determined, there are three combinations for the 3*996-tone RU (that is, there are three combinations when two 996-tone RUs are selected from three 80 MHz frequency band ranges other than the lowest 80 MHz in the bandwidth). Therefore, the resource unit indication needs to indicate one of three indexes corresponding to the three combinations, to uniquely notify the station of the allocated MRU. Therefore, a meaning of the frequency band range indication in this application helps reduce the number of indexes that need to be indicated by the resource unit indication.

According to a sixth aspect, this application further provides a resource unit indication method. The method corresponds to the resource unit indication method in the fifth aspect, and is described from a perspective of an access point. The method includes: The access point determines a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range, in a bandwidth, in which some or all of resource units RUs other than the MRU are located; and the access point sends the trigger frame.

It may be learned that in the method, the MRU can be allocated to the station, so that the MRU is more flexibly allocated, to help improve frequency band utilization. In addition, the frequency band range indicated by the frequency band range indication is the frequency band range in which some or all of the RUs other than the MRU indicated by the resource unit indication are located, or the frequency band range indicated by the frequency band range indication is a frequency band range other than a frequency band range in which the MRU indicated by the resource unit indication is located, in other words, the MRU that needs to be indicated by the resource unit indication is determined from a frequency band range less than the bandwidth. Therefore, in comparison with a case in which the MRU that needs to be indicated by the resource unit indication is determined from a frequency band range corresponding to the bandwidth, the number of indexes that need to be indicated by the resource unit indication is reduced.

For another related implementation of the resource unit indication method, refer to the related implementation in the fifth aspect. Details are not described herein.

According to a seventh aspect, this application further provides a resource unit indication method. The method includes: A station receives a trigger frame from an access point, where the trigger frame includes a resource unit allocation subfield used to indicate to allocate a resource to the station, the resource unit allocation subfield includes a frequency band range indication and a resource unit indication, the frequency band range indication is used to indicate a frequency band range in a bandwidth, the resource unit indication is used to indicate an MRU allocated to the station, and the MRU includes remaining resource units RUs in a frequency band range, in the bandwidth, other than the frequency band range indicated by the frequency band range indication; and the station determines the allocated MRU based on the frequency band range indication and the resource unit indication.

It may be learned that in the method, the MRU can be allocated to the station, so that the MRU is more flexibly allocated, to help improve frequency band utilization. In addition, the MRU indicated by the resource unit indication is a combination of the remaining RUs in the frequency band range, in the bandwidth, other than the frequency band range indicated by the frequency band range indication. Therefore, in comparison with a case in which the MRU that needs to be indicated by the resource unit indication is determined from a frequency band range corresponding to the bandwidth, the number of indexes that need to be indicated by the resource unit indication is reduced.

In an implementation, the MRU indicated by the resource unit indication includes three resource units (996-tone RU) whose size is 996 subcarriers (denoted as a 3*996-tone RU), and the frequency band range indicated by the frequency band range indication is 80 MHz in the bandwidth. In this case, the 3*996-tone RU includes remaining three 996-tone RUs in a frequency band range other than the 80 MHz in the bandwidth. It may be learned that in this implementation, the resource unit indication needs one index to indicate the 3*996-tone RU. In comparison with a case in which the frequency band range indicated by the frequency band range indication is lowest 80 MHz related to the 3*996-tone RU in the bandwidth, the number of indexes that need to be indicated by the resource unit indication is reduced in this application.

According to an eighth aspect, this application further provides a resource unit indication method. The method corresponds to the resource unit indication method in the seventh aspect, and is described from a perspective of an access point. The method includes: The access point determines a trigger frame, where the trigger frame includes a resource unit allocation subfield used to indicate to allocate a resource to a station, the resource unit allocation subfield includes a frequency band range indication and a resource unit indication, the frequency band range indication is used to indicate a frequency band range in a bandwidth, the resource unit indication is used to indicate an MRU allocated to the corresponding station, and the MRU includes remaining resource units RUs in a frequency band range, in the bandwidth, other than the frequency band range indicated by the frequency band range indication; and the access point sends the trigger frame.

The MRU indicated by the resource unit indication is a combination of the remaining RUs in the frequency band range, in the bandwidth, other than the frequency band range indicated by the frequency band range indication. Therefore, in comparison with a case in which the MRU that needs to be indicated by the resource unit indication is determined from a frequency band range corresponding to the bandwidth, the number of indexes that need to be indicated by the resource unit indication is reduced.

For another related implementation of the resource unit indication method, refer to the related implementation in the seventh aspect. Details are not described herein.

In addition, in the first aspect to the eighth aspect, the resource unit allocation subfield occupies N bits, and the number of bits, in the N bits, occupied by the frequency range indication is determined based on the bandwidth and the frequency range indicated by the frequency range indication. For example, the frequency band range indication occupies a bit 0 to a bit x, and the resource unit indication occupies a bit (x+1) to a bit N. A value of x is related to the bandwidth and the frequency band range indicated by the frequency band range indication, and both N and x are greater than 0.

According to a ninth aspect, this application further provides a resource unit indication method. The method includes: A station receives a trigger frame from an access point, where the trigger frame includes a resource unit allocation subfield used to indicate to allocate a resource to the station, the resource unit allocation subfield occupies N bits, and an index indicated by the N bits represents an absolute location of a multi-resource unit MRU in a bandwidth, where N is greater than 0; and the station determines the MRU corresponding to the index indicated by the N bits, and uses the MRU as an MRU allocated to the station.

It may be learned that in the resource unit indication method, in the resource unit allocation subfield, no distinction is made for a bit specifically used to indicate a specific frequency band range, and the corresponding MRU may be directly searched for based on the index indicated by the N bits in the resource unit allocation subfield. Therefore, processing logic is greatly simplified, to help reduce processing complexity of the station.

In an implementation, N is equal to 9.

The absolution location that is of the MRU in the bandwidth and that is indicated by the N bits includes one or more of the following:

an MRU including a first resource unit (996-tone RU) whose size is 996 subcarriers and a second 996-tone RU in 320 MHz, or an MRU including a third 996-tone RU and a fourth 996-tone RU in 320 MHz; or an MRU including a first 996-tone RU to a fourth 996-tone RU in 320 MHz; or an MRU including a second resource unit (52-tone RU) whose size is 52 subcarriers and a second resource unit (26-tone RU) whose size is 26 subcarriers in any 20 MHz frequency band range in 320 MHz, an MRU including a third 52-tone RU and an eighth 26-tone RU in any 20 MHz frequency band range in 320 MHz, or an MRU including a second 52-tone RU and a fifth 26-tone RU in any 20 MHz frequency band range in 320 MHz; or an MRU including a first resource unit (106-tone RU) whose size is 106 subcarriers and a fifth 26-tone RU in any 20 MHz frequency band range in 320 MHz, or an MRU including a second 106-tone RU and a fifth 26-tone RU in any 20 MHz frequency band range in 320 MHz; or an MRU including a first or second resource unit (242-tone RU) whose size is 242 subcarriers and a second resource unit (484-tone RU) whose size is 484 subcarriers in any 80 MHz frequency band range in 320 MHz, or an MRU including a third or fourth 242-tone RU and a first 484-tone RU in any 80 MHz frequency band range in 320 MHz; or an MRU including a first or second 484-tone RU and a second resource unit (996-tone RU) whose size is 996 subcarriers in any 160 MHz frequency band range in 320 MHz, or an MRU including a third or fourth 484-tone RU and a second 996-tone RU in any 160 MHz frequency band range in 320 MHz; or an MRU including a first or second 484-tone RU, a second 996-tone RU, and a third 996-tone RU in lowest 240 MHz in 320 MHZ, an MRU including a third or fourth 484-tone RU, a first 996-tone RU, and a third 996-tone RU in lowest 240 MHz in 320 MHz, or an MRU including a fifth or sixth 484-tone RU, a first 996-tone RU, and a second 996-tone RU in lowest 240 MHz in 320 MHz; or an MRU including a first or second 484-tone RU, a second 996-tone RU, and a third 996-tone RU in highest 240 MHz in 320 MHz, an MRU including a third or fourth 484-tone RU, a first 996-tone RU, and a third 996-tone RU in highest 240 MHz in 320 MHz, or an MRU including a fifth or sixth 484-tone RU, a first 996-tone RU, and a second 996-tone RU in highest 240 MHz in 320 MHz; or an MRU including a first or second 484-tone RU, a second 996-tone RU, a third 996-tone RU, and a fourth 996-tone RU in 320 MHZ, an MRU including a third or fourth 484-tone RU, a first 996-tone RU, a third 996-tone RU, and a fourth 996-tone RU in 320 MHZ, an MRU including a fifth or sixth 484-tone RU, a first 996-tone RU, a second 996-tone RU, and a fourth 996-tone RU in 320 MHz, or an MRU including a seventh or eighth 484-tone RU, a first 996-tone RU, a second 996-tone RU, and a third 996-tone RU in 320 MHz; or an MRU including three 996-tone RUs in 320 MHz; or an MRU including a first or second 242-tone RU, a second 484-tone RU, and a second 996-tone RU in lowest 160 MHz in 320 MHz, an MRU including a third or fourth 242-tone RU, a first 484-tone RU, and a second 996-tone RU in lowest 160 MHz in 320 MHZ, an MRU including a fifth or sixth 242-tone RU, a fourth 484-tone RU, and a first 996-tone RU in lowest 160 MHz in 320 MHz, or an MRU including a seventh or eighth 242-tone RU, a third 484-tone RU, and a first 996-tone RU in lowest 160 MHz in 320 MHz; or an MRU including a first or second 242-tone RU, a second 484-tone RU, and a second 996-tone RU in highest 160 MHz in 320 MHz, an MRU including a third or fourth 242-tone RU, a first 484-tone RU, and a second 996-tone RU in highest 160 MHz in 320 MHz, an MRU including a fifth or sixth 242-tone RU, a fourth 484-tone RU, and a first 996-tone RU in highest 160 MHz in 320 MHz, or an MRU including a seventh or eighth 242-tone RU, a third 484-tone RU, and a first 996-tone RU in highest 160 MHz in 320 MHz.

According to a tenth aspect, this application further provides a resource unit indication method. The method corresponds to the resource unit indication method in the ninth aspect, and is described from a perspective of an access point. The method includes: The access point determines a trigger frame, where the trigger frame includes a resource unit allocation subfield used to indicate to allocate a resource to a station, the resource unit allocation subfield occupies N bits, and an index indicated by the N bits directly represents an absolute location of a multi-resource unit MRU in a bandwidth, where N is greater than 0; and the access point sends the trigger frame.

It may be learned that in the resource unit indication method, in the resource unit allocation subfield, no distinction is made for a bit specifically used to indicate a specific frequency band range, and the corresponding MRU may be directly searched for based on the index indicated by the N bits in the resource unit allocation subfield. Therefore, processing logic is greatly simplified, to help reduce processing complexity of the station.

For another related implementation of the resource unit indication method, refer to the related implementation in the ninth aspect. Details are not described herein.

According to an eleventh aspect, this application further provides a communication apparatus. The communication apparatus has some or all functions of the station in the method example in the first aspect, the third aspect, the fifth aspect, the seventh aspect, or the ninth aspect. For example, the communication apparatus may have functions in some or all of embodiments of this application, or may have a function of independently implementing any embodiment of this application. The function may be implemented by hardware, or may be implemented by hardware executing corresponding software. The hardware or the software includes one or more units or modules corresponding to the foregoing functions.

In a possible design, a structure of the communication apparatus may include a processing unit and a communication unit. The processing unit is configured to support the communication apparatus in performing a corresponding function in the foregoing methods. The communication unit is configured to support communication between the communication apparatus and another device. The communication apparatus may further include a storage unit. The storage unit is configured to couple to the processing unit and the communication unit, and the storage unit stores program instructions and data that are necessary for the communication apparatus.

In an implementation, the communication apparatus implements a related function of the station in the first aspect, and the communication apparatus includes:

the communication unit, configured to receive a trigger frame from an access point, where the trigger frame includes a resource unit allocation subfield used to indicate to allocate a resource to the station, the resource unit allocation subfield includes a frequency band range indication and a resource unit indication, the resource unit indication is used to indicate a multi-resource unit MRU allocated to the station, and the frequency band range indication is used to indicate a frequency band range in which a smallest resource unit RU in the MRU indicated by the resource unit indication is located; and the processing unit, configured to determine the allocated MRU based on the frequency band range indication and the resource unit indication.

In an example, the processing unit may be a processor, the communication unit may be a transceiver or a communication interface, and the storage unit may be a memory.

In another implementation, the communication apparatus implements a related function of the station in the third aspect, and the communication apparatus includes:

the communication unit, configured to receive a trigger frame from an access point, where the trigger frame includes a resource unit allocation subfield used to indicate to allocate a resource to the station, the resource unit allocation subfield includes a frequency band range indication and a resource unit indication, the resource unit indication is used to indicate a multi-resource unit MRU allocated to the station, and the frequency band range indication is used to indicate a frequency band range in which the MRU is located; and the processing unit, configured to determine the allocated MRU based on the frequency band range indication and the resource unit indication.

In still another implementation, the communication apparatus implements a related function of the station in the fifth aspect, and the communication apparatus includes:

the communication unit, configured to receive a trigger frame from an access point, where the trigger frame includes a resource unit allocation subfield used to indicate to allocate a resource to the station, the resource unit allocation subfield includes a frequency band range indication and a resource unit indication, the resource unit indication is used to indicate a multi-resource unit MRU allocated to the station, and the frequency band range indication is used to indicate a frequency band range, in a bandwidth, in which some or all of resource units RUs other than the MRU are located; and the processing unit, configured to determine the allocated MRU based on the frequency band range indication and the resource unit indication.

In still another implementation, the communication apparatus implements a related function of the station in the seventh aspect, and the communication apparatus includes:

the communication unit, configured to receive a trigger frame from an access point, where the trigger frame includes a resource unit allocation subfield used to indicate to allocate a resource to the station, the resource unit allocation subfield includes a frequency band range indication and a resource unit indication, the frequency band range indication is used to indicate a frequency band range in a bandwidth, the resource unit indication is used to indicate an MRU allocated to the station, and the MRU includes remaining resource units RUs in a frequency band range, in the bandwidth, other than the frequency band range indicated by the frequency band range indication; and the processing unit, configured to determine the allocated MRU based on the frequency band range indication and the resource unit indication.

In another implementation, the communication apparatus may implement a related function of the station in another aspect. Details are not described herein.

In an implementation, the communication apparatus implements a related function of the station in the first aspect, and may include:

a transceiver, configured to receive a trigger frame from an access point, where the trigger frame includes a resource unit allocation subfield used to indicate to allocate a resource to the station, the resource unit allocation subfield includes a frequency band range indication and a resource unit indication, the resource unit indication is used to indicate a multi-resource unit MRU allocated to the station, and the frequency band range indication is used to indicate a frequency band range in which a smallest resource unit RU in the MRU indicated by the resource unit indication is located; and a processor, configured to determine the allocated MRU based on the frequency band range indication and the resource unit indication.

In another implementation, the communication apparatus implements a related function of the station in the third aspect, and the communication apparatus includes:

a transceiver, configured to receive a trigger frame from an access point, where the trigger frame includes a resource unit allocation subfield used to indicate to allocate a resource to the station, the resource unit allocation subfield includes a frequency band range indication and a resource unit indication, the resource unit indication is used to indicate a multi-resource unit MRU allocated to the station, and the frequency band range indication is used to indicate a frequency band range in which the MRU is located; and a processor, configured to determine the allocated MRU based on the frequency band range indication and the resource unit indication.

In another implementation, the communication apparatus may implement a related function of the station in another aspect. Details are not described herein.

According to a twelfth aspect, this application further provides a communication apparatus. The communication apparatus has some or all functions of the access point in the method example in the second aspect, the fourth aspect, the sixth aspect, the eighth aspect, or the tenth aspect. For example, the communication apparatus may have functions in some or all of embodiments of this application, or may have a function of independently implementing any embodiment of this application. The function may be implemented by hardware, or may be implemented by hardware executing corresponding software. The hardware or the software includes one or more units or modules corresponding to the foregoing functions.

In a possible design, a structure of the communication apparatus includes a processing unit and a communication unit. The processing unit is configured to support the communication apparatus in performing a corresponding function in the foregoing methods. The communication unit is configured to support communication between the communication apparatus and another device. The communication apparatus may further include a storage unit. The storage unit is configured to couple to the processing unit and the communication unit, and the storage unit stores program instructions and data that are necessary for the communication apparatus.

In an implementation, the communication apparatus implements a related function of the access point in the second aspect, and the communication apparatus includes:

the processing unit, configured to determine a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range in which a smallest resource unit RU in the MRU indicated by the resource unit indication is located; and the communication unit, configured to send the trigger frame.

In another implementation, the communication apparatus implements a related function of the access point in the fourth aspect, and the communication apparatus includes:

the processing unit, configured to determine a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range in which the MRU is located; and the communication unit, configured to send the trigger frame.

In another implementation, the communication apparatus implements a related function of the access point in the sixth aspect, and the communication apparatus includes:

the processing unit, configured to determine a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range, in a bandwidth, in which some or all of resource units RUs other than the MRU are located; and the communication unit, configured to send the trigger frame.

In another implementation, the communication apparatus implements a related function of the access point in the eighth aspect, and the communication apparatus includes:

the processing unit, configured to determine a trigger frame, where the trigger frame includes a resource unit allocation subfield used to indicate to allocate a resource to a station, the resource unit allocation subfield includes a frequency band range indication and a resource unit indication, the frequency band range indication is used to indicate a frequency band range in a bandwidth, the resource unit indication is used to indicate an MRU allocated to the corresponding station, and the MRU includes remaining resource units RUs in a frequency band range, in the bandwidth, other than the frequency band range indicated by the frequency band range indication; and the communication unit, configured to send the trigger frame.

In an example, the processing unit may be a processor, the communication unit may be a transceiver or a communication interface, and the storage unit may be a memory.

In another implementation, the communication apparatus may implement a related function of the access point in another aspect. Details are not described herein.

In an implementation, the communication apparatus implements a related function of the access point in the second aspect, and may include:

a processor, configured to determine a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range in which a smallest resource unit RU in the MRU indicated by the resource unit indication is located; and a transceiver, configured to send the trigger frame.

In an implementation, the communication apparatus implements a related function of the access point in the fourth aspect, and may include:

a processor, configured to determine a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range in which the MRU is located; and a transceiver, configured to send the trigger frame.

In another implementation, the communication apparatus implements a related function of the access point in the sixth aspect, and the communication apparatus includes:

a processor, configured to determine a trigger frame, where the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the corresponding station, and the frequency band range indication is used to indicate a frequency band range, in a bandwidth, in which some or all of resource units RUs other than the MRU are located; and a transceiver, configured to send the trigger frame.

In another implementation, the communication apparatus implements a related function of the access point in the eighth aspect, and the communication apparatus includes:

a processor, configured to determine a trigger frame, where the trigger frame includes a resource unit allocation subfield used to indicate to allocate a resource to a station, the resource unit allocation subfield includes a frequency band range indication and a resource unit indication, the frequency band range indication is used to indicate a frequency band range in a bandwidth, the resource unit indication is used to indicate an MRU allocated to the corresponding station, and the MRU includes remaining resource units RUs in a frequency band range, in the bandwidth, other than the frequency band range indicated by the frequency band range indication; and a transceiver, configured to send the trigger frame.

In another implementation, the communication apparatus may implement a related function of the access point in another aspect. Details are not described herein.

In a specific implementation process, the processor may be configured to perform, for example, but not limited to, baseband-related processing; and the transceiver may be configured to perform, for example, but not limited to, radio frequency receiving and sending. The foregoing components may be separately disposed on chips independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of components may be integrated on one chip. For example, the digital baseband processor and a plurality of application processors (for example, but not limited to a graphics processing unit and a multimedia processor) may be integrated on one chip. The chip may be referred to as a system-on-a-chip (system-on-a-chip). Whether all the components are separately disposed on different chips or integrated and disposed on one or more chips usually depends on a specific requirement for a product design. Specific implementation forms of the components are not limited in embodiments of the present invention.

According to a thirteenth aspect, this application further provides a processor, configured to perform the method in the first aspect, the third aspect, the fifth aspect, the seventh aspect, or the ninth aspect, or perform the method in the second aspect, the fourth aspect, the sixth aspect, the eighth aspect, or the tenth aspect. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

Based on the foregoing principle, for example, the receiving a trigger frame in the foregoing method may be understood as that the processor inputs the trigger frame. For another example, the sending the trigger frame may be understood as that the processor outputs the trigger frame.

In this case, for operations such as transmission, sending, and receiving related to the processor, if there is no particular statement, or if the operations do not contradict an actual function or internal logic of the operations in related descriptions, the operations may be more generally understood as operations such as input, receiving, and output of the processor, instead of operations such as transmission, sending, and receiving directly performed by a radio frequency circuit and an antenna.

In a specific implementation process, the processor may be a processor specially configured to perform these methods, or a processor, for example, a general-purpose processor, configured to execute computer instructions in a memory to perform these methods. The memory may be a non-transitory (non-transitory) memory such as a read-only memory (read only memory, ROM). The memory and the processor may be integrated on a same chip, or may be separately disposed on different chips. A type of the memory and a manner of disposing the memory and the processor are not limited in embodiments of this application.

According to a fourteenth aspect, this application provides a computer-readable storage medium, configured to store computer software instructions to be used by the foregoing data transmission device. The computer software instructions include a program used to perform the method in the first aspect, the third aspect, the fifth aspect, the seventh aspect, or the ninth aspect, or include a program used to perform the method in the second aspect, the fourth aspect, the sixth aspect, the eighth aspect, or the tenth aspect.

According to a fifteenth aspect, this application further provides a computer program product including instructions. When the computer program product is run on a computer, the computer is enabled to perform the method in the first aspect, the third aspect, the fifth aspect, the seventh aspect, or the ninth aspect, or the computer is enabled to perform the method in the second aspect, the fourth aspect, the sixth aspect, the eighth aspect, or the tenth aspect.

According to a sixteenth aspect, this application provides a chip system. The chip system includes a processor and an interface, and is configured to support a data transmission device in implementing the function in the first aspect, the third aspect, the fifth aspect, the seventh aspect, or the ninth aspect, for example, determining or processing at least one of data and information in the foregoing method, for example, a trigger frame. In a possible design, the chip system further includes a memory, and the memory is configured to store program instructions and data that are required by a station. The chip system may include a chip, or include a chip and other discrete devices.

According to a seventeenth aspect, this application provides a chip system. The chip system includes a processor and an interface, and is configured to support a data transmission device in implementing the function in the second aspect, the fourth aspect, the sixth aspect, the eighth aspect, or the tenth aspect, for example, determining or processing at least one of data and information in the foregoing method. In a possible design, the chip system further includes a memory, and the memory is configured to store program instructions and data that are required by a station. The chip system may include a chip, or include a chip and other discrete devices.

DESCRIPTION OF EMBODIMENTS

The following clearly and completely describes embodiments of this application with reference to the accompanying drawings.

Figure 1:
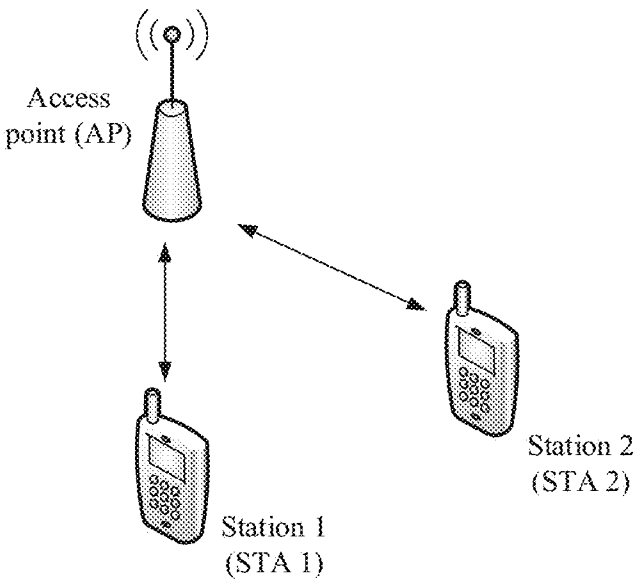
FIG. 1 is a schematic diagram of a network structure according to an embodiment of this application.

A network structure to which a resource unit indication method in this application is applicable is described by using FIG. 1 as an example. FIG. 1 is a schematic diagram of a network structure according to an embodiment of this application. The network structure may include one or more access point (access point, AP) stations and one or more non-access point stations (none access point station, non-AP STA). For ease of description, in this specification, the access point station is referred to as an access point (AP), and the non-access point station is referred to as a station (STA). In FIG. 1, description is provided by using an example in which the network structure includes one AP and two stations (STA 1 and STA 2).

The access point may be an access point used for a terminal device (for example, a mobile phone) to access a wired (or wireless) network, is mainly deployed in a home, a building, and a campus, and has a typical coverage radius ranging from dozens of meters to hundreds of meters. Certainly, the access point may be deployed outdoors. The access point is equivalent to a bridge that connects a wired network and a wireless network. A main function of the access point is to connect various wireless network clients together and then connect the wireless network to an Ethernet. Specifically, the access point may be a terminal device (for example, a mobile phone) or a network device (for example, a router) that includes a wireless fidelity (wireless-fidelity, WiFi) chip. The access point may be a device that supports an 802.11be standard. Alternatively, the access point may be a device that supports a plurality of wireless local area network (wireless local area networks, WLAN) standards in an 802.11 family such as 802.11be, 802.11ax, 802.11ac, 802.11n, 802.11g, 802.11b, and 802.11a. The access point in this application may be a high efficiency (high efficient, HE) AP or an extremely high throughput (extremely high throughput, EHT) AP, or may be an access point applicable to a future Wi-Fi standard.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function. Optionally, the station may support the 802.11be standard. Alternatively, the station may support a plurality of wireless local area network (wireless local area networks, WLAN) standards in an 802.11 family such as 802.11be, 802.11ax, 802.11ac, 802.11n, 802.11g, 802.11b, and 802.11a.

The access point in this application may be a high efficiency (high efficient, HE) STA or an extremely high throughput (extremely high throughput, EHT) STA, or may be a STA applicable to a future Wi-Fi standard.

For example, the access point and the station may be devices applied to an internet of vehicles, nodes, sensors, or the like in an internet of things (IoT, internet of things), smart cameras, smart remote controllers, or smart water meters/meters in a smart home, and sensors in a smart city.

Herein, 802.11n may also be referred to as high throughput (high throughput, HT), 802.11ac may also be referred to as very high throughput (very high throughput, VHT), 802.11ax (Wi-Fi 6) may also be referred to as high efficiency (high efficient, HE), 802.11be (Wi-Fi 7) may also be referred to as extremely high throughput (extremely high throughput, EHT), and standards before HT, for example, 802.11a/b/g, are collectively referred to as non-HT (non-high throughput). In 802.11b, a non-OFDM (Orthogonal Frequency Division Multiplexing, orthogonal frequency division multiplexing) mode is used.

Starting from 802.11a/g, a WLAN evolves from 802.11n and 802.11ac to 802.11ax and 802.11be currently under discussion. A bandwidth and the number of space-time streams allowed for transmission in the WLAN are respectively shown in Table 1.

TABLE 1

Maximum bandwidth and maximum transmission rate allowed for transmission in each WLAN standard

| | 802.11a/g | 802.11n (HT) | 802.11ac (VHT) | 802.11ax (HE) | 802.11be (EHT) |
|---|---|---|---|---|---|
| Bandwidth | 20 MHz | 20/40 MHz | 20/40/80/ 160 MHz | 20/40/80/ 160 MHz | 20/40/80/160/ 240 MHz/320 MHz |
| Supported maximum data rate | 54 Mbps | 600 Mbps | 6.9 Gbps | 9.6 Gbps | Not less than 30 Gbps |

As shown in Table 1, the maximum data rate supported for data transmission increases with the bandwidth. Therefore, a higher bandwidth (for example, 240 MHz or 320 MHz) greater than 160 MHz is to be considered in a future Wi-Fi standard.

Although embodiments of this application are mainly described by using a network in which IEEE 802.11 is deployed as an example, it may be easily understood by a person skilled in the art that the aspects of this application may be extended to other networks that use various standards or protocols, for example, Bluetooth (Bluetooth), a high performance radio LAN (high performance radio LAN, HIPERLAN) (a wireless standard that is similar to an IEEE 802.11 standard and that is mainly used in Europe), a wide area network (WAN), a wireless local area network (wireless local area network, WLAN), a personal area network (personal area network, PAN), or another network that is currently known or later developed. Therefore, regardless of a used coverage area and wireless access protocol, the aspects provided in this application are applicable to any suitable wireless network.

In addition, to facilitate understanding of related content in embodiments of this application, some concepts in embodiments of this application are described.

1. Channel Distribution

Figure 2A:
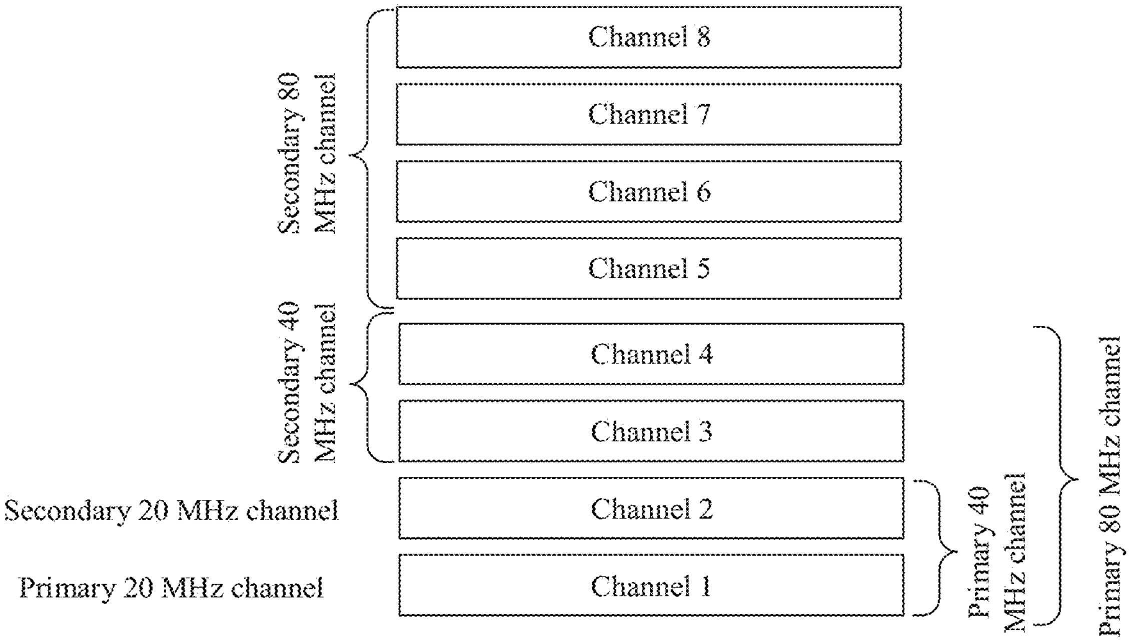
FIG. 2*a* is a schematic diagram of channel distribution of 160 MHz according to an embodiment of this application.

In an implementation, a bandwidth may be divided into a plurality of subchannels. FIG. 2*a* is a schematic diagram of channel distribution according to an embodiment of this application. As shown in FIG. 2*a*, when the bandwidth is 160 MHz, the bandwidth may be divided into a primary 20 MHz channel (or referred to as a primary channel, Primary 20 MHz, P20), a secondary 20 MHz channel (Secondary 20 MHz, S20), a secondary 40 MHz channel (Secondary 40 MHz, S40), and a secondary 80 MHz (Secondary 80 MHz, S80) channel. In an optional implementation, a channel 1 may correspond to the primary 20 MHz channel, a channel 2 corresponds to the secondary 20 MHz channel, a channel 3 and a channel 4 are combined into the secondary 40 MHz channel, and a channel 5 to a channel 8 are combined into the secondary 80 MHz channel. In addition, a primary 40 MHz channel (or referred to as a primary channel, Primary 40 MHz, P40) is a 40 MHz channel on which the primary 20 MHz channel is located, and a primary 80 MHz channel (or referred to as a primary channel, Primary 80 MHz, P80) is an 80 MHz channel on which the primary 20 MHz channel is located.

Figure 2B:
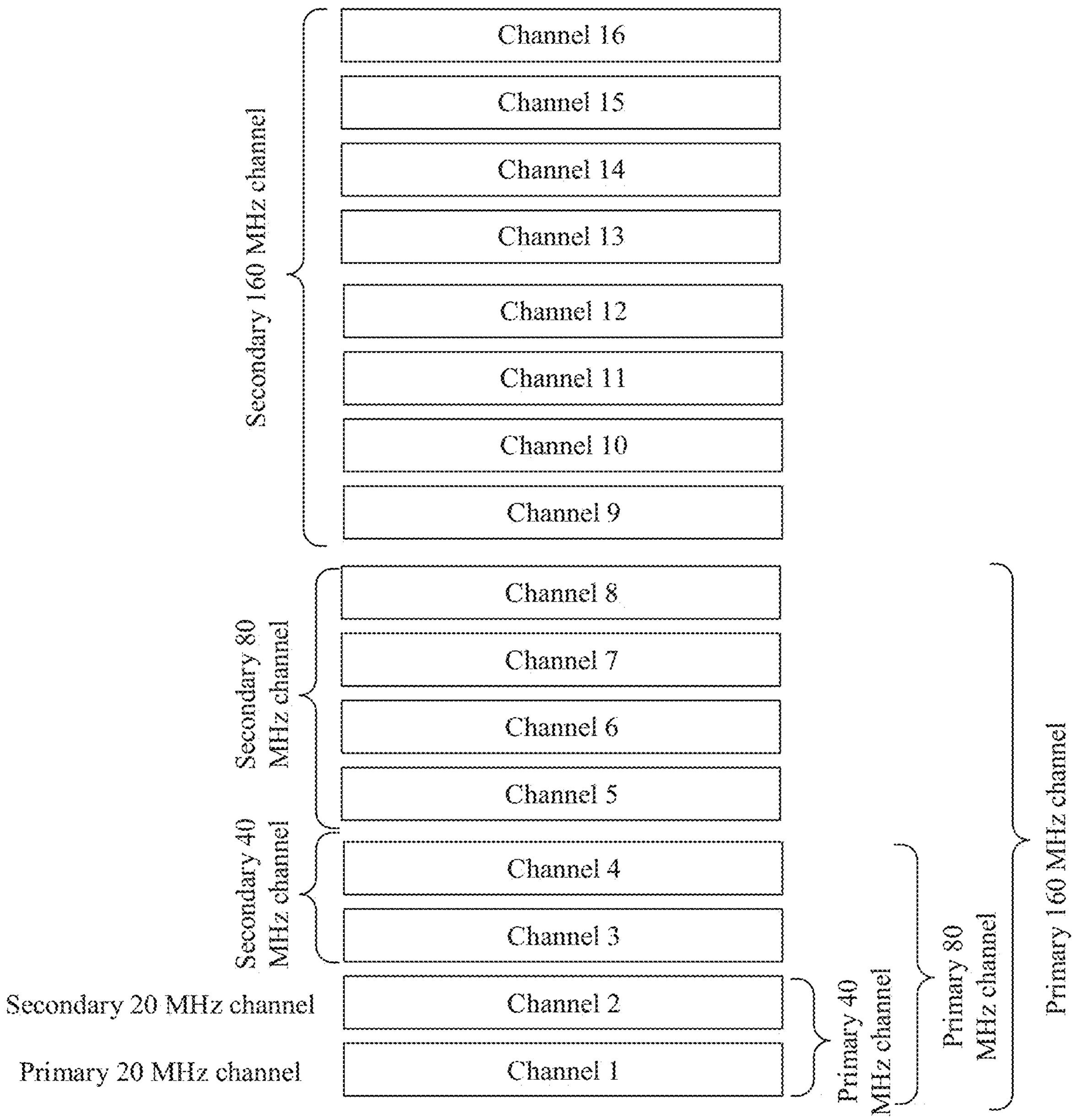
FIG. 2*b* is a schematic diagram of channel distribution of 320 MHz according to an embodiment of this application.

For another example, FIG. 2*b* is another schematic diagram of channel distribution according to an embodiment of this application. As shown in FIG. 2*b*, when the bandwidth is 320 MHz, the bandwidth may be divided into a primary 20 MHz channel (or referred to as a primary channel, Primary 20 MHz, P20), a secondary 20 MHz channel (Secondary 20 MHz, S20), a secondary 40 MHz channel (Secondary 40 MHz, S40), a secondary 80 MHz (Secondary 80 MHz, S80) channel, and a secondary 160 MHz (Secondary 160 MHz, S160) channel. In an optional implementation, a channel 1 may correspond to the primary 20 MHz channel, a channel 2 corresponds to the secondary 20 MHz channel, a channel 3 and a channel 4 are combined into the secondary 40 MHz channel, a channel 5 to a channel 8 are combined into the secondary 80 MHz channel, and a channel 9 to a channel 16 are combined into the secondary 160 MHz channel. In addition, a primary 40 MHz channel (or referred to as a primary channel, Primary 40 MHz, P40) is a 40 MHz channel on which the primary 20 MHz channel is located, a primary 80 MHz channel (or referred to as a primary channel, Primary 80 MHz, P80) is an 80 MHz channel on which the primary 20 MHz channel is located, and a primary 160 MHz channel (or referred to as a primary channel, Primary 160 MHz, P160) is a 160 MHz channel on which the primary 20 MHz channel is located.

In another implementation, the bandwidth may be divided into resource units (resource unit, RU) of different sizes. Resource units of different sizes may be obtained by combining different numbers of subcarriers, for example, a resource unit (referred to as a 996-tone RU) that includes (or whose size is) 996 subcarriers, a resource unit (referred to as a 484-tone RU) that includes (or whose size is) 484 subcarriers, a resource unit (referred to as a 484-tone RU) that includes (or whose size is) 484 subcarriers, a resource unit (referred to as a 106-tone RU) that includes (or whose size is) 106 subcarriers, a resource unit (referred to as a 26-tone RU) that includes (or whose size is) 26 subcarriers, a resource unit (referred to as a 52-tone RU) that includes (or whose size is) 52 subcarriers, a resource unit (referred to as a 2*996-tone RU, a (996+996)-tone RU that includes two 996-tone RUs, or a (996+996)-tone MRU) that includes (or whose size is) 2*996 subcarriers, or a resource unit (referred to as a 3*996-tone RU, a (996+996+996)-tone RU that includes three 996-tone RUs, or a (996+996+996)-tone MRU) that includes (or whose size is) 3*996 subcarriers.

Figure 3:
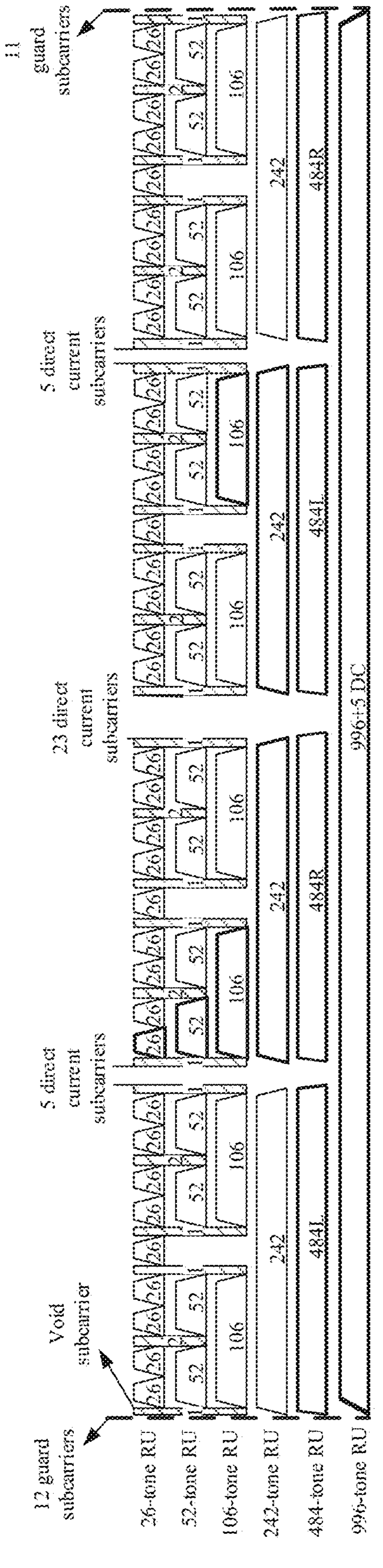
FIG. 3 is a schematic diagram of subcarrier distribution in 80 MHz according to an embodiment of this application.

FIG. 3 is a schematic diagram of subcarrier distribution in 80 MHz according to an embodiment of this application. As shown in FIG. 3, the first row indicates that the 80 MHz may include 36 26-tone RUs, the second row indicates that the 80 MHz may include 16 52-tone RUs, the third row indicates that the 80 MHz may include eight 106-tone RUs, the fourth row indicates that the 80 MHz may include four 242-tone RUs, and the fifth row indicates that the 80 MHz may include two 484-tone RUs. Herein, 484L represents a left half part of the 484-tone RU, and 484R represents a right half part of the 484-tone RU. Each of the two parts includes 242 subcarriers, which is another schematic diagram of the 484-tone RU. The sixth row indicates that the 80 MHz may include one 996-tone RU. In addition, in addition to the RU used to transmit data, there may further be a guard (guard) subcarrier, a void subcarrier, or a direct current (direct current, DC) subcarrier, as shown in FIG. 3.

A 160 MHz bandwidth or a 160 MHz bandwidth that includes discrete 80 MHz+80 MHz may be considered as a duplicate combination of subcarrier distribution of two 80 MHz bandwidths shown in FIG. 3. For example, the entire bandwidth may include one 2*996-tone RU, or may include various combinations of a 26-tone RU, a 52-tone RU, a 106-tone RU, a 242-tone RU, a 484-tone RU, and a 996-tone RU.

For a 240 MHz bandwidth or a 240 MHz bandwidth that includes discrete 160 MHz+80 MHZ, the entire bandwidth may be considered as a duplicate combination of subcarrier distribution of three 80 MHz bandwidths shown in FIG. 3, or may include various combinations of a 26-tone RU, a 52-tone RU, a 106-tone RU, a 242-tone RU, a 484-tone RU, and a 996-tone RU.

For a 320 MHz bandwidth or a 320 MHz bandwidth that includes discrete 160 MHz+160 MHz, the entire bandwidth may be considered as a duplicate combination of subcarrier distribution of four 80 MHz bandwidths shown in FIG. 3, or may include various combinations of a 26-tone RU, a 52-tone RU, a 106-tone RU, a 242-tone RU, a 484-tone RU, and a 996-tone RU.

In the subcarrier distribution in the foregoing bandwidths, frequencies sequentially increase from left to right. For example, a left side shown in FIG. 3 may be considered as a lowest frequency, and a right side shown in FIG. 3 may be considered as a highest frequency. Resource units are numbered from left to right, for example, a first (1st) resource unit and a second (2nd) resource unit. As shown in FIG. 3, the four 242-tone RUs included in the 80 MHz may be respectively numbered from left to right: a first 242-tone RU, a second 242-tone RU, a third 242-tone RU, and a fourth 242-tone RU. The first 242-tone RU and the second 242-tone RU are in a one-to-one correspondence with two lowest 20 MHz frequency band ranges in the 80 MHz in ascending order of frequencies. The third 242-tone RU and the fourth 242-tone RU are in a one-to-one correspondence with two highest 20 MHz frequency band ranges in the 80 MHz in ascending order of frequencies. There is one center 26-tone RU in every 80 MHz bandwidth, and therefore the 242-tone RU and the 20 MHz corresponding to the 242-tone RU do not completely overlap in terms of frequency.

In addition to the several RUs described above, a multi-resource unit (multi-RU, MRU) obtained by combining a plurality of RUs of the foregoing sizes is further introduced into 802.11be. For example, a (52+26)-tone RU (or referred to as a (52+26)-tone MRU or a 78-tone RU) including one 52-tone RU and one 26-tone RU, a (106+26)-tone RU (or referred to as a (106+26)-tone MRU or a 132-tone RU) including one 106-tone RU and one 26-tone RU, a (484+242)-tone RU (or referred to as a (484+242)-tone MRU or a 726-tone RU) including one 484-tone RU and one 242-tone RU, a (996+484)-tone RU (or referred to as a (996+484)-tone MRU or a 1480-tone RU) including one 996-tone RU and one 484-tone RU, a (2*996+484)-tone RU (or referred to as a (2*996+484)-tone MRU or a 2476-tone RU) including two 996-tone RUs and one 484-tone RU, a 3*996-tone RU (or referred to as a 3*996-tone MRU or a 2988-tone RU) including three 996-tone RUs, a (3*996+484)-tone RU (or referred to as a (3*996+484)-tone MRU or a 3472-tone RU) including three 996-tone RUs and one 484-tone RU, or a (996+484+242)-tone RU (or referred to as a (996+484+242)-tone MRU or a 1722-tone RU) including one 996-tone RU, one 484-tone RU, and one 242-tone RU is further introduced into 802.11be.

The 26-tone RU approximately corresponds to 2 MHZ, the 52-tone RU approximately corresponds to 4 MHZ, the 106-tone RU approximately corresponds to 8 MHZ, and the 242-tone RU approximately corresponds to 20 MHz. Addition or multiplication may be correspondingly performed for an RU of another size. Details are not described herein.

A plurality of RUs allocated by an access point to a station may be referred to as an MRU allocated to the station. The MRU includes a plurality of RUs, a plurality of combined resource units, or a plurality of combined resource units, or is a combination of a plurality of resource units. Unless otherwise specified, in this specification, “combined”, “combined”, and “combination of” represent a same meaning. Optionally, the MRU including a plurality of RUs may further include some direct current subcarriers, a void subcarrier, and the like.

2. Trigger Frame-Based Scheduling Uplink Transmission Method

Figure 4:
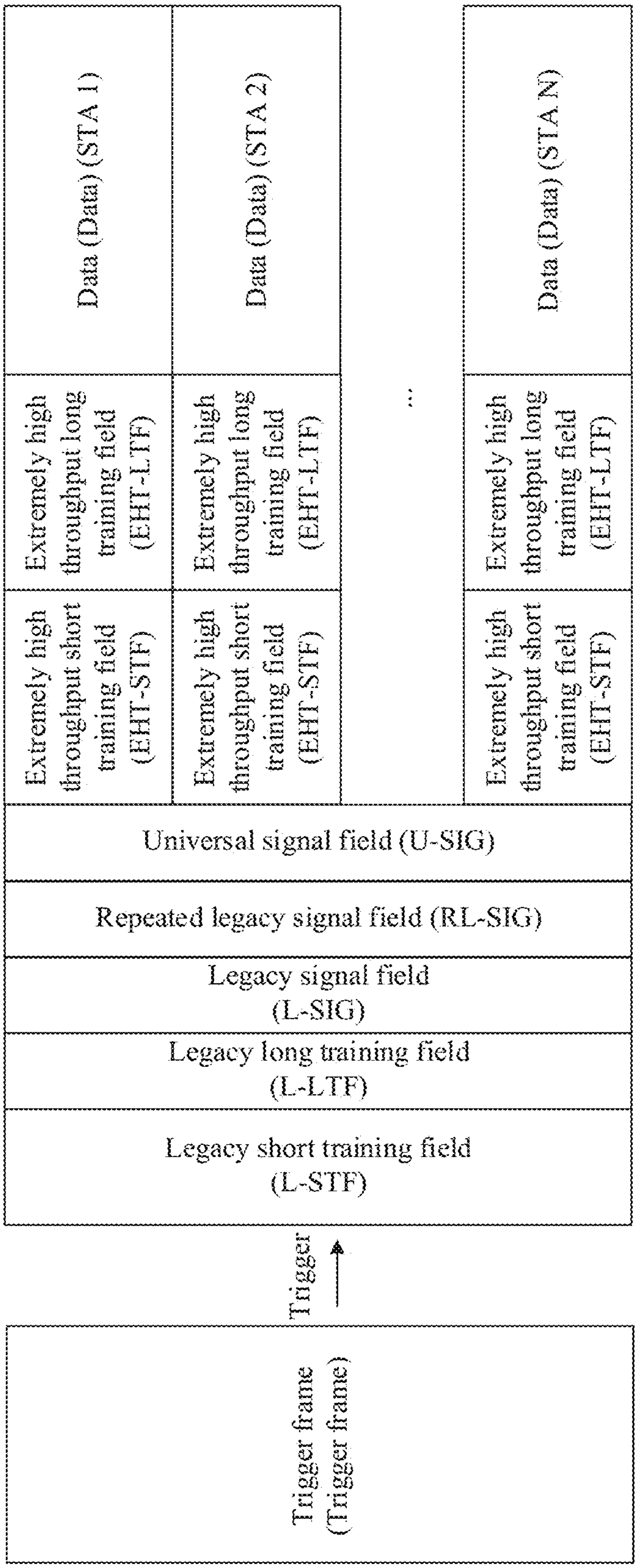
FIG. 4 is a schematic diagram of trigger frame-based uplink transmission according to an embodiment of this application.

Usually, a STA obtains sending permission through channel contention, and then transmits uplink data, for example, preempts a channel based on an EDCA (enhanced distributed channel access, enhanced distributed channel access) manner. The trigger frame-based scheduling uplink transmission method is introduced into 802.11ax. A schematic diagram of trigger frame-based scheduling uplink transmission is shown in FIG. 4. FIG. 4 is a schematic diagram of trigger frame-based uplink transmission according to an embodiment of this application. An access point sends a trigger frame. The trigger frame includes a resource scheduling parameter and another parameter used by one or more stations to send an uplink sub-physical layer protocol data unit (physical layer protocol data unit, PPDU). After receiving the trigger frame, the station obtains, through parsing, a user information field that matches (or is the same as) an association identifier of the station, and then sends a high efficiency trigger based data packet (high efficient trigger based physical layer protocol data unit, HE TB PPDU) on an RU or MRU indicated by a resource unit allocation subfield in the user information field, in other words, an EHT TB PPDU is a type of EHT PPDU. After receiving an uplink multi-user PPDU including uplink sub-PPDUs sent by the one or more stations, the access point replies with an acknowledgment frame. The acknowledgment frame sent by the access point to the one or more stations may be sent in a downlink OFDMA manner, or may be sent in a non-HT duplicate transmission manner. The acknowledgment frame includes an acknowledgment (Ack) frame and a block acknowledgment (Block Ack) frame. The block Ack frame includes a compressed block Ack frame and a multi-station block acknowledgment (Multi-STA Block Ack) frame. The Ack frame and the block Ack frame are acknowledgments of an uplink sub-PPDU sent by one station, and the multi-STA block Ack frame is an acknowledgment of an uplink sub-PPDU sent by one or more stations.

Figure 5:
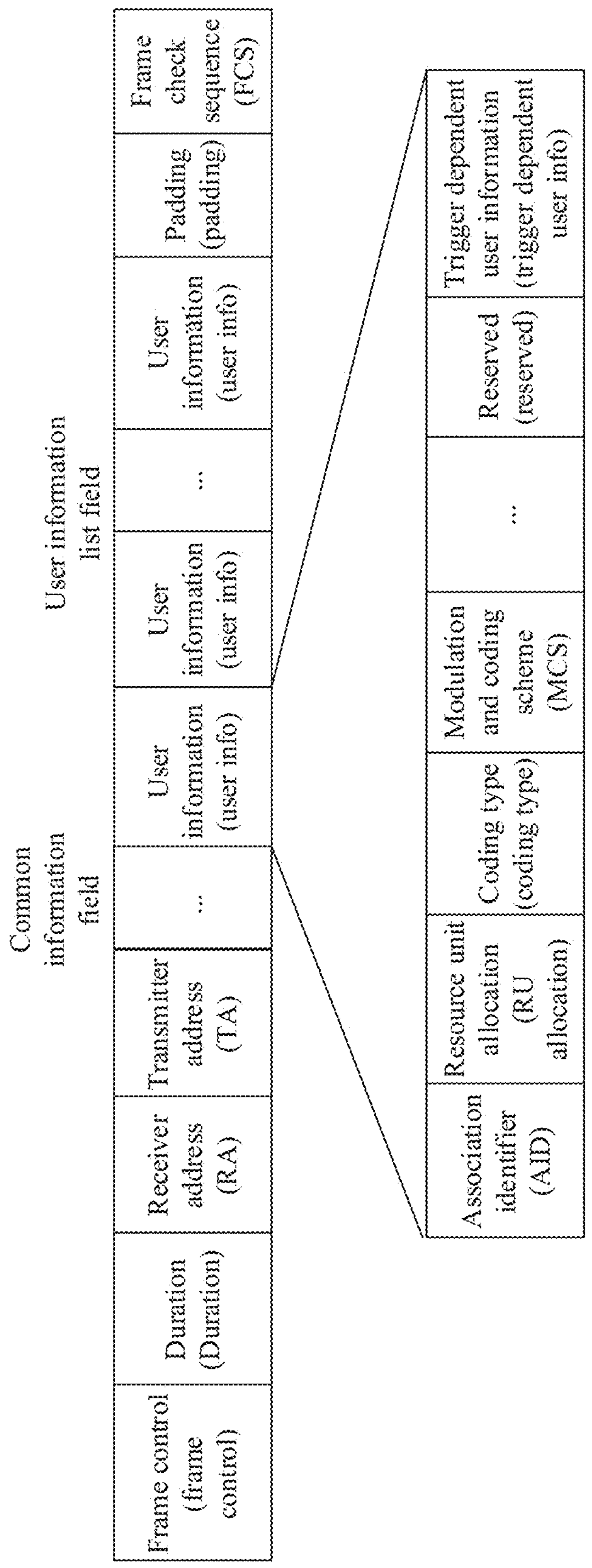
FIG. 5 is a schematic diagram of a frame structure of a trigger frame according to an embodiment of this application.

In an implementation, a frame format of the trigger frame may be shown in FIG. 5. FIG. 5 is a schematic diagram of a structure of a trigger frame according to an embodiment of this application. The trigger frame may include only some fields shown in FIG. 5. Alternatively, the trigger frame may include more fields than those shown in FIG. 5. This is not limited in this embodiment of this application. For example, the trigger frame includes a common information (common info) field and a user information list (user info list) field. The trigger frame may further include a frame control (frame control) field, a duration (duration) field, a receiver address (RA) field, a transmitter address (TA) field, a padding (padding) field, a frame check sequence (FCS, frame check sequence) field, and the like.

The common information field may also be referred to as a common field or a common information field. The common information field includes common information that needs to be read by all stations, for example, a trigger type (trigger type) subfield, a length (length) subfield, a cascade indication (cascade indication) subfield, a carrier sensing required (CS Required) subfield, a bandwidth (bandwidth) subfield, a guard interval+long training sequence (GI+LTF) subfield, and a trigger dependent common information (trigger dependent common info) subfield.

The user information list field may also be referred to as a user information list field, a per station field, or the like. The user information list field includes one or more user information (user info) fields. Each user information field includes information that needs to be read by each station, for example, an association identifier (Association Identifier, AID) subfield, a resource unit allocation (RU allocation) subfield, a coding type (coding type) subfield, a modulation and coding scheme (Modulation and Coding Scheme, MCS) subfield, a reserved (reserved) subfield, and a trigger dependent user information (trigger dependent user info) subfield.

The association identifier field is used to indicate an association identifier of the station corresponding to the user information field. The resource unit allocation subfield is used to indicate an RU/MRU (or a location of an RU/MRU) allocated to the station.

In this specification, "field (field)" may also be referred to as "field", "information", or the like, and "subfield (subfield)" may be referred to as "subfield", "information", or the like.

A PPDU sent by the station on the allocated RU/MRU may be an extremely high throughput trigger based physical layer protocol data unit (Extremely High Throughput trigger based physical layer protocol data unit, EHT TB PPDU). A function of each field in the PPDU is shown in Table 2. It should be understood that only an example is provided herein. In standard formulation or actual implementation, the EHT PPDU may further include another field.

TABLE 2

Function of each field in the PPDU

| Chinese expression | Function |
|---|---|
| Legacy short training field (Legacy Short Training Field, L-STF) | Used for PPDU discovery, coarse synchronization, and automatic gain control |
| Legacy long training field (Legacy Long Training Field, L-LTF) | Used for fine synchronization and channel estimation |
| Legacy signal field (Legacy Signal Field, L-SIG) | Used to carry signaling information related to a PPDU length to ensure coexistence |
| Universal signal field (Universal Signal Field, U-SIG) | Used to carry signaling for demodulating subsequent data |
| Extremely high throughput short training field (Extremely High Throughput Short Training Field, EHT-STF) | Used for automatic gain control for a subsequent field |
| Extremely high throughput long training field (Extremely High Efficient Long Training Field, EHT-LTF) | Used for channel estimation |
| Data (Data) | Used to carry data information |

With the development of a wireless local area network, a data rate required by the station to perform uplink data transmission increases. How the access point allocates a plurality of resource units to the station and indicates the plurality of resource units to the station, so that the station may perform uplink data transmission by using the plurality of resource units to increase the data rate becomes a problem that needs to be urgently resolved.

This application provides a resource unit indication method. In the method, an access point can allocate an MRU to a station. The resource unit indication method may also be referred to as a multi-resource unit indication method, a multi-resource unit combination method, or the like. In embodiments of this application, the MRU is allocated to the station by using a trigger frame, and a resource unit allocation subfield in the trigger frame is designed, to implement allocation of an RU/MRU in 320 MHz. The trigger frame designed in embodiments of this application is applicable to a case, in 802.11be (EHT) and a future Wi-Fi system, in which there is a high uplink transmission bandwidth and there is an increase in types of uplink transmission resource blocks allocated to the station.

Each station corresponds to one resource unit allocation subfield. The resource unit allocation subfield is divided into two parts. A first part of bits is used to notify the station of a specific frequency band range, and a second part of bits is used to notify an MRU entry based on the frequency band range. The entry is an index in an index table or an RU or MRU corresponding to an index, and the second part of bits can indicate the RU or MRU in the index table. For ease of description, the first part of bits may be referred to as a frequency band range indication, and the second part of bits may be referred to as a resource unit indication. In standard formulation or actual implementation, bits fall within the scope of embodiments of this application provided that the bits implement functions of the first part of bits and the second part of bits. Names of the first part of bits and the second part of bits are not limited in embodiments of this application.

It should be understood that in embodiments of this application, a frequency range in which an RU in the MRU is located may be different from or the same as an actual frequency range covered by the RU. In embodiments, the frequency range in which the RU is located may be greater than, less than, or the same as the actual frequency range covered by the RU.

The actual frequency range covered by the RU is less than the occupied frequency range. For example, an actual frequency range covered by a 484-tone RU is 40 MHZ, and the 40 MHz is in second 80 MHz in 320 MHz. When the frequency range in which the RU is located is described by using 80 MHz as a granularity, this may be described as follows: The frequency range in which the 484-tone RU is located is the second 80 MHz in the 320 MHz.

The actual frequency range covered by the RU is the same as or equal to the occupied frequency range. For example, an actual frequency range covered by a 484-tone RU is 40 MHz, and the 40 MHz is in third 40 MHz in 320 MHz. When the frequency range in which the RU is located is described by using 40 MHz as a granularity, this may be described as follows: The frequency range in which the 484-tone RU is located is the third 40 MHz in the 320 MHz.

The actual frequency range covered by the RU is the same as or equal to the occupied frequency range. For example, an actual frequency range covered by a 996-tone RU is 80 MHz, and the 80 MHz is in second 80 MHz in 320 MHz. When the frequency range in which the RU is located is described by using 80 MHz as a granularity, this may be described as follows: The frequency range in which the 996-tone RU is located is the second 80 MHz in the 320 MHz.

The actual frequency range covered by the RU is greater than the occupied frequency range. For example, an actual frequency range covered by a 996-tone RU is 80 MHZ, and the 80 MHz is in second 80 MHz in 320 MHz. When the frequency range in which the RU is located is described by using 40 MHz as a granularity, this may be described as follows: The frequency range in which the 996-tone RU is located is third (or fourth) 40 MHz in the 320 MHz.

For the MRU, the frequency band range indication and the frequency band range may be in a relationship described in any one of the following aspects:

According to a first aspect, the frequency band range indication is used to indicate a frequency band range in which a smallest RU in the MRU is located.

That is, the resource unit indication is used to indicate the multi-resource unit MRU allocated to the station, and the frequency band range indication is used to indicate the frequency band range in which the smallest RU in the MRU indicated by the resource unit indication is located; and then the station determines the allocated MRU based on the frequency band range indication and the resource unit indication.

In another implementation, the resource unit indication is used to indicate the multi-resource unit MRU allocated to the station, and the frequency band range indication is used to indicate a frequency band range in which an RU in the MRU indicated by the resource unit indication is located; and the station determines the allocated MRU based on the frequency band range indication and the resource unit indication. The RU in the MRU may be the foregoing smallest RU in the MRU, a largest RU in the MRU, or an RU of a preset size in the MRU. In the following embodiments, description is provided by using the smallest RU as an example. In this implementation, the frequency band range indication may indicate a frequency band range, and the frequency band range is the frequency band range in which the RU in the MRU is located. In this way, the resource unit indication can indicate a larger number of MRU entries when there is a same number of bits, or when the resource unit indication needs to indicate a same number of MRU entries, a smaller number of indexes are required, and a larger number of indexes may be reserved to indicate other information.

A granularity used for the frequency band range indication to indicate the frequency band range in which the RU in the MRU is located may be 40 MHz, 80 MHZ, 160 MHZ, 240 MHz, or 320 MHz. In other words, in an embodiment, the frequency band range indication is used to indicate 80 MHz in which the RU in the MRU is located. In another embodiment, the frequency band range indication is used to indicate 40 MHz in which the RU in the MRU is located. In still another embodiment, the frequency band range indication is used to indicate 160 MHz in which the RU in the MRU is located. In still another embodiment, the frequency band range indication is used to indicate 240 MHz in which the RU in the MRU is located. In still another embodiment, the frequency band range indication is used to indicate 320 MHz in which the RU in the MRU is located.

In this application, a resource unit indication method 110 is described by using an example in which the frequency band range indication is used to indicate the 80 MHz in which the RU in the MRU is located, and a resource unit indication method 120 is described by using an example in which the frequency band range indication is used to indicate the 40 MHz in which the RU in the MRU is located. Another granularity of the frequency band range is not described to avoid redundancy. However, a related embodiment may be obtained by a person skilled in the art based on this implementation, the resource unit indication method 110, and the resource unit indication method 120.

According to a second aspect, the frequency band range indication is used to indicate a frequency band range, in a bandwidth, that is not related to the MRU.

In an implementation, the resource unit indication is used to indicate the multi-resource unit MRU allocated to the station, and the frequency band range indication is used to indicate a frequency band range, in the bandwidth, in which some or all of resource units RUs other than the MRU are located; and then the station determines the allocated MRU based on the frequency band range indication and the resource unit indication.

In another implementation, the frequency band range indication is used to indicate a frequency band range in the bandwidth, the resource unit indication is used to indicate the MRU allocated to the station, and the MRU includes remaining resource units RUs in a frequency band range, in the bandwidth, other than the frequency band range indicated by the frequency band range indication; and the station determines the allocated MRU based on the frequency band range indication and the resource unit indication.

It may be learned that in this implementation, the band range indication indicates a frequency band range, and the frequency band range is a frequency band range that is not related to the MRU indicated by the resource unit indication. In this way, the station learns of a frequency band range related to the MRU in the bandwidth. In addition, the resource unit indication can indicate a larger number of MRU entries when there is a same number of bits, or when the resource unit indication needs to indicate a same number of MRU entries, a smaller number of indexes are required, and a larger number of indexes may be reserved to indicate other information.

In this application, a resource unit indication method 210 is described by using an example in which "the frequency band range indication is used to indicate the frequency band range, in the bandwidth, in which some or all of the resource units RUs other than the MRU are located", and a resource unit indication method 220 is described by using an example in which "the MRU includes the remaining resource units RUs in the frequency band range, in the bandwidth, other than the frequency band range indicated by the frequency band range indication".

According to a third aspect, the frequency band range indicated by the frequency band range indication is variable, and is related to a type of the MRU indicated by the resource unit indication.

A granularity of the frequency band range indicated by the frequency band range indication is related to the MRU indicated by the resource unit indication. Optionally, the frequency band range indication is used to indicate a frequency band range in which the MRU indicated by the resource unit indication is located. Therefore, the frequency band range indicated by the frequency band range indication is variable, and is not at the fixed granularity of the frequency band range described in the first aspect.

In this implementation, the frequency band range indication can indicate the frequency band range in which the MRU indicated by the resource unit indication is located. In this way, the station learns of a frequency band range related to the MRU in a bandwidth. In addition, the resource unit indication can indicate a larger number of MRU entries when there is a same number of bits, or when the resource unit indication needs to indicate a same number of MRU entries, a smaller number of indexes are required, and a larger number of indexes may be reserved to indicate other information.

In this application, a resource unit indication method 310 is described by using an example in which "the frequency band range indication is used to indicate the frequency band range in which the MRU indicated by the resource unit indication is located".

It may be learned that in the resource unit indication methods in the foregoing three aspects, when receiving the corresponding resource unit allocation subfield, the station may learn of the MRU, for example, a location of the MRU, by reading the first part of bits and the second part of bits.

This application further provides a resource unit indication method according to a fourth aspect. In this aspect, a first part of bits and a second part of bits may be combined into one part for indication. That is, when a resource unit allocated to a station is indicated, all bits in a resource unit allocation subfield are used for indication, and distinction is no longer made for the first part of bits used to indicate a frequency range and the second part of bits used to indicate a resource unit. For example, the resource unit allocation subfield corresponding to the station occupies N bits, and an index indicated by the N bits directly represents an absolute location of an RU or a multi-resource unit MRU in a bandwidth; and then the station may learn of the allocated RU/MRU by querying a table based on the index indicated by the N bits. Therefore, in this application, a resource unit indication method 410 is described by using an example in which "the index indicated by the N bits directly represents the absolute location of the RU or the multi-resource unit MRU in the bandwidth".

The following separately describes the resource unit indication method 110, the resource unit indication method 120, the resource unit indication method 210, the resource unit indication method 220, the resource unit indication method 310, and the resource unit indication method 410 with reference to the accompanying drawings.

Embodiment 1: The resource unit indication method 110 is mainly described in Embodiment 1.

Figure 6:
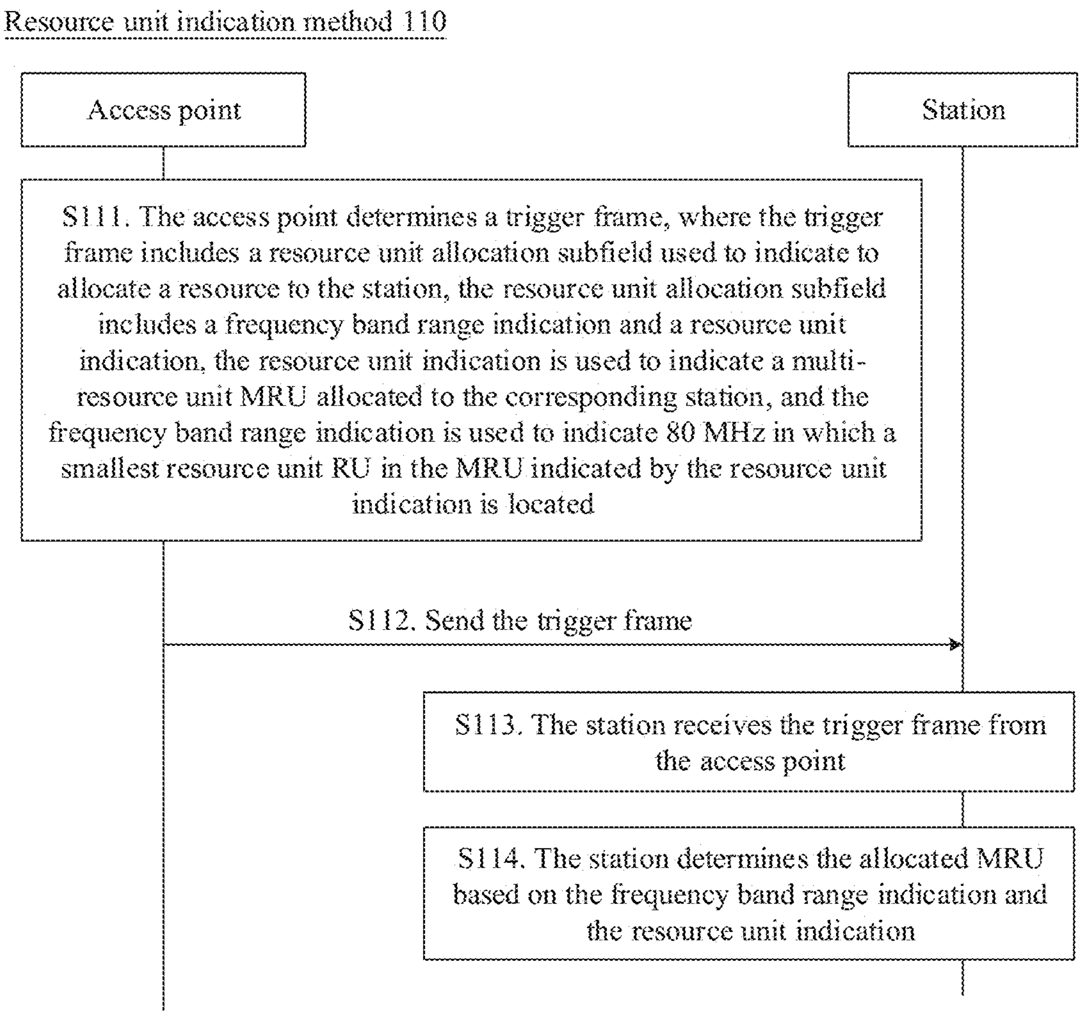
FIG. 6 is a schematic flowchart of a resource unit indication method 110 according to an embodiment of this application.

FIG. 6 is a schematic flowchart of the resource unit indication method 110 according to this embodiment of this application. As shown in FIG. 6, the resource unit indication method 110 may include but is not limited to the following steps.

S111. An access point determines a trigger frame.

The trigger frame includes a resource unit allocation subfield used to indicate to allocate a resource to a station. The resource unit allocation subfield includes a frequency band range indication and a resource unit indication. The resource unit indication is used to indicate a multi-resource unit MRU allocated to the corresponding station. The frequency band range indication is used to indicate 80 MHz in which a smallest resource unit RU in the MRU indicated by the resource unit indication is located.

S112. The access point sends the trigger frame.

S113. The station receives the trigger frame from the access point.

S114. The station determines the allocated MRU based on the frequency band range indication and the resource unit indication.

In an implementation, that the station determines the allocated MRU based on the frequency band range indication and the resource unit indication in step S114 includes: The station determines the 80 MHz indicated by the frequency band range indication (in other words, the frequency band range indication may indicate a value, namely, 80 MHz, of the frequency band range and a location in a bandwidth), may learn that the smallest RU in the MRU indicated by the resource unit indication is in the 80 MHz, and then learns of the allocated MRU with reference to an index indicated by the resource unit indication.

For example, the MRU indicated by the resource unit indication is a (52+26)-tone RU, and the frequency band range indicated by the frequency band range indication is 80 MHz in which a 26-tone RU in the (52+26)-tone RU is located. Alternatively, the MRU indicated by the resource unit indication is a (106+26)-tone RU, and the frequency band range indicated by the frequency band range indication is 80 MHz in which a 26-tone RU in the (106+26)-tone RU is located. Alternatively, the MRU indicated by the resource unit indication is a (484+242)-tone RU, and the frequency band range indicated by the frequency band range indication is 80 MHz in which a 242-tone RU in the (484+242)-tone RU is located. Alternatively, the MRU indicated by the resource unit indication is a (996+484)-tone RU, and the frequency band range indicated by the frequency band range indication is 80 MHz in which a 484-tone RU in the (996+484)-tone RU is located. Alternatively, the MRU indicated by the resource unit indication is a (2*996+484)-tone RU, and the frequency band range indicated by the frequency band range indication is 80 MHz in which a 484-tone RU in the (2*996+484)-tone RU is located. Alternatively, the MRU indicated by the resource unit indication is a 3*996-tone RU, and the frequency band range indicated by the frequency band range indication is 80 MHz in which one 996-tone RU in the 3*996-tone RU is located. Alternatively, the MRU indicated by the resource unit indication is a (3*996+484)-tone RU, and the frequency band range indicated by the frequency band range indication is 80 MHz in which a 484-tone RU in the (3*996+484)-tone RU is located. Alternatively, the MRU indicated by the resource unit indication is a (996+484+242)-tone RU, and the frequency band range indicated by the frequency band range indication is 80 MHz in which a 242-tone RU in the (996+484+242)-tone RU is located.

It is assumed that the resource unit allocation subfield includes 9 bits, and the frequency band range indication is a first bit and a second bit, denoted as B0 and B1, in the resource unit allocation subfield. In this case, B0 and B1 indicate 80 MHz in 320 MHz. It is assumed that Table 3 shows 80 MHz frequency band ranges that need to be indicated by the frequency band range indication (B0 and B1), to indicate the 80 MHz in which the smallest RU in the MRU indicated by the resource unit indication is located. The 80 MHz frequency band ranges in the 320 MHz are sequentially referred to as first 80 MHZ, second 80 MHz, third 80 MHz, and fourth 80 MHz in ascending order of frequencies.

As shown in Table 3, when B0B1 is 00, it indicates that the frequency band range indicated by the frequency band range indication is the first 80 MHz in the 320 MHz; when B0B1 is 01, it indicates that the frequency band range indicated by the frequency band range indication is the second 80 MHz in the 320 MHz; when B0B1 is 10, it indicates that the frequency band range indicated by the frequency band range indication is the third 80 MHz in the 320 MHz; and when B0B1 is 11, it indicates that the frequency band range indicated by the frequency band range indication is the fourth 80 MHz in the 320 MHz.

TABLE 3

| Frequency band ranges that need to be indicated by the frequency band range indication (B0 and B1) | |
|---|---|
| B0 and B1 in the resource unit allocation subfield (B0 and B1 of RU Allocation subfield) | Meaning |
| 00 | First 80 MHz in the 320 MHz |
| 01 | Second 80 MHz in the 320 MHz |
| 10 | Third 80 MHz in the 320 MHz |
| 11 | Fourth 80 MHz in the 320 MHz |

The resource unit indication is a third bit to a ninth bit, denoted as B2 to B8, in the resource unit allocation subfield. In this case, with reference to the frequency band range indication and RUs or MRUs that need to be indicated, the RUs or MRUs that need to be indicated by the resource unit indication may be shown in Table 4. Values of B2 to B8 are in the first column in Table 4, and may be referred to as indexes indicated by the resource unit indication. The second column in Table 4 indicates a resource unit size corresponding to each index. The third column in Table 4 indicates the number of indexes, namely, the number of entries, corresponding to each resource unit size. In table 4, a corresponding RU or MRU may be determined with reference to the frequency band range indication for each index.

TABLE 4

| Entries that need to be indicated by the resource unit indication (B2 to B8) | | |
|---|---|---|
| B8 to B2 in the resource unit allocation subfield (B8-B2 of RU Allocation subfield) | Resource unit size (RU size) | Number of entries (Number of entries) |
| 0-35 | 26-tone RU | 36 |
| 36-51 | 52-tone RU | 16 |
| 52-59 | 106-tone RU | 8 |
| 60-63 | 242-tone RU | 4 |
| 64-65 | 484-tone RU | 2 |
| 66 | 996-tone RU | 1 |
| 67 | 2 × 996-tone RU | 1 |
| 68 | 4 × 996-tone RU | 1 |
| 69-80 | (52 + 26)-tone RU | 12 |
| 81-88 | (106 + 26)-tone RU | 8 |
| 89-92 | (484 + 242)-tone RU | 4 |
| 93-94 | (996 + 484)-tone RU | 2 |
| 95-98 | (2 × 996 + 484)-tone RU | 4 |
| 99-101 | (3 × 996)-tone RU | 3 |
| 102-103 | (3 × 996 + 484)-tone RU | 2 |
| 104-107 | (996 + 484 + 242)-tone RU | 4 |

As shown in FIG. 3, there are 36 locations for the 26-tone RU in the 80 MHz. Therefore, based on the 80 MHz indicated by the frequency band range indication, the resource unit indication indicates one of the indexes 0 to 35 shown in Table 4, to indicate one corresponding 26-tone RU in the 80 MHz.

Optionally, in 802.11ax, there are 37 locations for the 26-tone RU in the 80 MHz. Therefore, in a table corresponding to the resource unit indication in 802.11ax, there are 37 indexes, namely, the index 0 to the index 36, used to indicate the 26-tone RU. Therefore, in this application, to implement better compatibility with an 802.11ax device, the index 36 in Table 4 may be reserved, and is not used to indicate the 52-tone RU, in other words, an index starting from an index 37 is used to indicate another RU/MRU. In this way, the 802.11ax device may continue to read a related entry in Table 4 in this embodiment of this application, so that the technical solution provided in this embodiment of this application is compatible with an existing standard.

As shown in FIG. 3, there are 16 locations for the 52-tone RU in the 80 MHz. Therefore, based on the 80 MHz indicated by the frequency band range indication, the resource unit indication indicates one of the indexes 36 to 51 shown in Table 4, to indicate one corresponding 52-tone RU in the 80 MHz.

As shown in FIG. 3, there are eight locations for the 106-tone RU in the 80 MHz. Therefore, based on the 80 MHz indicated by the frequency band range indication, the resource unit indication indicates one of the indexes 52 to 59 shown in Table 4, to indicate one corresponding 52-tone RU in the 80 MHz.

As shown in FIG. 3, there are four locations for the 242-tone RU in the 80 MHz. Therefore, based on the 80 MHz indicated by the frequency band range indication, the resource unit indication indicates one of the indexes 60 to 63 shown in Table 4, to indicate one corresponding 242-tone RU in the 80 MHz.

As shown in FIG. 3, there are two locations for the 484-tone RU in the 80 MHz. Therefore, based on the 80 MHz indicated by the frequency band range indication, the resource unit indication indicates one of the indexes 64 and 65 shown in Table 4, to indicate one corresponding 484-tone RU in the 80 MHz.

The frequency band range indication may indicate 80 MHz in which the 996-tone RU is located. Therefore, the resource unit indication needs only one index 66 to indicate the 996-tone RU. Correspondingly, the station determines, based on the frequency band range indication, the 80 MHz in which the smallest RU in the MRU is located, and then the station may learn, with reference to information indicating that an RU size corresponding to the index 66 indicated by the resource unit indication is a 996-tone RU, that the 996-tone RU corresponding to the 80 MHz is the allocated RU.

A manner of indicating a single RU is described above, and a manner of indicating an MRU is described below. In schematic diagrams of MRUs shown in FIG. 7 to FIG. 14 in this specification, each MRU in each accompanying drawing includes an RU padded with vertical lines. In other words, the RU padded with vertical lines represents an RU included in the MRU. For example, in three (26+52)-tone RUs shown in FIG. 7, a (26+52)-tone RU shown in the first row includes a second 26-tone RU padded with vertical lines and a second 52-tone RU padded with vertical lines. In addition, in this specification, "*" and "x" represent a same meaning, and are not distinguished. For example, a 2*996-tone RU may be represented as a 2×996-tone RU.

The 2*996-tone RU cannot span two 160 MHz frequency band ranges, in other words, a frequency band range in which the 2*996-tone RU is located can only be primary 160 MHz or secondary 160 MHz. Therefore, the frequency band range indication may indicate 80 MHz in which one 996-tone RU in the 2*996-tone RU is located, and a location of the other 996-tone RU in the 2*996-tone RU may be learned of. Therefore, the resource unit indication needs only one index 67 to indicate the 2*996-tone RU with reference to the frequency band range indication. Correspondingly, the station determines, based on the frequency band range indication, the 80 MHz in which the smallest RU in the MRU is located, and then the station may learn, with reference to information indicating that an RU size corresponding to an index, for example, 67, indicated by the resource unit indication is a 2*996-tone RU, that the primary 160 MHz or the secondary 160 MHz in which the 80 MHz is located is allocated to the 2*996-tone RU.

There is only one 4*996-tone RU in the 320 MHz. Therefore, the resource unit indication may indicate one index 68, so that the station may learn that the allocated RU is the 4*996-tone RU.

Figure 7:
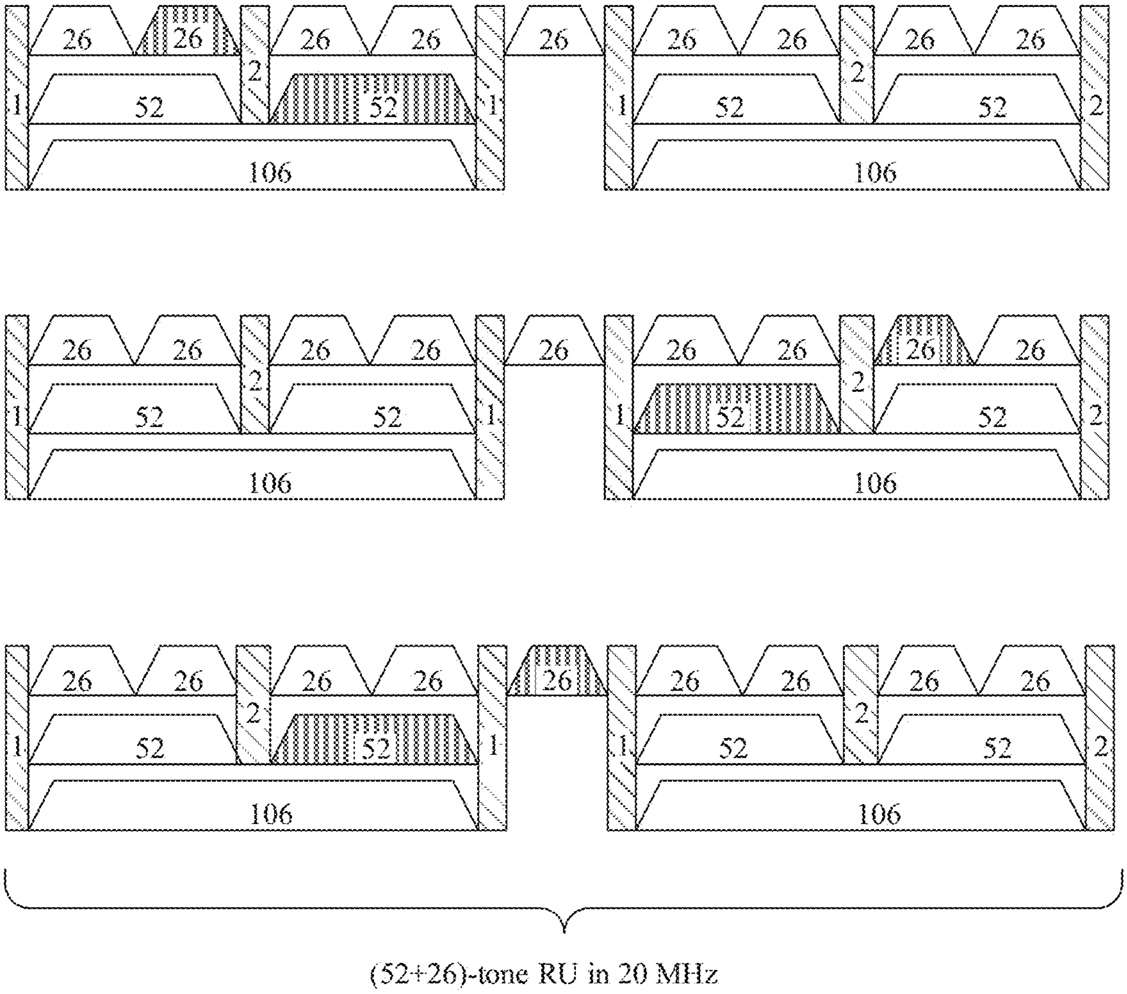
FIG. 7 is a schematic diagram of a (52+26)-tone RU in 20 MHz according to an embodiment of this application.

There are three combinations shown in FIG. 7 for the (52+26)-tone RU in 20 MHz: a (52+26)-tone RU including a second 52-tone RU and a second 26-tone RU in the 20 MHz, a (52+26)-tone RU including a second 52-tone RU and a fifth 26-tone RU in the 20 MHz, and a (52+26)-tone RU including a third 52-tone RU and an eighth 26-tone RU. No combination can be performed for the (52+26)-tone RU by crossing 20 MHz, and therefore there are 12 (namely, 4*3) combinations for the (52+26)-tone RU in the 80 MHz. Therefore, based on the 80 MHz in which the 26-tone RU is located and that is indicated by the frequency band range indication, the resource unit indication further needs to indicate one of the indexes 69 to 80, to indicate one corresponding (52+26)-tone RU in the 80 MHz. The indexes 69 to 80 in ascending order may be in a one-to-one correspondence with start frequencies of the 12 (52+26)-tone RUs in ascending order.

Figure 8:
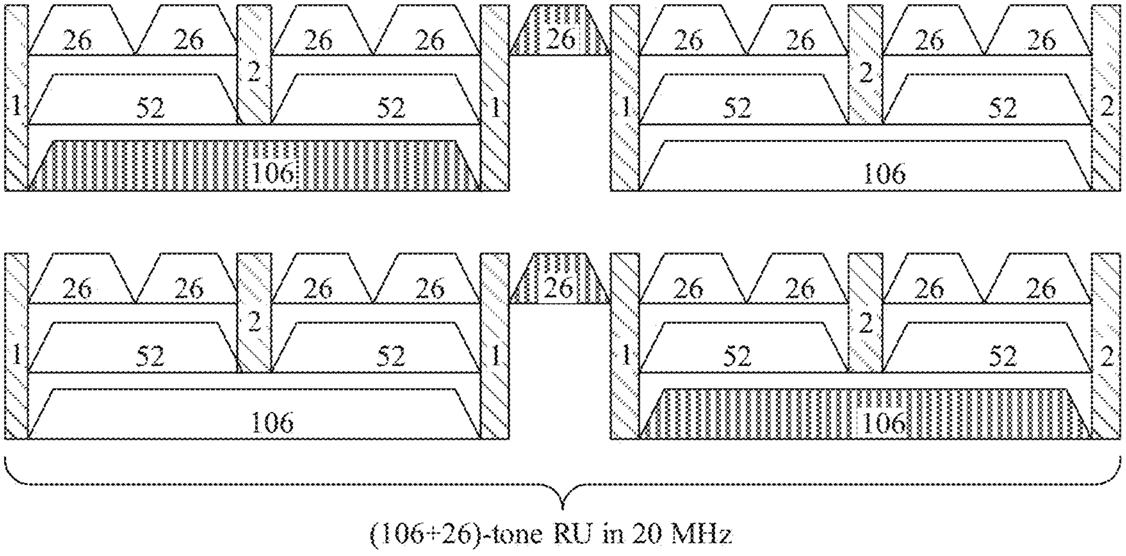
FIG. 8 is a schematic diagram of a (106+26)-tone RU in 20 MHz according to an embodiment of this application.

There are two combinations shown in FIG. 8 for the (106+26)-tone RU in 20 MHz: a (106+26)-tone RU including a first 106-tone RU and a fifth 26-tone RU in the 20 MHz and a (106+26)-tone RU including a second 106-tone RU and a fifth 26-tone RU in the 20 MHz. Therefore, there are eight (namely, 4*2) combinations for the (106+26)-tone RU in the 80 MHz. Therefore, based on the 80 MHz in which the 26-tone RU is located and that is indicated by the frequency band range indication, the resource unit indication further needs to indicate one of the indexes 81 to 88, to indicate one corresponding (106+26)-tone RU in the 80 MHz. The indexes 81 to 88 in ascending order may be in a one-to-one correspondence with start frequencies of the eight (106+26)-tone RUs in ascending order.

Figure 9:
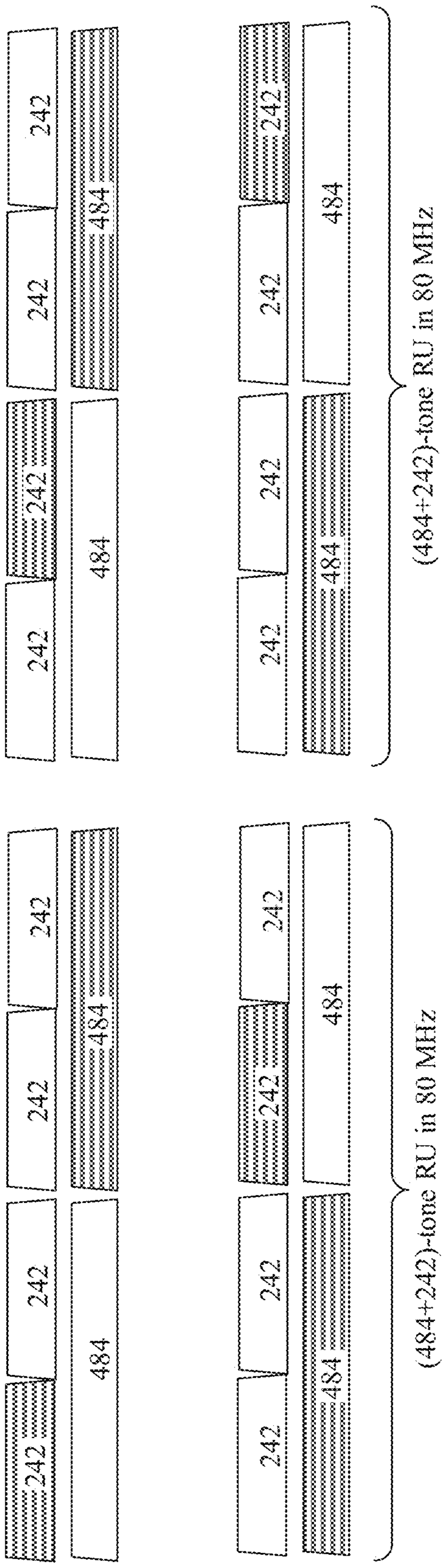
FIG. 9 is a schematic diagram of a (484+242)-tone RU in 80 MHz according to an embodiment of this application.

There are four combinations shown in FIG. 9 for the (484+242)-tone RU in the 80 MHz: a (484+242)-tone RU including a second 484-tone RU and a first 242-tone RU in the 80 MHz, a (484+242)-tone RU including a second 484-tone RU and a second 242-tone RU in the 80 MHz, a (484+242)-tone RU including a first 484-tone RU and a third 242-tone RU in the 80 MHz, and a (484+242)-tone RU including a first 484-tone RU and a fourth 242-tone RU in the 80 MHz. Therefore, based on the 80 MHz in which the 242-tone RU is located and that is indicated by the frequency band range indication, the resource unit indication further needs to indicate one of the indexes 89 to 92, to indicate one corresponding (484+242)-tone RU in the 80 MHz. The indexes 89 to 92 in ascending order may be in a one-to-one correspondence with start frequencies of the four (484+242)-tone RUs in ascending order.

Figure 10:
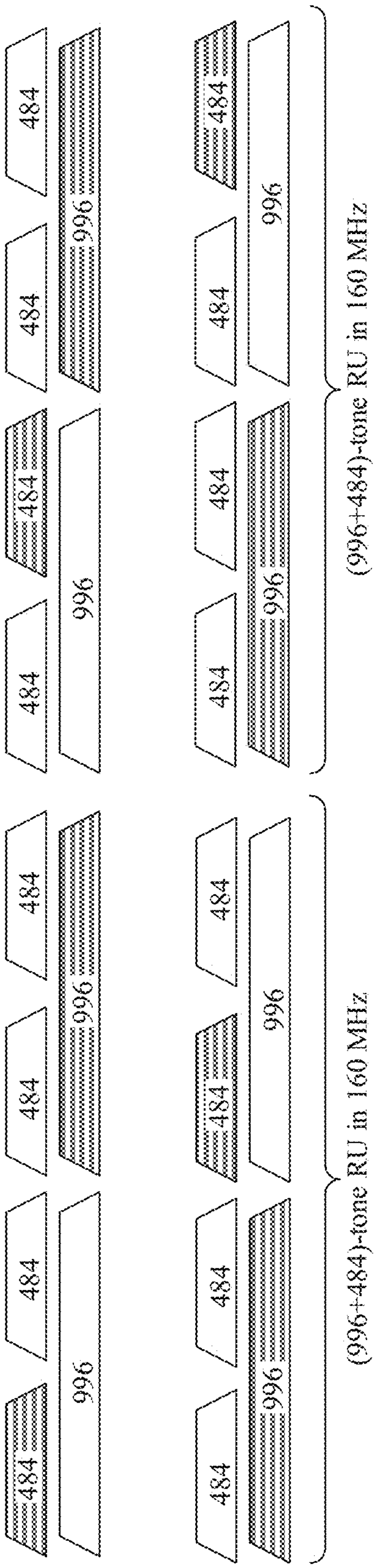
FIG. 10 is a schematic diagram of a (996+484)-tone RU in 160 MHz according to an embodiment of this application.
Figure 11:
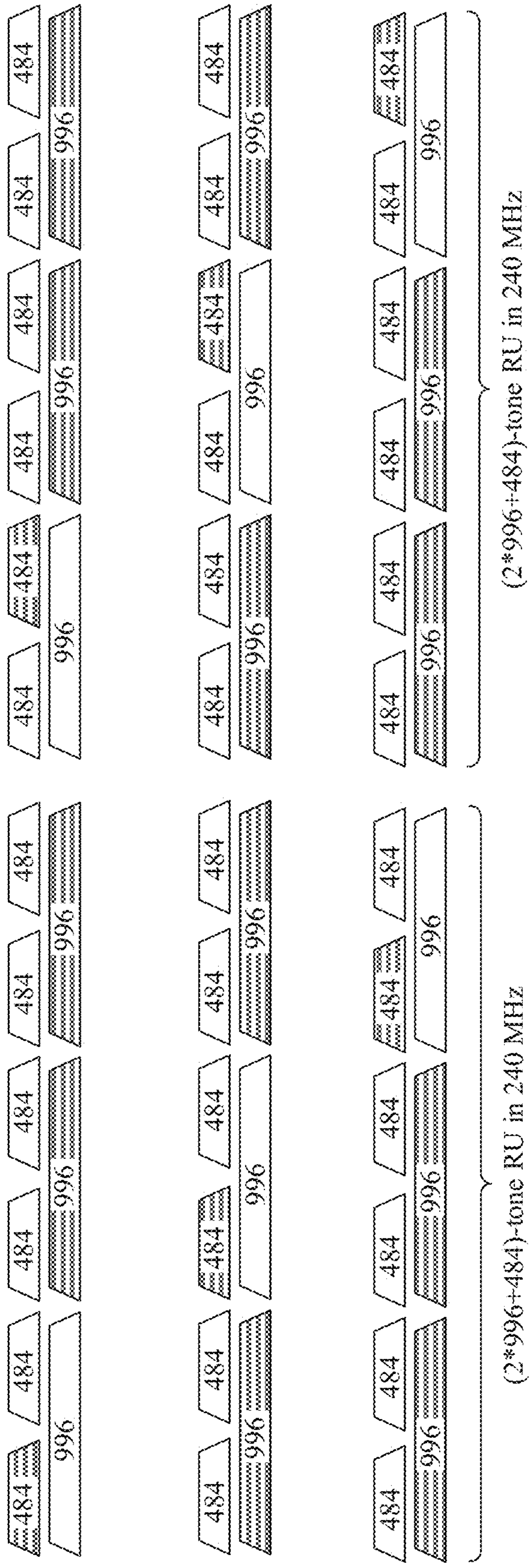
FIG. 11 is a schematic diagram of a (2*996+484)-tone RU in 240 MHz according to an embodiment of this application.

The (996+484)-tone RU may be located in primary 160 MHz or secondary 160 MHz, and therefore there are four combinations shown in FIG. 10 for the (996+484)-tone RU in the 160 MHz: a (996+484)-tone RU including a first 484-tone RU and a second 996-tone RU in the 160 MHz, a (996+484)-tone RU including a second 484-tone RU and a second 996-tone RU in the 160 MHz, a (996+484)-tone RU including a third 484-tone RU and a first 996-tone RU in the 160 MHZ, and a (996+484)-tone RU including a fourth 484-tone RU and a first 996-tone RU in the 160 MHz. Therefore, based on the 80 MHz in which the 484-tone RU is located and that is indicated by the frequency band range indication, the station may directly learn of a location of the 996-tone RU in the (996+484)-tone RU. Therefore, the resource unit indication further needs to indicate one of the indexes 93 and 94, to indicate a location of the 484-tone RU in the (996+484)-tone RU in the 80 MHz. There are two locations for the 484-tone RU in the 80 MHz, and therefore the resource unit indication corresponds to two entries.

In this way, for a side of the access point, the frequency band range indication may indicate the 80 MHz in which the 484-tone RU in the (996+484)-tone RU is located, and the resource unit indication may indicate the index 93 or the index 94. Correspondingly, after receiving the resource unit allocation subfield, the station may determine the allocated (996+484)-tone RU based on the 80 MHz indicated by the frequency band range indication and with reference to the location, in the 80 MHZ, of the 484-tone RU corresponding to the index value indicated by the resource unit indication.

For example, it is assumed that the index 93 corresponds to a first 484-tone RU in the 80 MHz indicated by the frequency range indication, the index 94 corresponds to a second 484-tone RU in the 80 MHz indicated by the frequency range indication, and the 160 MHz shown in FIG.

10 is primary 160 MHz in 320 MHz. In this way, with reference to Table 3 and Table 4, in a resource unit allocation subfield corresponding to a first (996+484)-tone RU in the first row in FIG. 10, the frequency range indication is 00, and the resource unit indication is 93; in a resource unit allocation subfield corresponding to a second (996+484)-tone RU in the first row in FIG. 10, the frequency range indication is 00, and the resource unit indication is 94; in a resource unit allocation subfield corresponding to a first (996+484)-tone RU in the second row in FIG. 10, the frequency range indication is 01, and the resource unit indication is 93; and in a resource unit allocation subfield corresponding to a second (996+484)-tone RU in the second row in FIG. 10, the frequency range indication is 01, and the resource unit indication is 94.

The (2*996+484)-tone RU is transmitted in 240 MHZ, and therefore can exist only in 240 MHz formed by puncturing lowest or highest 80 MHz in the 320 MHz. There are six combinations shown in FIG. 11 for the (2*996+484)-tone RU in the 240 MHz: a (2*996+484)-tone RU including a first 484-tone RU, a second 996-tone RU, and a third 996-tone RU in the 240 MHz, a (2*996+484)-tone RU including a second 484-tone RU, a second 996-tone RU, and a third 996-tone RU in the 240 MHz, a (2*996+484)-tone RU including a third 484-tone RU, a first 996-tone RU, and a third 996-tone RU in the 240 MHz, a (2*996+484)-tone RU including a fourth 484-tone RU, a first 996-tone RU, and a third 996-tone RU in the 240 MHZ, a (2*996+484)-tone RU including a fifth 484-tone RU, a first 996-tone RU, and a second 996-tone RU in the 240 MHZ, and a (2*996+484)-tone RU including a sixth 484-tone RU, a first 996-tone RU, and a second 996-tone RU in the 240 MHz. Based on the 80 MHz in which the 484-tone RU in the (2*996+484)-tone RU is located and that is indicated by the frequency band range indication, there are two possible locations for the 484-tone RU in the (2*996+484)-tone RU in the 80 MHZ, and there are also two possible locations for the 240 MHz in which the (2*996+484)-tone RU is located. Therefore, the resource unit indication further needs to indicate the indexes 95 to 98, to indicate a corresponding location of the (2*996+484)-tone RU.

In another implementation, based on the 80 MHz in which the 484-tone RU in the (2*996+484)-tone RU is located and that is indicated by the frequency band range indication, there are two possible locations for the 484-tone RU in the (2*996+484)-tone RU in the 80 MHz, and there are three possible locations for the 240 MHz in which the (2*996+484)-tone RU is located. Therefore, the resource unit indication further needs to indicate indexes 95 to 100, to indicate a corresponding location of the (2*996+484)-tone RU.

Figure 12:
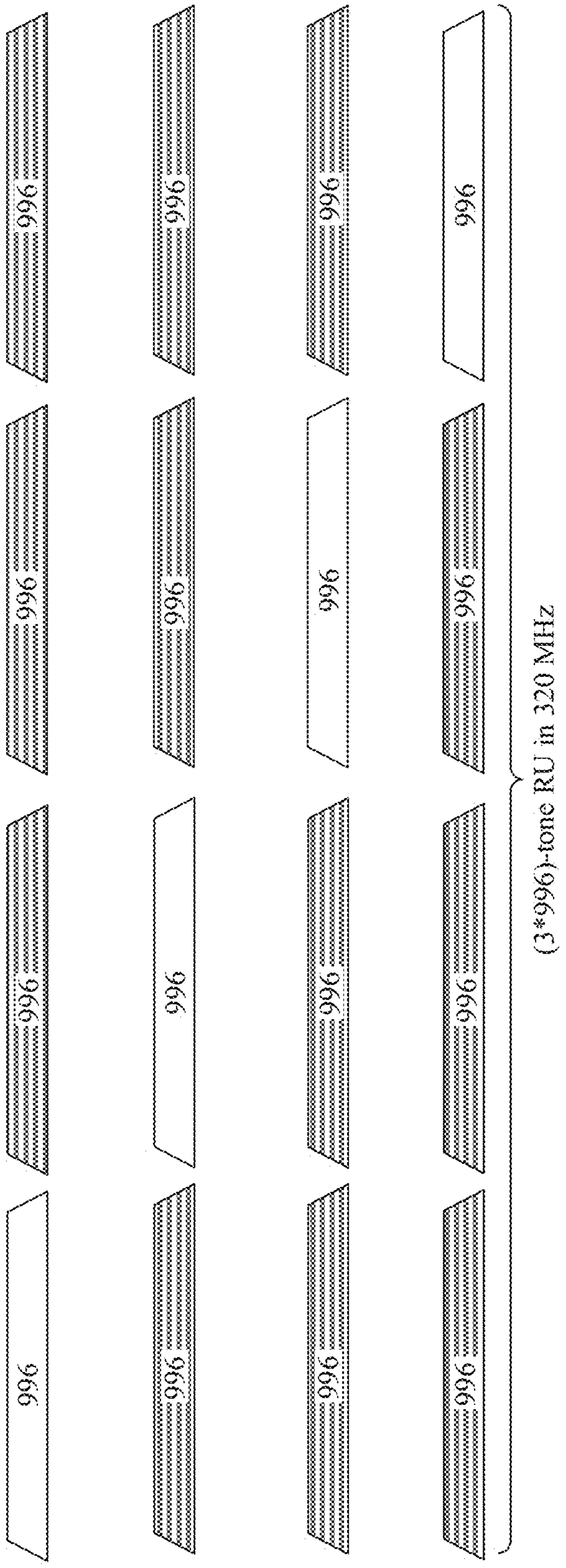
FIG. 12 is a schematic diagram of a 3*996-tone RU in 320 MHz according to an embodiment of this application.

There are four combinations shown in FIG. 12 for the 3*996-tone RU in the 320 MHz: a combination of a second 996-tone RU to a fourth 996-tone RU in the 320 MHz, a combination of a first 996-tone RU, a third 996-tone RU, and a fourth 996-tone RU in the 320 MHz, a combination of a first 996-tone RU, a second 996-tone RU, and a fourth 996-tone RU in the 320 MHZ, and a combination of a first 996-tone RU to a third 996-tone RU in the 320 MHz. Therefore, based on the 80 MHz in which the 996-tone RU is located and that is indicated by the frequency band range indication, there are three options for the remaining two 996-tone RUs in the 3*996-tone RU in the 320 MHz. Therefore, the resource unit indication further needs to indicate one of the indexes 99 to 101, to indicate a location of the remaining two 996-tone RUs combined with the 996-tone RU corresponding to the 80 MHz in the 320 MHz. The indexes 99 to 101 in ascending order may be in a one-to-one correspondence with start frequencies, in ascending order, of the three 3*996-tone RUs that exist when there are the three options for the remaining two 996-tone RUs.

For example, a size of the MRU indicated by the resource unit indication is a 3*996-tone RU, and indexes indicated by the resource unit indication are in a one-to-one correspondence with start frequencies of optional combinations of the 3*996-tone RU in ascending order. If the access point allocates a 3*996-tone RU shown in the first row shown in FIG. 12 to the station, it may be learned, with reference to Table 3, that B0B1 corresponding to the station needs to be set to 01. It is assumed that the index 99 in Table 4 corresponds to a 3*996-tone RU shown in the third row in FIG. 12, an index 100 corresponds to a 3*996-tone RU shown in the second row in FIG. 12, and the index 101 corresponds to the 3*996-tone RU shown in the first row in FIG. 12. In this case, B2 to B8 need to set to 101. Then, the station learns that an RU size corresponding to an index indicated by B2 to B8 is a 3*996-tone RU, the index indicated by B2 to B8 is 101, and B0B1 indicates that a 996-tone RU in the 3*996-tone RU is a second 996-tone RU in the 320 MHz. Then, the station may learn that the allocated 3*996-tone RU is the 3*996-tone RU shown in the first row in FIG. 12.

Figure 13:
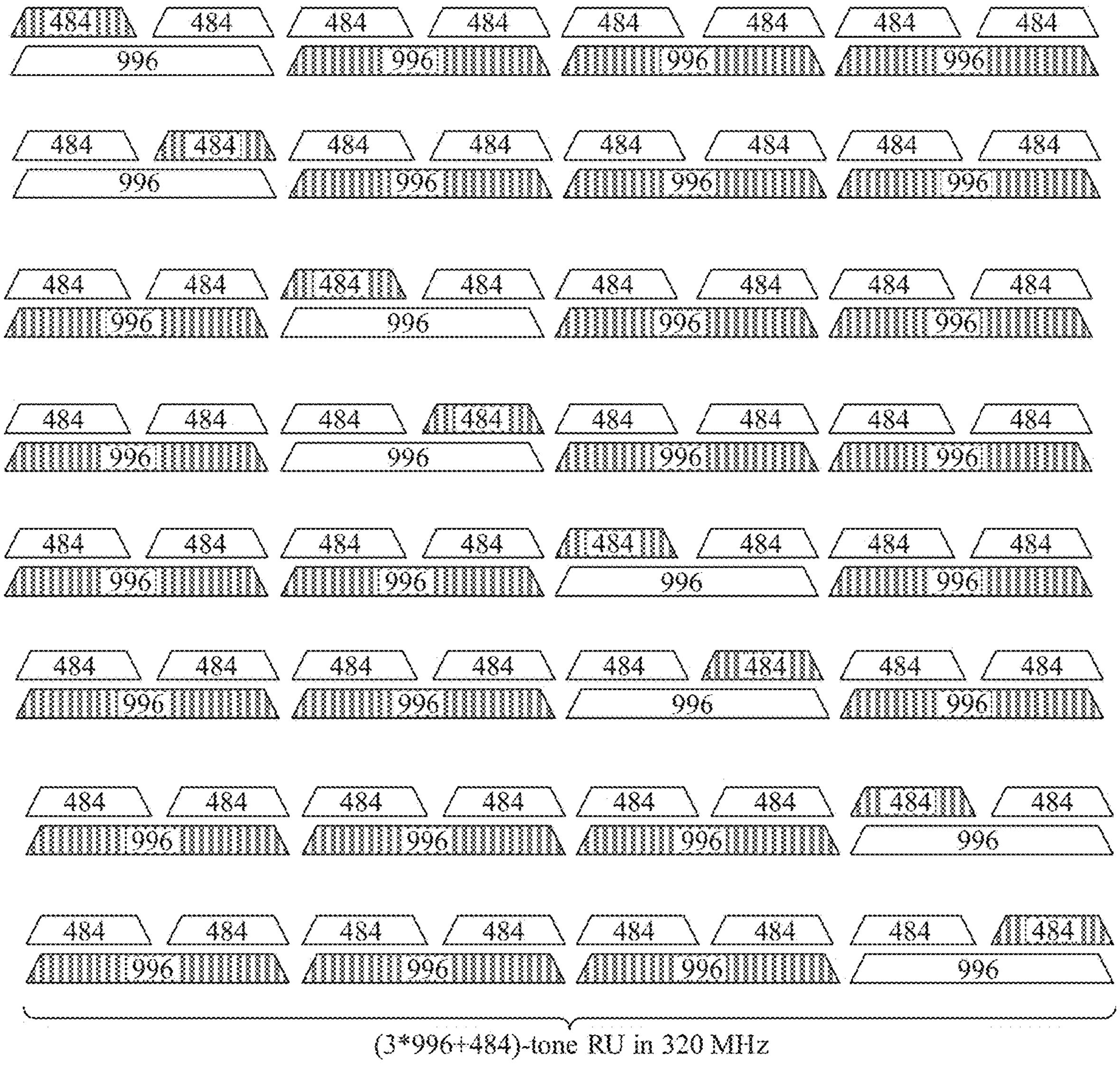
FIG. 13 is a schematic diagram of a (3*996+484)-tone RU in 320 MHz according to an embodiment of this application.

There are eight combinations shown in FIG. 13 for the (3*996+484)-tone RU in the 320 MHz: combinations of one of eight 484-tone RUs in the 320 MHz and three other 996-tone RUs in a frequency band range other than 80 MHz in which the 484-tone RU is located. Therefore, based on the 80 MHz in which the 484-tone RU is located and that is indicated by the frequency band range indication, there is only one option for the three other 996-tone RUs in the 320 MHz, but there are two locations for the 484-tone RU in the 80 MHz. Therefore, the resource unit indication further needs to indicate one of the indexes 102 and 103, to indicate one location of the 484-tone RU in the 80 MHz. The indexes 102 and 103 in ascending order may be in a one-to-one correspondence with start frequencies of the 484-tone RU at the two locations in the 80 MHz in ascending order.

Figure 14:
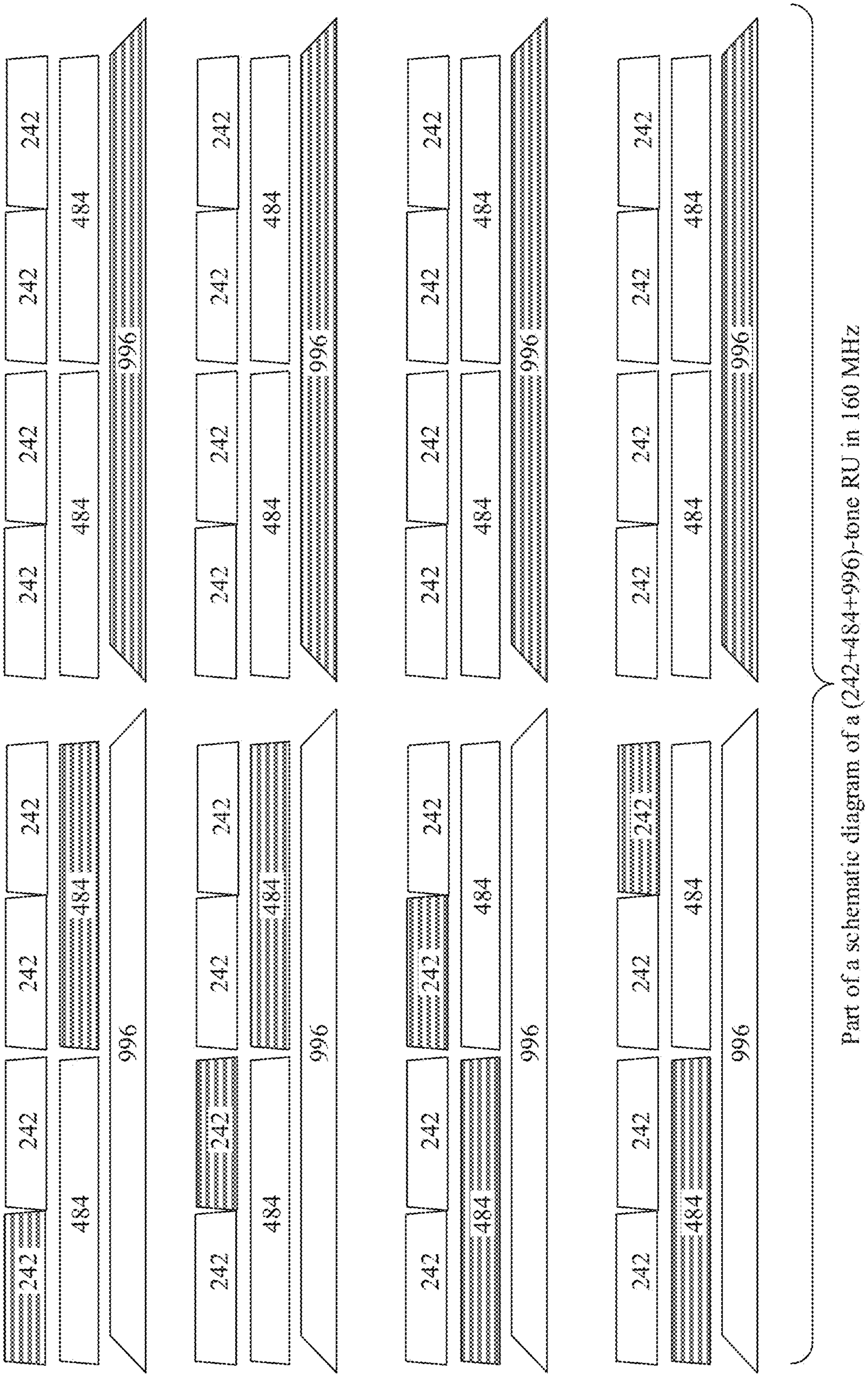
FIG. 14 is a schematic diagram of a (484+242)-tone RU in 80 MHz according to an embodiment of this application.

There are four combinations shown in FIG. 14 for the (484+242)-tone RU in 80 MHz in the 160 MHZ, and therefore there are eight combinations for the (996+484+242)-tone RU in the 160 MHz. Therefore, based on the 80 MHz in which the 242-tone RU is located and that is indicated by the frequency band range indication, there is only one option for a 996-tone RU in a frequency band range other than the 80 MHz in the 160 MHz, but there are four locations for the 242-tone RU in the 80 MHz. Therefore, the resource unit indication further needs to indicate one of the indexes 104 to 107, to indicate one location of the 242-tone RU in the 80 MHz. The indexes 104 to 107 in ascending order may be in a one-to-one correspondence with start frequencies of the 242-tone RU at the four locations in the 80 MHz in ascending order.

It may be learned from the foregoing analysis that the frequency band range in which the smallest RU in the MRU is located can be further notified by using the frequency band range indicated by the frequency band range indication, and therefore this helps the resource unit indication to use a smaller number of indexes to respectively indicate various possible locations of the MRU. For example, as shown in Table 4, the resource unit indication needs only four indexes to respectively indicate the eight combinations of the (996+484+242)-tone RU. For another example, as shown in Table 4, the resource unit indication needs only two indexes to respectively indicate the eight combinations of the (3*996+484)-tone RU.

In comparison with a manner in which the frequency band range indication indicates only lowest 80 MHz related to the MRU, the frequency band range indication in the resource unit indication method 110 may carry more information, in other words, may carry the 80 MHz in which the smallest RU in the MRU is located. For example, if the frequency band range indication indicates only the lowest 80 MHz related to the MRU, the resource unit indication needs four indexes to respectively indicate the four combinations of the (996+484)-tone RU shown in FIG. 10. If the frequency band range indication is used to indicate the 80 MHz in which the smallest RU in the MRU is located, the resource unit indication needs only two indexes to indicate all the combinations of the (996+484)-tone RU, as shown in Table 4. Therefore, the frequency band range indication in the resource unit indication method 110 may carry more information, and this helps the resource unit indication to use a smaller number of indexes to respectively indicate various possible locations of the MRU.

An embodiment of this application further provides a technical solution, and relates to another design of a resource unit allocation subfield (RU Allocation subfield) in a user information field (User Info field) in a trigger frame (Trigger frame). As described in the foregoing embodiment, the RU allocation subfield is designed by using 9 bits, and is specifically implemented in a form of a 7-bit resource unit indication+a 2-bit frequency band range indication. Herein, 2 bits are the frequency band range indication, and are used to indicate a location of specific 80 MHz. The resource unit indication that includes the other 7 bits is used to indicate a specific location of an RU/MRU in a specific 80 MHz case determined by using the 2 bits.

For example, as shown in Table 3, the 2 bits are used to indicate a location of specific 80 MHz at an absolute frequency, where 00 indicates lowest 80 MHz, 01 indicates second lowest 80 MHz, 10 indicates second highest 80 MHz, and 11 indicates highest 80 MHz.

To help a receiving device better identify that a corresponding user information field is an HE/EHT user information field, facilitate compatibility with a previous-generation device (11ax) in the user information field, and son on, a 7-bit+2-bit mode is provided. A primary/secondary location indication method is used for 2 bits, and the 2 bits indicate a location of 80 MHz in which a smallest RU in an RU/MRU is located.

In the foregoing case, when an 80 MHz primary/secondary location indication method is used, there may be following several specific designs for the RU allocation subfield.

The following further describes advantages of using the primary/secondary location indication method. The 2 bits in the primary/secondary indication method are represented by BS and B0 (which may be represented by other letters, for example, B0B1 in the foregoing embodiment, which is only an example herein) herein, where B may be understood as a bit, and S may be understood as a 160 MHz segment. Herein, BS represents primary 160 MHz or secondary 160 MHz. In the case of P160 MHz, B0 represents primary 80 MHz and secondary 80 MHz. In the case of S160 MHz, B0 represents lower 80 MHz and upper 80 MHz. For example, an indication form of the 2 bits (BSB0) may be that 00 indicates the primary (Primary) 80 MHz (P80 MHz), 01 indicates the secondary (Secondary) 80 MHz (S80 MHz), 10 indicates the lower 80 MHz, which is also referred to as third 80 MHZ, in the secondary 160 MHz (S160 MHz), and 11 indicates the upper 80 MHz, which is also referred to as fourth 80 MHz, in the secondary 160 MHz (S160 MHz). Herein, correspondences between a value of the 2 bits and a meaning are merely examples. In another implementation, the correspondences between the value of the 2 bits and the meaning may be interchanged.

An 11be device may receive an 11be user information field or an 11ax user information field. When a primary/secondary indication case is used, advantages may be brought for identification of a user information field. For example, in a common field part in a trigger frame, a 4-bit bitmap form may be used to respectively indicate the primary 80 MHZ, the secondary 80 MHz, the third 80 MHZ, and the fourth 80 MHz (or 2 bits may be used to indicate only the primary 80 MHz and the secondary 80 MHZ). In such an architecture, the 11be device may learn of, by using BS and B0, 80 MHz to which all or some of RUs allocated to the 11be device belong (this is because in the indication method in this embodiment, 80 MHz in which a smallest RU in an RU/MRU is located may be indicated), and then learn, by using an HE/EHT indication, whether a read user information field is an 11ax user information field or an 11be user information field. For example, if the bitmap is 0011, it indicates that the primary/secondary 80 MHz is for the ax user information field, and the secondary 160 MHz is for the be user information field. In this case, an 11be receiving device may locate specific 80 MHz, for example, the secondary 80 MHz, by using BS and B0. The 80 MHz indicates the ax user information field, and therefore the 11be device may perform interpretation based on the ax user information field. In conclusion, the setting method in which the primary/secondary 80 MHz is used for BS and B0 helps the 11be device identify an HE/EHT TB PPDU.

It should be noted that 0 is usually set at a location of BS in the 11ax user field (there may be a reserved field B39). The 11ax user information field is located in the primary 160 MHz, and therefore BS should also be 0, and the primary 160 MHz is considered by default. In addition, B0 is at a same location in the 11ax user information field and the 11be user information field. Therefore, when the 11be device reads a user information field that is not known to be an HE/EHT user information field, HE/EHT may be distinguished by using BS and B0 and with reference to the foregoing x-bit HE/EHT bitmap. When the 11be user information field indicates the primary/secondary 80 MHz, BS-B0 may be equal to 00 or 01, and when the 11ax user information field indicates the primary/secondary 80 MHz, BS-B0 is equal to 00 or 01. Therefore, mutual compatibility is implemented. In addition, BS and B0 in the 11be user information field may indicate 10 and 11, which indicates the 80 MHz in the secondary 160 MHz.

Embodiment (1) shows a table of a 2-bit correspondence between a primary/secondary indication and an absolute indication.

Embodiment (1) provides a design of a correspondence in Table 4(1). Table 4(1) shows a correspondence between four primary/secondary cases (a, b, c, and d) that are of a location of the primary 80 MHz in 320 MHz and that are indicated by 2 bits and 80 MHz at an absolute frequency indicated by 2 bits. The absolute frequency herein is an absolute location of specific 80 MHz in an entire 320 MHz bandwidth. In the case a, there is consistency with location distribution at the absolute frequency, that is, the primary 80 MHz is in lowest 80 MHz at the absolute frequency. In the case b, the primary 80 MHz is in second lowest 80 MHz at the absolute frequency. In the case c, the primary 80 MHz is in second highest 80 MHz at the absolute frequency. In the case d, the primary 80 MHz is in highest 80 MHz at the absolute frequency. Each row in Table 4(1) indicates values that are indicated by the 80 MHz at the absolute frequency and that correspond to the four primary/secondary distribution cases. For example, in the first row, 00 at the absolute frequency corresponds to a0, b1, c2, and d2 (that is, a value 00 in the case a corresponds to an absolution location 00, a value 01 in the case b corresponds to the absolute location 00, a value 10 in the case c corresponds to the absolute location 00, and a value 10 in the case d corresponds to the absolute location 00). It should be noted that values of the 2 bits and meanings indicated by the 2 bits are merely examples herein. In specific implementation, there may be another correspondence, but there is a mapping relationship between the primary/secondary distribution case and the value indicated by the 80 MHz at the absolute frequency.

In this way, if a receive end device knows a case, for example, the case c, of the device, when a received 2-bit indication is c3 (11), c3 only needs to correspond to an absolute location 01, and then a finally allocated RU/MRU may be learned of by querying Table 4 with reference to the 7-bit resource unit indication in the foregoing embodiment. It is equivalent to that there is an operation of switching the receive end device from a relative location to an absolution location. The receive end device herein may be a non-AP STA.

Table 4(1) that shows the 2-bit correspondence between the primary/secondary indication and the absolute frequency indication is as follows.

TABLE 4(1)

| Absolute frequency (absolute frequency) | Case a in 320 MHz (case a in 320 MHz) | Case b in 320 MHz (case b in 320 MHz) | Case c in 320 MHz (case c in 320 MHz) | Case d in 320 MHz (case d in 320 MHz) |
|---|---|---|---|---|
| Lowest 80 MHz (00) | a0 (00, primary 80) | b1 (01, secondary 80) | c2 (10, 3rd 80 MHz) | d2 (10, 3rd 80 MHz) |
| Second lowest 80 MHz (01) | a1 (01, secondary 80) | b0 (00, primary 80) | c3 (11, 4th 80 MHz) | d3 (11, 4th 80 MHz) |
| Second highest 80 MHz (10) | a2 (10, 3rd 80 MHz) | b2 (10, 3rd 80 MHz) | c0 (00, primary 80) | d1 (01, secondary 80) |
| Highest 80 MHz (11) | a3 (11, 4th 80 MHz) | b3 (11, 4th 80 MHz) | c1 (01, secondary 80) | d0 (00, primary 80) |

Note: BS and B0 herein may indicate 80 MHz in which a smallest RU in an MRU or RU is located, and the primary/secondary location indication method is used. For example, a 3*996-tone RU includes a (2*996+996)-tone RU. In this case, a location of 80 MHz in which a 996-tone RU is located may be indicated herein. For another example, for a (3*996+484)-tone RU, a location of 80 MHz in which a 484-tone RU is located may be indicated.

As described above, in the RU allocation subfield, 2 bits may be used to indicate a location of specific 80 MHz. The indication form may be that 00 indicates the primary 80 MHz, 01 indicates the secondary 80 MHz, 10 indicates the third 80 MHz (lower 80 MHz in S160), and 11 indicates the fourth 80 MHz (upper 80 MHz in S160).

In this embodiment of this application, N is used to represent a ranking 0, 1, 2, or 3 of an absolute frequency corresponding to 80 MHz when the 2 bits in the RU allocation subfield indicate a location of the specific 80 MHz. Herein, 0, 1, 2, and 3 respectively represent lowest 80 MHz, second lowest 80 MHz, second highest 80 MHz, and highest 80 MHz. N may be used to calculate an actual location of an RU in a frequency domain range.

If the 2-bit absolute frequency indication in Table 4(1) is represented by X1 and X0, there is the following correspondence: N=2*X1+X0. If a mapping relationship between N and each of BS and B0 is expressed in a form of a table, Table 4(1) may be equivalently expressed as the following form. In other words, Table 4-A is an equivalent expression form of Table 4(1), and may be obtained without doubt from Table 4(1).

TABLE 4-A

| N | Case a in 320 MHz (case a in 320 MHz) | Case b in 320 MHz (case b in 320 MHz) | Case c in 320 MHz (case c in 320 MHz) | Case d in 320 MHz (case d in 320 MHz) |
|---|---|---|---|---|
| 0 | a0 (00, primary 80) | b1 (01, secondary 80) | c2 (10, 3rd 80 MHz) | d2 (10, 3rd 80 MHz) |

TABLE 4-A-continued

| N | Case a in 320 MHz (case a in 320 MHz) | Case b in 320 MHz (case b in 320 MHz) | Case c in 320 MHz (case c in 320 MHz) | Case d in 320 MHz (case d in 320 MHz) |
|---|---|---|---|---|
| 1 | a1 (01, secondary 80) | b0 (00, primary 80) | c3 (11, $4^{th}$ 80 MHz) | d3 (11, $4^{th}$ 80 MHz) |
| 2 | a2 (10, $3^{rd}$ 80 MHz) | b2 (10, $3^{rd}$ 80 MHz) | c0 (00, primary 80) | d1 (01, secondary 80) |
| 3 | a3 (11, $4^{th}$ 80 MHz) | b3 (11, $4^{th}$ 80 MHz) | c1 (01, secondary 80) | d0 (00, primary 80) |

Table 4-A may alternatively be expressed as Table 4-B (the two tables are completely equivalent, except that the tables are expressed differently, in other words, Table 4-B is an equivalent expression form of Table 4(1) or Table 4-A, and may be obtained without doubt from Table 4(1) or Table 4-A).

TABLE 4-B

| | Primary 160 MHz (BS = 0) | | Secondary 160 MHz (BS = 1) | |
|---|---|---|---|---|
| Different cases (a/b/c/d) | Primary 80 MHz (B0 = 0) | Secondary 80 MHz (B0 = 1) | Lower 80 MHz (B0 = 0) | Upper 80 MHz (B0 = 1) |
| [P80 S80 S160]: case a | N = 0 | N = 1 | N = 2 | N = 3 |
| [S80 P80 S160]: case b | N = 1 | N = 0 | N = 2 | N = 3 |
| [S160 P80 S80]: case c | N = 2 | N = 3 | N = 0 | N = 1 |
| [S160 S80 P80]: case d | N = 3 | N = 2 | N = 0 | N = 1 |

The following describes two design methods for formulating Table 4(1), Table 4-A, or Table 4-B, namely, methods concerning how to express a relationship between each of BS and B0 and each of X1 and X0 and a relationship between N and each of BS and B0 by using a formula. In other words, the following formula is an equivalent expression form of Table 4(1), Table 4-A, or Table 4-B.

In a manner 1, description of primary and secondary locations of 80 MHz and 160 MHz is used, and in a manner 2, division in different cases a/b/c/d is used.

Manner 1: A relationship formula of N=function (BS, B0, C80, C160) is calculated. The following corresponding formulas may be designed.

If there is [P80 S80] in ascending order of frequencies, C80=0. Otherwise, C80=1 (in this case, there is [S80 P80]).

C80 indicates a location relationship between the absolute frequency and each of the primary 80 MHz and the secondary 80 MHz (P80 S80). If a frequency of the primary 80 MHz is lower than that of the secondary 80 MHz, C80-0. Otherwise, C80=1, and in this case, [S80 P80] is expressed.

If there is [P160 S160] in ascending order of frequencies, C160-0. Otherwise, C160=1 (in this case, there is [S160 P160]).

C160 describes a location relationship between the absolute frequency and each of the primary 160 MHz and the secondary 160 MHZ (P160 S160). If a frequency of the primary 160 MHz is lower than that of the secondary 160 MHz, C160=0. Otherwise, C160=1, and [S160 P160] is expressed.

When BS-0, it indicates that a location is in the primary 160 MHz, and when BS=1, it indicates that a location is in the secondary 160 MHz.

In this case, there may be the following formula relationships between each of BS and B0 and each of X1 and X0 (XOR indicates an exclusive OR operation, and a horizontal line above a parameter indicates an inverse operation).

X1 may be calculated as follows: X1=XOR(BS, C160).

A method for calculating X0 is as follows.

When C80 is equal to 0, X0=B0.

When C80 is equal to 1:

when BS is equal to 1, X0=B0 (X0=XOR(B0, $\overline{BS}$)).

when BS is equal to 0, X0-$\overline{B0}$ (X0=XOR(B0, $\overline{BS}$)).

There is X0=XOR(B0, $\overline{BS}$) in either case, and therefore X0 may be written in the following form.

Writing Method 1

If C80=1, X0=XOR(B0, $\overline{BS}$). Otherwise, X0=B0.

Writing method 2

If C80=1 and BS=0, X0=$\overline{B0}$. Otherwise, X0=B0.

Writing Method 3

X0=C80*XOR(B0, $\overline{BS}$)+$\overline{C80}$*B0.

N=2*X1+X0, and therefore the relationship between N and each of BS and B0 may be further expressed. For example, when the writing method 3 is substituted into N, N=2*X1+X0=2*XOR(BS, C160)+C80*XOR(B0, $\overline{BS}$)+$\overline{C80}$*B0.

Manner 2: A relationship formula of N=function (BS, B0, case a/b/c/d) is calculated.

As described above, relationships between N and each of BS and B0 in different cases are summarized, and there are the following formulas.

In the case a, N=2*BS+B0.

In the case b, N=2*BS+XOR(B0, $\overline{BS}$).

In the case c, N=2*$\overline{BS}$+B0.

In the case d, N=2*$\overline{BS}$+XOR(B0, $\overline{BS}$).

For the expression on a right side, the first item is related to X1, and the second item is related to X0.

In conclusion, it should be noted that in the manner 1 and the manner 2, the methods for calculating X1 and X0 (methods concerning how to obtain X1 and X0 based on BS and B0) are provided, and the methods for calculating N based on BS and B0 are also provided. Although the values of N listed in the formula method are 0, 1, 2, and 3, representing an order from the lowest 80 MHz to the highest 80 MHz, other rankings are applicable. For example, when 1, 2, 3, and 4 are used to represent rankings, N may be equal to 2*X1+X0+1, and BS and B0 may be substituted into X1 and X0.

Based on the technical solution described above, a transmit end device indicates a location of specific 80 MHz by using the 2 bits (BS and B0) in the RU allocation subfield. The receive end device obtains, based on the 2 bits (BS and B0) in the RU allocation subfield and the foregoing table or the conversion relationship in the formula, an absolute frequency, indicated by X1 and X0, corresponding to the specific 80 MHz in the 320 MHz, or obtains a ranking N of an absolute frequency corresponding to the specific 80 MHz in the 320 MHz. In implementation of this embodiment of this application, allocation indication of the RU/MRU may be implemented by using minimum indication overheads of the RU allocation subfield.

Embodiment (2): Table 4(1) in Embodiment (1) is directly embedded in Table 4(2).

To further facilitate reading for a device, a 2-bit indication in a primary/secondary location indication method may be directly incorporated into a 9-bit absolute location indication table. That is, a 2-bit 80 MHz absolute location value in an original absolute location table may be replaced with a corresponding relative location value. As shown in the table in Embodiment (1), in the first row, the lowest 80 MHz (00 at the absolute location) corresponds to a0, b1, c2, and d2. There is a similar case in another row. In this way, the device may directly read Table 4(2), and may finally obtain an allocated RU/MRU without reading a resource unit indication after performing mapping and conversion on a bit value.

Based on the foregoing motivation, a 2-bit indication in a 9-bit primary/secondary location indication method may be shown in Table 4(2).

In the primary/secondary location indication method, the 2-bit indication may indicate a location of 80 MHz in which a smallest RU in an RU/MRU is located.

TABLE 4(2)

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| 0-3: 80 MHz segment where the RU is located (80 MHz segment in which the RU is located) | | 0-8 | 20 MHz, 40 MHz, 80 MHz, 160 MHz, and 320 MHz | 26 | RU 1 to RU 9 | 26-tone RU: 11ax: RUs 1-37, where an RU 19 is a DC RU in 80 MHz (11ax: RUs 1-37, where an RU 19 is a DC RU in 80 MHz) 11be: RUs 1-18 in lower 40 MHz and 20-37 in upper 40 MHz, where an RU 19 does not exist (11be: 1-18 in lower 40 MHz and 20-37 in upper 40 MHz, where an RU 19 does not exist or is not defined) (A DC RU represents a direct current RU) |
| | | 9-17 | 40 MHz, 80 MHz, 160 MHz, and 320 MHz | | RU 10 to RU 18 | |
| | | 18 | 80 MHz, 160 MHz, and 320 MHz | | Not defined (not defined) | |
| | | 19-36 | 80 MHz, 160 MHz, and 320 MHz | | RU 20 to RU 37 | |
| | | 37-40 | 20 MHz, 40 MHz, 80 MHz, 160 MHz, and 320 MHz | 52 | RU 1 to RU 4 | Same numbering for 11ax and 11be (same numbering |

TABLE 4(2)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 41-44 | 40 MHz, 80 MHz, 160 MHz, and 320 MHz | | RU 5 to RU 8 | for 11ax and 11be) |
| | | 45-52 | 80 MHz, 160 MHz, and 320 MHz | | RU 9 to RU 16 | |
| | | 53 and 54 | 20 MHz, 40 MHz, 80 MHz, 160 MHz, and 320 MHz | 106 | RU 1 and RU 2 | |
| | | 55 and 56 | 40 MHz, 80 MHz, 160 MHz, and 320 MHz | | RU 3 and RU 4 | |
| | | 57-60 | 80 MHz, 160 MHz, and 320 MHz | | RU 5 to RU 8 | |
| | | 61 | 20 MHz, 40 MHz, 80 MHz, 160 MHz, and 320 MHz | 242 | RU 1 | |
| | | 62 | 40 MHz, 80 MHz, 160 MHz, and 320 MHz | | RU 2 | |
| | | 63 and 64 | 80 MHz, 160 MHz, and 320 MHz | | RU 3 and RU 4 | |
| | | 65 | 40 MHz, 80 MHz, 160 MHz, and 320 MHz | 484 | RU 1 | |
| | | 66 | 80 MHz, 160 MHz, and 320 MHz | | RU 2 | |
| | | 67 | 80 MHz, 160 MHz, and 320 MHz | 996 | RU 1 | |
| BS | 0 | 68 | | Reserved | | |
| | 1 | | 160 MHz and 320 MHz | 2 × 996 | RU 1 | |
| a0, b1, c2, or d2 | | 69 | | Reserved | | Reserved |
| a1, b0, c3, or d3 | | | | | | |
| a2, b2, c0, or d1 | | | | | | |
| a3, b3, c1, or d0 | | | 320 MHz | 4 × 996 | RU 1 | RU 1 |
| 0-3: 80 MHz segment where the RU is located (80 MHz segment in which the RU is located) | | 70-72 | 20 MHz, 40 MHz, 80 MHz, 160 MHz, and 320 MHz | RU 52 + RU 26 | MRU 1 to MRU 3 | MRU 1: RU 2 (26 T) + RU 2 (52 T) - reserved for BW ≥ 80 MHz MRU 2: RU 5 (26 T) + RU 2 (52 T) MRU 3: RU 8 (26 T) + RU 3 (52 T) |

TABLE 4(2)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 73-75 | 40 MHz, 80 MHz, 160 MHz, and 320 MHz | | MRU 4 to MRU 6 | MRU 4: RU 11 (26 T) + RU 6 (52 T) MRU 5: RU 14 (26 T) + RU 6 (52 T) MRU 6: RU 17 (26 T) + RU 7 (52 T) - reserved for BW ≥ 80 MHz |
| | | 76-1 | 80 MHz, 160 MHz, and 320 MHz | | MRU 7-MRU 12 | MRU 7: RU 21 (26 T) + RU 10 (52 T) - reserved MRU 8: RU 24 (26 T) + RU 10 (52 T) MRU 9: RU 27 (26 T) + RU 11 (52 T) MRU 10: RU 30 (26 T) + RU 14 (52 T) MRU 11: RU 33 (26 T) + RU 14 (52 T) MRU 12: RU 36 (26 T) + RU 15 (52 T) - reserved |
| | | 82-83 | 20 MHz, 40 MHz, 80 MHz, 160 MHz, and 320 MHz | RU 106 + RU 26 | MRU 1 and MRU 2 | MRU 1: RU 5 (26 T) + RU 1 (106 T) MRU 2: RU 5 (26 T) + RU 2 (106 T) - reserved for BW ≥ 80 MHz |
| | | 84-85 | 40 MHz, 80 MHz, 160 MHz, and 320 MHz | | MRU 3 and MRU 4 | MRU 3: RU 14 (26 T) + RU 3 (106 T) - reserved for BW ≥ 80 MHz MRU 4: RU 14 (26 T) + RU 4 (106 T) |

TABLE 4(2)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 86-89 | 80 MHz, 160 MHz, and 320 MHz | | MRU 5-MRU 8 | MRU 5: RU 24 (26 T) + RU 5 (106 T) MRU 6: RU 24 (26 T) + RU 6 (106 T) - reserved MRU 7: RU 33 (26 T) + RU 7 (106 T) - reserved MRU 8: RU 33 (26 T) + RU 8 (106 T) |
| | | 90-93 | 80 MHz, 160 MHz, and 320 MHz | RU 484 + RU 242 | MRU 1 to MRU 4 | MRU 1: RU 2 (242 T) + RU 2 (484 T) MRU 2: RU 1 (242 T) + RU 2 (484 T) MRU 3: RU 4 (242 T) + RU 1 (484 T) MRU 4: RU 3 (242 T) + RU 1 (484 T) |
| a0, b1, c2, d2, a2, b2, c0, or d1 | | 94-95 | 160 MHz and 320 MHz | RU 996 + RU 484 | MRU 1 and MRU 2 | MRU 1: RU 2 (484 T) + RU 2 (996 T) MRU 2: RU 1 (484 T) + RU 2 (996 T) |
| a1, b0, c3, d3, a3, b3, c1, or d0 | | | | | MRU 3 and MRU 4 | MRU 3: RU 4 (484 T) + RU 1 (996 T) MRU 4: RU 3 (484 T) + RU 1 (996 T) |
| a0, b1, c2, d2, a2, b2, c0, or d1 | | 96-99 | 160 MHz and 320 MHz | RU 996 + RU 484 + RU 242 | MRU 1 to MRU 4 | MRU 1: RU 2 (242 T) + RU 2 (484 T) + RU 2 (996 T) MRU 2: RU 1 (242 T) + RU 2 (484 T) + RU 2 (996 T) MRU 3: RU 4 (242 T) + RU 1 |

TABLE 4(2)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | | | | | (484 T) + RU 2 (996 T)<br>MRU 4: RU 3 (242 T) + RU 1 (484 T) + RU 2 (996 T) |
| a1, b0, c3, d3, a3, b3, c1, or d0 | | | | | MRU 5 to MRU 8 | MRU 5: RU 6 (242 T) + RU 4 (484 T) + RU 1 (996 T)<br>MRU 6: RU 5 (242 T) + RU 4 (484 T) + RU 1 (996 T)<br>MRU 7: RU 8 (242 T) + RU 3 (484 T) + RU 1 (996 T)<br>MRU 8: RU 7 (242 T) + RU 3 (484 T) + RU 1 (996 T) |
| a0, b1, c2, or d2 | | 100-103 | 320 MHz | RU 2 × 996 + RU 484 | MRU 2 and MRU 1 | MRU 1: RU 2 (484 T) + RU 2 (996 T) + RU 3 (996 T)<br>MRU 2: RU 1 (484 T) + RU 2 (996 T) + RU 3 (996 T)<br>2 reserved entries for B7:B1 = 102:103 |
| a1, b0, c3, or d3 | | | | | MRU 3 to MRU 6 | MRU 3: RU 4 (484 T) + RU 1 (996 T) + RU 3 (996 T)<br>MRU 4: RU 3 (484 T) + RU 1 (996 T) + RU 3 (996 T)<br>MRU 5: RU 4 (484 T) + RU 3 |

TABLE 4(2)-continued

| RU allocation subfield (resource unit allocation subfield) | | | | | | | |
|---|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | | Description |
| | | | | | | | (996 T) + RU 4 (996 T) MRU 6: RU 3 (484 T) + RU 3 (996 T) + RU 4 (996 T) |
| a2, b2, c0, or d1 | | | | | MRU 7 to MRU 10 | | MRU 7: RU 6 (484 T) + RU 1 (996 T) + RU 2 (996 T) MRU 8: RU 5 (484 T) + RU 1 (996 T) + RU 2 (996 T) MRU 9: RU 6 (484 T) + RU 2 (996 T) + RU 4 (996 T) MRU 10: RU 5 (484 T) + RU 2 (996 T) + RU 4 (996 T) |
| a3, b3, c1, or d0 | | | | | MRU 11 and MRU 12 | | 2 reserved entries for B7:B1 = 100:101 MRU 11: RU: 8 (484 T) + RU 2 (996 T) + RU 3 (996 T) MRU 12: RU 7 (484 T) + RU 2 (996 T) + RU 3 (996 T) |
| a0, b1, c2, or d2 | | 104 | 320 MHz | RU 3 × 996 | Reserved | MRU 2 | MRU 2: RU 1 (996 T) + RU 2 (2 × 996 T) |
| a1, b0, c3, or d3 | | | | | | MRU 1 | MRU 1: RU 2 (996 T) + RU 2 (2 × 996 T) |
| a2, b2, c0, or d1 | | | | | | MRU 4 | MRU 4: RU 3 (996 T) + RU 1 (2 × 996 T) |
| a3, b3, c1, or d0 | | | | | | MRU 3 | MRU 3: RU 4 (996 T) + RU 1 (2 × 996 T) |
| a0, b1, c2, or d2 | | 105-106 | 320 MHz | RU 3 × 996 + RU 484 | Reserved | MRU 1 and MRU 2 | MRU 1: RU 2 (484 T) + RU 2 (996 T) + RU 2 (2 × 996 T) MRU 2: RU 1 (484 T) + RU 2 (996 T) + RU 2 (2 × 996 T) |

TABLE 4(2)-continued

| RU allocation subfield (resource unit allocation subfield) | | | | | | |
|---|---|---|---|---|---|---|
| BS: P/S 160 MHz (BS: primary/secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| a1, b0, c3, or d3 | | | | | MRU 3 and MRU 4 | MRU 3: RU 4 (484 T) + RU 1 (996 T) + RU 2 (2 × 996 T) MRU 4: RU 3 (484 T) + RU 1 (996 T) + RU 2 (2 × 996 T) |
| a2, b2, c0, or d1 | | | | | MRU 5 and MRU 6 | MRU 5: RU 6 (484 T) + RU 4 (996 T) + RU 1 (2 × 996 T) MRU 6: RU 5 (484 T) + RU 4 (996 T) + RU 1 (2 × 996 T) |
| a3, b3, c1, or d0 | | | | | MRU 7 and MRU 8 | MRU 7: RU 8 (484 T) + RU 3 (996 T) + RU 1 (2 × 996 T) MRU 8: RU 7 (484 T) + RU 3 (996 T) + RU 1 (2 × 996 T) |
| | | 107-127 | | | Reserved | |

Embodiment (3): In another implementation, Table 4(2) may be designed into four tables.

Based on the correspondence in Table 4(1), Table 4(2) may be split into the following four tables: Table 4(2a), Table 4(2b), Table 4(2c), and Table 4(2d). The tables are tables with each including only the case a, the case b, the case c, or the case d, and there is no BS and B0 indication in another case in one table.

Table 4(2a) is read for the case a.

TABLE 4(2a)

| RU allocation subfield (resource unit allocation subfield) | | | | | | |
|---|---|---|---|---|---|---|
| BS: P/S 160 MHz (BS: primary/secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| 0-3: 80 MHz segment where the RU is located (80 MHz segment in which the RU is located) | | 0-8 | 20 MHz, 40 MHz, 80 MHz, 160 MHz, and 320 MHz | 26 | RU 1 to RU 9 | 26-tone RU: 11ax: 1-37, where an RU 19 is a DC RU in 80 MHz (11ax: RUs 1-37, where an RU 19 is a DC RU in 80 MHz) |
| | | 9-17 | 40 MHz, 80 MHz, 160 MHz, and 320 MHz | | RU 10 to RU 18 | |

TABLE 4(2a)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 18 | 80 MHz, 160 MHz, and 320 MHz | | Not defined (not defined) | 11be: 1-18 in lower 40 MHz and 20-37 in upper 40 MHz, where an RU 19 does not exist (11be: 1-18 in lower 40 MHz and 20-37 in upper 40 MHz, where an RU 19 does not exist or is not defined) (A DC RU represents a direct current RU) |
| | | 19-36 | 80 MHz, 160 MHz, and 320 MHz | | RU 20 to RU 37 | |
| | | 37-40 | 20 MHz, 40 MHz, 80 MHz, 160 MHz, and 320 MHz | 52 | RU 1 to RU 4 | Same numbering for 11ax and 11be (same numbering for 11ax and 11be) |
| | | 41-44 | 40 MHz, 80 MHz, 160 MHz, and 320 MHz | | RU 5 to RU 8 | |
| | | 45-52 | 80 MHz, 160 MHz, and 320 MHz | | RU 9 to RU 16 | |
| | | 53 and 54 | 20 MHz, 40 MHz, 80 MHz, 160 MHz, and 320 MHz | 106 | RU 1 and RU 2 | |
| | | 55 and 56 | 40 MHz, 80 MHz, 160 MHz, and 320 MHz | | RU 3 and RU 4 | |
| | | 57-60 | 80 MHz, 160 MHz, and 320 MHz | | RU 5 to RU 8 | |
| | | 61 | 20 MHz, 40 MHz, 80 MHz, 160 MHz, and 320 MHz | 242 | RU 1 | |
| | | 62 | 40 MHz, 80 MHz, 160 MHz, and 320 MHz | | RU 2 | |
| | | 63 and 64 | 80 MHz, 160 MHz, and 320 MHz | | RU 3 and RU 4 | |

TABLE 4(2a)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 65 | 40 MHz, 80 MHz, 160 MHz, and 320 MHz | 484 | RU 1 | |
| | | 66 | 80 MHz, 160 MHz, and 320 MHz | | RU 2 | |
| | | 67 | 80 MHz, 160 MHz, and 320 MHz | 996 | RU 1 | |
| BS | 0 | 68 | | Reserved | | |
| | 1 | | 160 MHz and 320 MHz | 2 × 996 | RU 1 | |
| | 00<br>01<br>10 | 69 | | Reserved | | Reserved |
| | 11 | | 320 MHz | 4 × 996 | RU 1 | RU 1 |
| 0-3: 80 MHz segment where the RU is located (80 MHz segment in which the RU is located) | | 70-72 | 20 MHz, 40 MHz, 80 MHz, 160 MHz, and 320 MHz | RU 52 + RU 26 | MRU 1 to MRU 3 | MRU 1: RU 2 (26 T) + RU 2 (52 T) - reserved for BW ≥ 80 MHz<br>MRU 2: RU 5 (26 T) + RU 2 (52 T)<br>MRU 3: RU 8 (26 T) + RU 3 (52 T) |
| | | 73-75 | 40 MHz, 80 MHz, 160 MHz, and 320 MHz | | MRU 4 to MRU 6 | MRU 4: RU 11 (26 T) + RU 6 (52 T)<br>MRU 5: RU 14 (26 T) + RU 6 (52 T)<br>MRU 6: RU 17 (26 T) + RU 7 (52 T) - reserved for BW ≥ 80 MHz |
| | | 76-81 | 80 MHz, 160 MHz, and 320 MHz | | MRU 7-MRU 12 | MRU 7: RU 21 (26 T) + RU 10 (52 T) - reserved<br>MRU 8: RU 24 (26 T) + RU 10 (52 T)<br>MRU 9: RU 27 (26 T) + RU 11 (52 T)<br>MRU 10: RU 30 (26 T) + RU 14 (52 T)<br>MRU 11: RU 33 (26 T) + RU 14 (52 T)<br>MRU 12: RU 36 (26 T) + RU 15 (52 T) - reserved |

TABLE 4(2a)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 82-83 | 20 MHz, 40 MHz, 80 MHz, 160 MHz, and 320 MHz | RU 106 + RU 26 | MRU 1 and MRU 2 | MRU 1: RU 5 (26 T) + RU 1 (106 T) MRU 2: RU 5 (26 T) + RU 2 (106 T) - reserved for BW ≥ 80 MHz |
| | | 84-85 | 40 MHz, 80 MHz, 160 MHz, and 320 MHz | | MRU 3 and MRU 4 | MRU 3: RU 14 (26 T) + RU 3 (106 T) - reserved for BW ≥ 80 MHz MRU 4: RU 14 (26 T) + RU 4 (106 T) |
| | | 86-89 | 80 MHz, 160 MHz, and 320 MHz | | MRU 5-MRU 8 | MRU 5: RU 24 (26 T) + RU 5 (106 T) MRU 6: RU 24 (26 T) + RU 6 (106 T) - reserved MRU 7: RU 33 (26 T) + RU 7 (106 T) - reserved MRU 8: RU 33 (26 T) + RU 8 (106 T) |
| | | 90-93 | 80 MHz, 160 MHz, and 320 MHz | RU 484 + RU 242 | MRU 1 to MRU 4 | MRU 1: RU 2 (242 T) + RU 2 (484 T) MRU 2: RU 1 (242 T) + RU 2 (484 T) MRU 3: RU 4 (242 T) + RU 1 (484 T) MRU 4: RU 3 (242 T) + RU 1 (484 T) |
| | 00 and 10 | 94-95 | 160 MHz and 320 MHz | RU 996 + RU 484 | MRU 1 and MRU 2 | MRU 1: RU 2 (484 T) + RU 2 (996 T) MRU 2: RU 1 (484 T) + RU 2 (996 T) |
| | 01 and 11 | | | | MRU 3 and MRU 4 | MRU 3: RU 4 (484 T) + RU 1 (996 T) MRU 4: RU 3 (484 T) + RU 1 (996 T) |
| | 00 and 10 | 96-99 | 160 MHz and 320 MHz | RU 996 + RU 484 + RU 242 | MRU 1 to MRU 4 | MRU 1: RU 2 (242 T) + RU 2 (484 T) + RU 2 (996 T) MRU 2: RU 1 (242 T) + RU 2 (484 T) + RU 2 (996 T) MRU 3: RU 4 (242 T) + RU 1 (484 T) + RU 2 (996 T) |

TABLE 4(2a)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | | | | | MRU 4: RU 3 (242 T) + RU 1 (484 T) + RU 2 (996 T) |
| | 01 and 11 | | | | MRU 5 to MRU 8 | MRU 5: RU 6 (242 T) + RU 4 (484 T) + RU 1 (996 T)<br>MRU 6: RU 5 (242 T) + RU 4 (484 T) + RU 1 (996 T)<br>MRU 7: RU 8 (242 T) + RU 3 (484 T) + RU 1 (996 T)<br>MRU 8: RU 7 (242 T) + RU 3 (484 T) + RU 1 (996 T) |
| | 00 | 100-103 | 320 MHz | RU 2 × 996 + RU 484 | MRU 1 and MRU 2 | MRU 1: RU 2 (484 T) + RU 2 (996 T) + RU 3 (996 T)<br>MRU 2: RU 1 (484 T) + RU 2 (996 T) + RU 3 (996 T)<br>2 reserved entries for B7:B1 = 102:103 |
| | 01 | | | | MRU 3 to MRU 6 | MRU 3: RU 4 (484 T) + RU 1 (996 T) + RU 3 (996 T)<br>MRU 4: RU 3 (484 T) + RU 1 (996 T) + RU 3 (996 T)<br>MRU 5: RU 4 (484 T) + RU 3 (996 T) + RU 4 (996 T)<br>MRU 6: RU 3 (484 T) + RU 3 (996 T) + RU 4 (996 T) |
| | 10 | | | | MRU 7 to MRU 10 | MRU 7: RU 6 (484 T) + RU 1 (996 T) + RU 2 (996 T)<br>MRU 8: RU 5 (484 T) + RU 1 (996 T) + RU 2 (996 T)<br>MRU 9: RU 6 (484 T) + RU 2 (996 T) + RU 4 (996 T)<br>MRU 10: RU 5 (484 T) + RU 2 (996 T) + RU 4 (996 T) |

TABLE 4(2a)-continued

| RU allocation subfield (resource unit allocation subfield) | | | | | | | |
|---|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | | Description |
| | 11 | | | | MRU 11 and MRU 12 | | 2 reserved entries for B7:B1 = 100:101 MRU 11: RU 8 (484 T) + RU 2 (996 T) + RU 3 (996 T) MRU 12: RU 7 (484 T) + RU 2 (996 T) + RU 3 (996 T) |
| | 00 | 104 | 320 MHz | RU 3 × 996 | Reserved | MRU 2 | MRU 2: RU 1 (996 T) + RU 2 (2 × 996 T) |
| | 01 | | | | | MRU 1 | MRU 1: RU 2 (996 T) + RU 2 (2 × 996 T) |
| | 10 | | | | | MRU 4 | MRU 4: RU 3 (996 T) + RU 1 (2 × 996 T) |
| | 11 | | | | | MRU 3 | MRU 3: RU 4 (996 T) + RU 1 (2 × 996 T) |
| | 00 | 105-106 | 320 MHz | RU 3 × 996 + RU 484 | Reserved | MRU 1 and MRU 2 | MRU 1: RU 2 (484 T) + RU 2 (996 T) + RU 2 (2 × 996 T) MRU 2: RU 1 (484 T) + RU 2 (996 T) + RU 2 (2 × 996 T) |
| | 01 | | | | | MRU 3 and MRU 4 | MRU 3: RU 4 (484 T) + RU 1 (996 T) + RU 2 (2 × 996 T) MRU 4: RU 3 (484 T) + RU 1 (996 T) + RU 2 (2 × 996 T) |
| | 10 | | | | | MRU 5 and MRU 6 | MRU 5: RU 6 (484 T) + RU 4 (996 T) + RU 1 (2 × 996 T) MRU 6: RU 5 (484 T) + RU 4 (996 T) + RU 1 (2 × 996 T) |

TABLE 4(2a)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | 11 | | | | MRU 7 and MRU 8 | MRU 7: RU 8 (484 T) + RU 3 (996 T) + RU 1 (2 × 996 T) MRU 8: RU 7 (484 T) + RU 3 (996 T) + RU 1 (2 × 996 T) |
| | | | 107-127 | | Reserved | |

Table 4(2b) is read for the case b.

TABLE 4(2b)

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| 0-3: 80 MHz segment where the RU is located (80 MHz segment in which the RU is located) | | 0-8 | 20 MHz, 40 MHz, 80 MHz, 160 MHz, and 320 MHz | 26 | RU 1 to RU 9 | 26-tone RU: 11ax: RUs 1-37, where an RU 19 is a DC RU in 80 MHz (11ax: RUs 1-37, where an RU 19 is a DC RU in 80 MHz) 11be: RUs 1-18 in lower 40 MHz and 20-37 in upper 40 MHz, where an RU 19 does not exist (11be: 1-18 in lower 40 MHz and 20-37 in upper 40 MHz, where an RU 19 does not exist or is not defined) (A DC RU represents a direct current RU) |
| | | 9-17 | 40 MHz, 80 MHz, 160 MHz, and 320 MHz | | RU 10 to RU 18 | |
| | | 18 | 80 MHz, 160 MHz, and 320 MHz | | Not defined (not defined) | |
| | | 19-36 | 80 MHz, 160 MHz, and 320 MHz | | RU 20 to RU 37 | |
| | | 37-40 | 20 MHz, 40 MHz, 80 MHz, 160 MHz, and 320 MHz | 52 | RU 1 to RU 4 | Same numbering for 11ax and 11be (same numbering for 11ax and 11be) |
| | | 41-44 | 40 MHz, 80 MHz, 160 MHz, and 320 MHz | | RU 5 to RU 8 | |
| | | 45-52 | 80 MHz, 160 MHz, and 320 MHz | | RU 9 to RU 16 | |
| | | 53 and 54 | 20 MHz, 40 MHz, 80 MHz, 160 MHz, and 320 MHz | 106 | RU 1 and RU 2 | |
| | | 55 and 56 | 40 MHz, 80 MHz, 160 MHz, and 320 MHz | | RU 3 and RU 4 | |
| | | 57-60 | 80 MHz, 160 MHz, and 320 MHz | | RU 5 to RU 8 | |
| | | 61 | 20 MHz, 40 MHz, 80 MHz, 160 MHz, and 320 MHz | 242 | RU 1 | |
| | | 62 | 40 MHz, 80 MHz, 160 MHz, and 320 MHz | | RU 2 | |

TABLE 4(2b)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 63 and 64 | 80 MHz, 160 MHz, and 320 MHz | | RU 3 and RU 4 | |
| | | 65 | 40 MHz, 80 MHz, 160 MHz, and 320 MHz | 484 | RU 1 | |
| | | 66 | 80 MHz, 160 MHz, and 320 MHz | | RU 2 | |
| | | 67 | 80 MHz, 160 MHz, and 320 MHz | 996 | RU 1 | |
| BS | 0 | 68 | | Reserved | | |
| | 1 | | 160 MHz and 320 MHz | 2 × 996 | RU 1 | |
| | 01 | 69 | | Reserved | | Reserved |
| | 00 | | | | | |
| | 10 | | | | | |
| | 11 | | 320 MHz | 4 × 996 | RU 1 | RU 1 |
| | 0-3: 80 MHz segment where the RU is located (80 MHz segment in which the RU is located) | 70-72 | 20 MHz, 40 MHz, 80 MHz, 160 MHz, and 320 MHz | RU 52 + RU 26 | MRU 1 to MRU 3 | MRU 1: RU 2 (26 T) + RU 2 (52 T) - reserved for BW ≥ 80 MHz<br>MRU 2: RU 5 (26 T) + RU 2 (52 T)<br>MRU 3: RU 8 (26 T) + RU 3 (52 T) |
| | | 73-75 | 40 MHz, 80 MHz, 160 MHz, and 320 MHz | | MRU 4 to MRU 6 | MRU 4: RU 11 (26 T) + RU 6 (52 T)<br>MRU 5: RU 14 (26 T) + RU 6 (52 T)<br>MRU 6: RU 17 (26 T) + RU 7 (52 T) - reserved for BW ≥ 80 MHz |
| | | 76-81 | 80 MHz, 160 MHz, and 320 MHz | | MRU 7-MRU 12 | MRU 7: RU 21 (26 T) + RU 10 (52 T) - reserved<br>MRU 8: RU 24 (26 T) + RU 10 (52 T)<br>MRU 9: RU 27 (26 T) + RU 11 (52 T)<br>MRU 10: RU 30 (26 T) + RU 14 (52 T)<br>MRU 11: RU 33 (26 T) + RU 14 (52 T)<br>MRU 12: RU 36 (26 T) + RU 15 (52 T) - reserved |
| | | 82-83 | 20 MHz, 40 MHz, 80 MHz, 160 MHz, and 320 MHz | RU 106 + RU 26 | MRU 1 and MRU 2 | MRU 1: RU 5 (26 T) + RU 1 (106 T)<br>MRU 2: RU 5 (26 T) + RU 2 (106 T) - reserved for BW ≥ 80 MHz |
| | | 84-85 | 40 MHz, 80 MHz, 160 MHz, and 320 MHz | | MRU 3 and MRU 4 | MRU 3: RU 14 (26 T) + RU 3 (106 T) - reserved for BW ≥ 80 MHz<br>MRU 4: RU 14 (26 T) + RU 4 (106 T) |
| | | 86-89 | 80 MHz, 160 MHz, and 320 MHz | | MRU 5-MRU 8 | MRU 5: RU 24 (26 T) + RU 5 (106 T)<br>MRU 6: RU 24 (26 T) + RU 6 (106 T) - reserved<br>MRU 7: RU 33 (26 T) + RU 7 (106 T) - reserved<br>MRU 8: RU 33 (26 T) + RU 8 (106 T) |
| | | 90-93 | 80 MHz, 160 MHz, and 320 MHz | RU 484 + RU 242 | MRU 1 to MRU 4 | MRU 1: RU 2 (242T) + RU 2 (484 T)<br>MRU 2: RU 1 (242T) + RU 2 (484 T)<br>MRU 3: RU 4 (242T) + RU 1 (484 T)<br>MRU 4: RU 3 (242T) + RU 1 (484 T) |

TABLE 4(2b)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | 01 and 10 | 94-95 | 160 MHz and 320 MHz | RU 996 + RU 484 | MRU 1 and MRU 2 | MRU 1: RU 2 (484 T) + RU 2 (996 T)<br>MRU 2: RU 1 (484 T) + RU 2 (996 T) |
| | 00 and 11 | | | | MRU 3 and MRU 4 | MRU 3: RU 4 (484 T) + RU 1 (996 T)<br>MRU 4: RU 3 (484 T) + RU 1 (996 T) |
| | 01 and 10 | 96-99 | 160 MHz and 320 MHz | RU 996 + RU 484 + RU 242 | MRU 1 to MRU 4 | MRU 1: RU 2 (242T) + RU 2 (484 T) + RU 2 (996 T)<br>MRU 2: RU 1 (242T) + RU 2 (484 T) + RU 2 (996 T)<br>MRU 3: RU 4 (242T) + RU 1 (484 T) + RU 2 (996 T)<br>MRU 4: RU 3 (242T) + RU 1 (484 T) + RU 2 (996 T) |
| | 00 and 11 | | | | MRU 5 to MRU 8 | MRU 5: RU 6 (242T) + RU 4 (484 T) + RU 1 (996 T)<br>MRU 6: RU 5 (242T) + RU 4 (484 T) + RU 1 (996 T)<br>MRU 7: RU 8 (242T) + RU 3 (484 T) + RU 1 (996 T)<br>MRU 8: RU 7 (242T) + RU 3 (484 T) + RU 1 (996 T) |
| | 01 | 100-103 | 320 MHz | RU 2 × 996 + RU 484 | MRU 1 and MRU 2 | MRU 1: RU 2 (484 T) + RU 2 (996 T) + RU 3 (996 T)<br>MRU 2: RU 1 (484 T) + RU 2 (996 T) + RU 3 (996 T)<br>2 reserved entries for B7:B1 = 102:103 |
| | 00 | | | | MRU 3 to MRU 6 | MRU 3: RU 4 (484 T) + RU 1 (996 T) + RU 3 (996 T)<br>MRU 4: RU 3 (484 T) + RU 1 (996 T) + RU 3 (996 T)<br>MRU 5: RU 4 (484 T) + RU 3 (996 T) + RU 4 (996 T)<br>MRU 6: RU 3 (484 T) + RU 3 (996 T) + RU 4 (996 T) |
| | 10 | | | | MRU 7 to MRU 10 | MRU 7: RU 6 (484 T) + RU 1 (996 T) + RU 2 (996 T)<br>MRU 8: RU 5 (484 T) + RU 1 (996 T) + RU 2 (996 T)<br>MRU 9: RU 6 (484 T) + RU 2 (996 T) + RU 4 (996 T)<br>MRU 10: RU 5 (484 T) + RU 2 (996 T) + RU 4 (996 T) |
| | 11 | | | | MRU 11 and MRU 12 | 2 reserved entries for B7:B1 = 100:101<br>MRU 11: RU 8 (484 T) + RU 2 (996 T) + RU 3 (996 T)<br>MRU 12: RU 7 (484 T) + RU 2 (996 T) + RU 3 (996 T) |
| | 01 | 104 | 320 MHz | RU 3 × 996 | Reserved MRU 2 | MRU 2: RU 1 (996 T) + RU 2 (2 × 996 T) |
| | 00 | | | | MRU 1 | MRU 1: RU 2 (996 T) + RU 2 (2 × 996 T) |
| | 10 | | | | MRU 4 | MRU 4: RU 3 (996 T) + RU 1 (2 × 996 T) |
| | 11 | | | | MRU 3 | MRU 3: RU 4 (996 T) + RU 1 (2 × 996 T) |
| | 01 | 105-106 | 320 MHz | RU 3 × 996 + RU 484 | Reserved MRU 1 and MRU 2 | MRU 1: RU 2 (484 T) + RU 2 (996 T) + RU 2 (2 × 996 T)<br>MRU 2: RU 1 (484 T) + RU 2 (996 T) + RU 2 (2 × 996 T) |

TABLE 4(2b)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | 00 | | | | MRU 3 and MRU 4 | MRU 3: RU 4 (484 T) + RU 1 (996 T) + RU 2 (2 × 996 T) MRU 4: RU 3 (484 T) + RU 1 (996 T) + RU 2 (2 × 996 T) |
| | 10 | | | | MRU 5 and MRU 6 | MRU 5: RU 6 (484 T) + RU 4 (996 T) + RU 1 (2 × 996 T) MRU 6: RU 5 (484 T) + RU 4 (996 T) + RU 1 (2 × 996 T) |
| | 11 | | | | MRU 7 and MRU 8 | MRU 7: RU 8 (484 T) + RU 3 (996 T) + RU 1 (2 × 996 T) MRU 8: RU 7 (484 T) + RU 3 (996 T) + RU 1 (2 × 996 T) |
| | | 107-127 | | | Reserved | |

Table 4(2c) is read for the case c.

TABLE 4(2c)

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/ secondary in primary 160 MHz and lower/upper in secondary 160 MHz) | B7-B1 | BW subfield (bandwidth subfield) | RU size (resource unit size) | RU index 11be (11be resource unit index) | Description |
| 0-3: 80 MHz segment where the RU is located (80 MHz segment in which the RU is located) | | 0-8 | 20 MHz, 40 MHz, 80 MHz, 160 MHz, and 320 MHz | 26 | RU 1 to RU 9 | 26-tone RU: 11ax: RUs 1-37, where an RU 19 is a DC RU in 80 MHz (11ax: RUs 1-37, where an RU 19 is a DC RU in 80 MHz) 11be: RUs 1-18 in lower 40 MHz and 20-37 in upper 40 MHz, where an RU 19 does not exist (11be: 1-18 in lower 40 MHz and 20-37 in upper 40 MHz, where an RU 19 does not exist or is not defined) (A DC RU represents a direct current RU) |
| | | 9-17 | 40 MHz, 80 MHz, 160 MHz, and 320 MHz | | RU 10 to RU 18 | |
| | | 18 | 80 MHz, 160 MHz, and 320 MHz | | Not defined (not defined) | |
| | | 19-36 | 80 MHz, 160 MHz, and 320 MHz | | RU 20 to RU 37 | |

TABLE 4(2c)-continued

RU allocation subfield (resource unit allocation subfield)

| BS: P/S 160 MHz (BS: primary/ secondary 160 MHz) | B0: 80 MHz P/S in P160 and L/U in S160 (B0: primary/ secondary in primary 160 MHz and lower/upper in secondary 160 MHz) | B7-B1 | BW subfield (bandwidth subfield) | RU size (resource unit size) | RU index 11be (11be resource unit index) | Description |
|---|---|---|---|---|---|---|
| | | 37-40 | 20 MHz, 40 MHz, 80 MHz, 160 MHz, and 320 MHz | 52 | RU 1 to RU 4 | Same numbering for 11ax and 11be (same numbering for 11ax and 11be) |
| | | 41-44 | 40 MHz, 80 MHz, 160 MHz, and 320 MHz | | RU 5 to RU 8 | |
| | | 45-52 | 80 MHz, 160 MHz, and 320 MHz | | RU 9 to RU 16 | |
| | | 53 and 54 | 20 MHz, 40 MHz, 80 MHz, 160 MHz, and 320 MHz | 106 | RU 1 and RU 2 | |
| | | 55 and 56 | 40 MHz, 80 MHz, 160 MHz, and 320 MHz | | RU 3 and RU 4 | |
| | | 57-60 | 80 MHz, 160 MHz, and 320 MHz | | RU 5 to RU 8 | |
| | | 61 | 20 MHz, 40 MHz, 80 MHz, 160 MHz, and 320 MHz | 242 | RU 1 | |
| | | 62 | 40 MHz, 80 MHz, 160 MHz, and 320 MHz | | RU 2 | |
| | | 63 and 64 | 80 MHz, 160 MHz, and 320 MHz | | RU 3 and RU 4 | |
| | | 65 | 40 MHz, 80 MHz, 160 MHz, and 320 MHz | 484 | RU 1 | |
| | | 66 | 80 MHz, 160 MHz, and 320 MHz | | RU 2 | |
| | | 67 | 80 MHz, 160 MHz, and 320 MHz | 996 | RU 1 | |

TABLE 4(2c)-continued

RU allocation subfield (resource unit allocation subfield)

| BS: P/S 160 MHz (BS: primary/ secondary 160 MHz) | B0: 80 MHz P/S in P160 and L/U in S160 (B0: primary/ secondary in primary 160 MHz and lower/upper in secondary 160 MHz) | B7-B1 | BW subfield (bandwidth subfield) | RU size (resource unit size) | RU index 11be (11be resource unit index) | Description |
|---|---|---|---|---|---|---|
| BS | 0 | 68 | | Reserved | | |
| | 1 | | 160 MHz and 320 MHz | 2 × 996 | RU 1 | |
| 10 | | 69 | | Reserved | | Reserved |
| 11 | | | | | | |
| 00 | | | | | | |
| 01 | | | 320 MHz | 4 × 996 | RU 1 | RU 1 |
| 0-3: 80 MHz segment where the RU is located (80 MHz segment in which the RU is located) | | 70-72 | 20 MHz, 40 MHz, 80 MHz, 160 MHz, and 320 MHz | RU 52 + RU 26 | MRU 1 to MRU 3 | MRU 1: RU 2 (26 T) + RU 2 (52 T) - reserved for BW ≥80 MHz<br>MRU 2: RU 5 (26 T) + RU 2 (52 T)<br>MRU 3: RU 8 (26 T) + RU 3 (52 T) |
| | | 73-75 | 40 MHz, 80 MHz, 160 MHz, and 320 MHz | | MRU 4 to MRU 6 | MRU 4: RU 11 (26 T) + RU 6 (52 T)<br>MRU 5: RU 14 (26 T) + RU 6 (52 T)<br>MRU 6: RU 17 (26 T) + RU 7 (52 T) - reserved for BW ≥80 MHz |
| | | 76-81 | 80 MHz, 160 MHz, and 320 MHz | | MRU 7-MRU 12 | MRU 7: RU 21 (26 T) + RU 10 (52 T) - reserved<br>MRU 8: RU 24 (26 T) + RU 10 (52 T)<br>MRU 9: RU 27 (26 T) + RU 11 (52 T)<br>MRU 10: RU 30 (26 T) + RU 14 (52 T)<br>MRU 11: RU 33 (26 T) + RU 14 (52 T)<br>MRU 12: RU 36 (26 T) + RU 15 (52 T) - reserved |
| | | 82-83 | 20 MHz, 40 MHz, 80 MHz, 160 MHz, and 320 MHz | RU 106 + RU 26 | MRU 1 and MRU 2 | MRU 1: RU 5 (26 T) + RU 1 (106 T)<br>MRU 2: RU 5 (26 T) + RU 2 (106 T) - reserved for BW ≥80 MHz |
| | | 84-85 | 40 MHz, 80 MHz, 160 MHz, and 320 MHz | | MRU 3 and MRU 4 | MRU 3: RU 14 (26 T) + RU 3 (106 T) - reserved for BW ≥80 MHz<br>MRU 4: RU 14 (26 T) + RU 4 (106 T) |

TABLE 4(2c)-continued

RU allocation subfield (resource unit allocation subfield)

| BS: P/S 160 MHz (BS: primary/ secondary 160 MHz) | B0: 80 MHz P/S in P160 and L/U in S160 (B0: primary/ secondary in primary 160 MHz and lower/upper in secondary 160 MHz) | B7-B1 | BW subfield (bandwidth subfield) | RU size (resource unit size) | RU index 11be (11be resource unit index) | Description |
|---|---|---|---|---|---|---|
| | | 86-89 | 80 MHz, 160 MHz, and 320 MHz | | MRU 5-MRU 8 | MRU 5: RU 24 (26 T) + RU 5 (106 T) MRU 6: RU 24 (26 T) + RU 6 (106 T) - reserved MRU 7: RU 33 (26 T) + RU 7 (106 T) - reserved MRU 8: RU 33 (26 T) + RU 8 (106 T) |
| | | 90-93 | 80 MHz, 160 MHz, and 320 MHz | RU 484 + RU 242 | MRU 1 to MRU 4 | MRU 1: RU 2 (242 T) + RU 2 (484 T) MRU 2: RU 1 (242 T) + RU 2 (484 T) MRU 3: RU 4 (242 T) + RU 1 (484 T) MRU 4: RU 3 (242 T) + RU 1 (484 T) |
| | 00 and 10 | 94-95 | 160 MHz and 320 MHz | RU 996 + RU 484 | MRU 1 and MRU 2 | MRU 1: RU 2 (484 T) + RU 2 (996 T) MRU 2: RU 1 (484 T) + RU 2 (996 T) |
| | 01 and 11 | | | | MRU 3 and MRU 4 | MRU 3: RU 4 (484 T) + RU 1 (996 T) MRU 4: RU 3 (484 T) + RU 1 (996 T) |
| | 00 and 10 | 96-99 | 160 MHz and 320 MHz | RU 996 + RU 484 + RU 242 | MRU 1 to MRU 4 | MRU 1: RU 2 (242 T) + RU 2 (484 T) + RU 2 (996 T) MRU 2: RU 1 (242 T) + RU 2 (484 T) + RU 2 (996 T) MRU 3: RU 4 (242 T) + RU 1 (484 T) + RU 2 (996 T) MRU 4: RU 3 (242 T) + RU 1 (484 T) + RU 2 (996 T) |
| | 01 and 11 | | | | MRU 5 to MRU 8 | MRU 5: RU 6 (242 T) + RU 4 (484 T) + RU 1 (996 T) MRU 6: RU 5 (242 T) + RU 4 (484 T) + RU 1 (996 T) MRU 7: RU 8 (242 T) + RU 3 (484 T) + RU 1 (996 T) MRU 8: RU 7 (242 T) + RU 3 (484 T) + RU 1 (996 T) |

TABLE 4(2c)-continued

RU allocation subfield (resource unit allocation subfield)

| BS: P/S 160 MHz (BS: primary/ secondary 160 MHz) | B0: 80 MHz P/S in P160 and L/U in S160 (B0: primary/ secondary in primary 160 MHz and lower/upper in secondary 160 MHz) | B7-B1 | BW subfield (bandwidth subfield) | RU size (resource unit size) | RU index 11be (11be resource unit index) | Description |
|---|---|---|---|---|---|---|
| | 10 | 100-103 | 320 MHz | RU 2 × 996 + RU 484 | MRU 1 and MRU 2 | MRU 1: RU 2 (484 T) + RU 2 (996 T) + RU 3 (996 T) MRU 2: RU 1 (484 T) + RU 2 (996 T) + RU 3 (996 T) 2 reserved entries for B7:B1 = 102:103 |
| | 11 | | | | MRU 3 to MRU 6 | MRU 3: RU 4 (484 T) + RU 1 (996 T) + RU 3 (996 T) MRU 4: RU 3 (484 T) + RU 1 (996 T) + RU 3 (996 T) MRU 5: RU 4 (484 T) + RU 3 (996 T) + RU 4 (996 T) MRU 6: RU 3 (484 T) + RU 3 (996 T) + RU 4 (996 T) |
| | 00 | | | | MRU 7 to MRU 10 | MRU 7: RU 6 (484 T) + RU 1 (996 T) + RU 2 (996 T) MRU 8: RU 5 (484 T) + RU 1 (996 T) + RU 2 (996 T) MRU 9: RU 6 (484 T) RU 2 (996 T) + RU 4 (996 T) MRU 10: RU 5 (484 T) + RU 2 (996 T) + RU 4 (996 T) |
| | 01 | | | | MRU 11 and MRU 12 | 2 reserved entries for B7:B1 = 100:101 MRU 11: RU 8 (484 T) + RU 2 (996 T) + RU 3 (996 T) MRU 12: RU 7 (484 T) + RU 2 (996 T) + RU 3 (996 T) |
| | 10 | 104 | 320 MHz | RU 3 × 996 | Reserved MRU 2 | MRU 2: RU 1 (996 T) + RU 2 (2 × 996 T) |
| | 11 | | | | MRU 1 | MRU 1: RU 2 (996 T) + RU 2 (2 × 996 T) |
| | 00 | | | | MRU 4 | MRU 4: RU 3 (996 T) + RU 1 (2 × 996 T) |
| | 01 | | | | MRU 3 | MRU 3: RU 4 (996 T) + RU 1 (2 × 996 T) |

TABLE 4(2c)-continued

| RU allocation subfield (resource unit allocation subfield) | | | | | | | |
|---|---|---|---|---|---|---|---|
| BS: P/S 160 MHz (BS: primary/ secondary 160 MHz) | B0: 80 MHz P/S in P160 and L/U in S160 (B0: primary/ secondary in primary 160 MHz and lower/upper in secondary 160 MHz) | B7-B1 | BW subfield (bandwidth subfield) | RU size (resource unit size) | RU index 11be (11be resource unit index) | | Description |
| | 10 | 105-106 | 320 MHz | RU 3 × 996 + RU 484 | Reserved | MRU 1 and MRU 2 | MRU 1: RU 2 (484 T) + RU 2 (996 T) + RU 2 (2 × 996 T) MRU 2: RU 1 (484 T) + RU 2 (996 T) + RU 2 (2 × 996 T) |
| | 11 | | | | | MRU 3 and MRU 4 | MRU 3: RU 4 (484 T) + RU 1 (996 T) + RU 2 (2 × 996 T) MRU 4: RU 3 (484 T) + RU 1 (996 T) + RU 2 (2 × 996 T) |
| | 00 | | | | | MRU 5 and MRU 6 | MRU 5: RU 6 (484 T) + RU 4 (996 T) + RU 1 (2 × 996 T) MRU 6: RU 5 (484 T) + RU 4 (996 T) + RU 1 (2 × 996 T) |
| | 01 | | | | | MRU 7 and MRU 8 | MRU 7: RU 8 (484 T) + RU 3 (996 T) + RU 1 (2 × 996 T) MRU 8: RU 7 (484 T) + RU 3 (996 T) + RU 1 (2 × 996 T) |
| | | 107-127 | | | Reserved | | |

Table 4(2d) is read for the case d.

TABLE 4(2d)

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| 0-3: 80 MHz segment where the RU is located (80 MHz segment in which the RU is located) | | 0-8 | 20 MHz, 40 MHz, 80 MHz, 160 MHz, and 320 MHz | 26 | RU 1 to RU 9 | 26-tone RU: 11ax: RUs 1-37, where an RU 19 is a DC RU in 80 MHz (11ax: RUs 1-37, where an RU 19 is a DC RU in 80 MHz) 11be: RUs 1-18 in lower 40 MHz and 20-37 in upper 40 MHz, where an RU 19 does not exist (11be: 1-18 in lower 40 MHz and 20-37 in upper 40 MHz, where an RU 19 does not exist or is not defined) (A DC RU represents a direct current RU) |
| | | 9-17 | 40 MHz, 80 MHz, 160 MHz, and 320 MHz | | RU 10 to RU 18 | |
| | | 18 | 80 MHz, 160 MHz, and 320 MHz | | Not defined (not defined) | |
| | | 19-36 | 80 MHz, 160 MHz, and 320 MHz | | RU 20 to RU 37 | |

TABLE 4(2d)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 37-40 | 20 MHz, 40 MHz, 80 MHz, 160 MHz, and 320 MHz | 52 | RU 1 to RU 4 | Same numbering for 11ax and 11be (same numbering for 11ax and 11be) |
| | | 41-44 | 40 MHz, 80 MHz, 160 MHz, and 320 MHz | | RU 5 to RU 8 | |
| | | 45-52 | 80 MHz, 160 MHz, and 320 MHz | | RU 9 to RU 16 | |
| | | 53 and 54 | 20 MHz, 40 MHz, 80 MHz, 160 MHz, and 320 MHz | 106 | RU 1 and RU 2 | |
| | | 55 and 56 | 40 MHz, 80 MHz, 160 MHz, and 320 MHz | | RU 3 and RU 4 | |
| | | 57-60 | 80 MHz, 160 MHz, and 320 MHz | | RU 5 to RU 8 | |
| | | 61 | 20 MHz, 40 MHz, 80 MHz, 160 MHz, and 320 MHz | 242 | RU 1 | |
| | | 62 | 40 MHz, 80 MHz, 160 MHz, and 320 MHz | | RU 2 | |
| | | 63 and 64 | 80 MHz, 160 MHz, and 320 MHz | | RU 3 and RU 4 | |
| | | 65 | 40 MHz, 80 MHz, 160 MHz, and 320 MHz | 484 | RU 1 | |
| | | 66 | 80 MHz, 160 MHz, and 320 MHz | | RU 2 | |
| | | 67 | 80 MHz, 160 MHz, and 320 MHz | 996 | RU 1 | |
| BS | 0 | 68 | | Reserved | | |
| | 1 | | 160 MHz and 320 MHz | 2 × 996 | RU 1 | |
| | 10<br>11<br>01 | 69 | | Reserved | | Reserved |
| | 00 | | 320 MHz | 4 × 996 | RU 1 | RU 1 |
| | 0-3: 80 MHz segment where the RU is located (80 MHz segment in which the RU is located) | 70-72 | 20 MHz, 40 MHz, 80 MHz, 160 MHz, and 320 MHz | RU 52 + RU 26 | MRU 1 to MRU 3 | MRU 1: RU 2 (26 T) + RU 2 (52 T) - reserved for BW ≥ 80 MHz<br>MRU 2: RU 5 (26 T) + RU 2 (52 T)<br>MRU 3: RU 8 (26 T) + RU 3 (52 T) |
| | | 73-75 | 40 MHz, 80 MHz, 160 MHz, and 320 MHz | | MRU 4 to MRU 6 | MRU 4: RU 11 (26 T) + RU 6 (52 T)<br>MRU 5: RU 14 (26 T) + RU 6 (52 T)<br>MRU 6: RU 17 (26 T) + RU 7 (52 T) - reserved for BW ≥ 80 MHz |
| | | 76-81 | 80 MHz, 160 MHz, and 320 MHz | | MRU 7-MRU 12 | MRU 7: RU 21 (26 T) + RU 10 (52 T) - reserved<br>MRU 8: RU 24 (26 T) + RU 10 (52 T)<br>MRU 9: RU 27 (26 T) + RU 11 (52 T)<br>MRU 10: RU 30 (26 T) + RU 14 (52 T)<br>MRU 11: RU 33 (26 T) + RU 14 (52 T)<br>MRU 12: RU 36 (26 T) + RU 15 (52 T) - reserved |
| | | 82-83 | 20 MHz, 40 MHz, 80 MHz, 160 MHz, and 320 MHz | RU 106 + RU 26 | MRU 1 and MRU 2 | MRU 1: RU 5 (26 T) + RU 1 (106 T)<br>MRU 2: RU 5 (26 T) + RU 2 (106 T) - reserved for BW ≥ 80 MHz |

TABLE 4(2d)-continued

| RU allocation subfield (resource unit allocation subfield) | | | | | | |
|---|---|---|---|---|---|---|
| BS: P/S 160 MHz (BS: primary/secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | | 84-85 | 40 MHz, 80 MHz, 160 MHz, and 320 MHz | | MRU 3 and MRU 4 | MRU 3: RU 14 (26 T) + RU 3 (106 T) - reserved for BW ≥ 80 MHz<br>MRU 4: RU 14 (26 T) + RU 4 (106 T) |
| | | 86-89 | 80 MHz, 160 MHz, and 320 MHz | | MRU 5-MRU 8 | MRU 5: RU 24 (26 T) + RU 5 (106 T)<br>MRU 6: RU 24 (26 T) + RU 6 (106 T) - reserved<br>MRU 7: RU 33 (26 T) + RU 7 (106 T) - reserved<br>MRU 8: RU 33 (26 T) + RU 8 (106 T) |
| | | 90-93 | 80 MHz, 160 MHz, and 320 MHz | RU 484 + RU 242 | MRU 1 to MRU 4 | MRU 1: RU 2 (242T) + RU 2 (484 T)<br>MRU 2: RU 1 (242T) + RU 2 (484 T)<br>MRU 3: RU 4 (242T) + RU 1 (484 T)<br>MRU 4: RU 3 (242T) + RU 1 (484 T) |
| 01 and 10 | | 94-95 | 160 MHz and 320 MHz | RU 996 + RU 484 | MRU 1 and MRU 2 | MRU 1: RU 2 (484 T) + RU 2 (996 T)<br>MRU 2: RU 1 (484 T) + RU 2 (996 T) |
| 00 and 11 | | | | | MRU 3 and MRU 4 | MRU 3: RU 4 (484 T) + RU 1 (996 T)<br>MRU 4: RU 3 (484 T) + RU 1 (996 T) |
| 01 and 10 | | 96-99 | 160 MHz and 320 MHz | RU 996 + RU 484 + RU 242 | MRU 1 to MRU 4 | MRU 1: RU 2 (242T) + RU 2 (484 T) + RU 2 (996 T)<br>MRU 2: RU 1 (242T) + RU 2 (484 T) + RU 2 (996 T)<br>MRU 3: RU 4 (242T) + RU 1 (484 T) + RU 2 (996 T)<br>MRU 4: RU 3 (242T) + RU 1 (484 T) + RU 2 (996 T) |
| 00 and 11 | | | | | MRU 5 to MRU 8 | MRU 5: RU 6 (242T) + RU 4 (484 T) + RU 1 (996 T)<br>MRU 6: RU 5 (242T) + RU 4 (484 T) + RU 1 (996 T)<br>MRU 7: RU 8 (242T) + RU 3 (484 T) + RU 1 (996 T)<br>MRU 8: RU 7 (242T) + RU 3 (484 T) + RU 1 (996 T) |
| 10 | | 100-103 | 320 MHz | RU 2 × 996 + RU 484 | MRU 1 and MRU 2 | MRU 1: RU 2 (484 T) + RU 2 (996 T) + RU 3 (996 T)<br>MRU 2: RU 1 (484 T) + RU 2 (996 T) + RU 3 (996 T)<br>2 reserved entries for B7:B1 = 102:103 |
| 11 | | | | | MRU 3 to MRU 6 | MRU 3: RU 4 (484 T) + RU 1 (996 T) + RU 3 (996 T)<br>MRU 4: RU 3 (484 T) + RU 1 (996 T) + RU 3 (996 T)<br>MRU 5: RU 4 (484 T) + RU 3 (996 T) + RU 4 (996 T)<br>MRU 6: RU 3 (484 T) + RU 3 (996 T) + RU 4 (996 T) |
| 01 | | | | | MRU 7 to MRU 10 | MRU 7: RU 6 (484 T) + RU 1 (996 T) + RU 2 (996 T)<br>MRU 8: RU 5 (484 T) + RU 1 (996 T) + RU 2 (996 T)<br>MRU 9: RU 6 (484 T) + RU 2 (996 T) + RU 4 (996 T)<br>MRU 10: RU 5 (484 T) + RU 2 (996 T) + RU 4 (996 T) |

TABLE 4(2d)-continued

| RU allocation subfield (resource unit allocation subfield) | | | | | | |
|---|---|---|---|---|---|---|
| BS: P/S 160 MHz (BS: primary/ secondary 160 MHz) | B0: 80 MHz P/S in P160 and L/U in S160 (B0: primary/secondary in primary 160 MHz and lower/upper in secondary 160 MHz) | B7-B1 | BW subfield (bandwidth subfield) | RU size (resource unit size) | RU index 11be (11be resource unit index) | Description |
| | 00 | | | | MRU 11 and MRU 12 | 2 reserved entries for B7:B1 = 100:101 MRU 11: RU 8 (484 T) + RU 2 (996 T) + RU 3 (996 T) MRU 12: RU 7 (484 T) + RU 2 (996 T) + RU 3 (996 T) |
| | 10 | 104 | 320 MHz | RU 3 × 996 | Reserved MRU 2 | MRU 2: RU 1 (996 T) + RU 2 (2 × 996 T) |
| | 11 | | | | MRU 1 | MRU 1: RU 2 (996 T) + RU 2 (2 × 996 T) |
| | 01 | | | | MRU 4 | MRU 4: RU 3 (996 T) + RU 1 (2 × 996 T) |
| | 00 | | | | MRU 3 | MRU 3: RU 4 (996 T) + RU 1 (2 × 996 T) |
| | 10 | 105-106 | 320 MHz | RU 3 × 996 + RU 484 | Reserved MRU 1 and MRU 2 | MRU 1: RU 2 (484 T) + RU 2 (996 T) + RU 2 (2 × 996 T) MRU 2: RU 1 (484 T) + RU 2 (996 T) + RU 2 (2 × 996 T) |
| | 11 | | | | MRU 3 and MRU 4 | MRU 3: RU 4 (484 T) + RU 1 (996 T) + RU 2 (2 × 996 T) MRU 4: RU 3 (484 T) + RU 1 (996 T) + RU 2 (2 × 996 T) |
| | 01 | | | | MRU 5 and MRU 6 | MRU 5: RU 6 (484 T) + RU 4 (996 T) + RU 1 (2 × 996 T) MRU 6: RU 5 (484 T) + RU 4 (996 T) + RU 1 (2 × 996 T) |
| | 00 | | | | MRU 7 and MRU 8 | MRU 7: RU 8 (484 T) + RU 3 (996 T) + RU 1 (2 × 996 T) MRU 8: RU 7 (484 T) + RU 3 (996 T) + RU 1 (2 × 996 T) |
| | | 107-127 | | | Reserved | |

Embodiment (4): 2-Bit Location Indication+7-Bit Table Indication Method

This is another technical solution for indicating an RU allocation subfield by using a table, that is, only a 7-bit table indication method is used to indicate a specific RU/MRU in an 80 MHz location case determined by bits BS and B0. A (3*996+484)-tone MRU is used as an example. When a 7-bit indication is 105 (B7-B1), there are the following four MRU cases in total.

$$MRU\ 1{:}\ RU\,2\ (484\ \mathrm{T}) + RU\,2\ (996\ \mathrm{T}) + RU\,2\ (2\times 996\ \mathrm{T})$$

$$MRU\ 3{:}\ RU\,4\ (484\ \mathrm{T}) + RU\,1\ (996\ \mathrm{T}) + RU\,2\ (2\times 996\ \mathrm{T})$$

-continued $$MRU\ 5{:}\ RU\,6\ (484\ \mathrm{T}) + RU\,4\ (996\ \mathrm{T}) + RU\,1\ (2\times 996\ \mathrm{T})$$

$$MRU\ 7{:}\ RU\,8\ (484\ \mathrm{T}) + RU\,3\ (996\ \mathrm{T}) + RU\,1\ (2\times 996\ \mathrm{T})$$

It may be determined, based on a 2-bit BS and B0 indication, to select the MRU 1, the MRU 3, the MRU 5, or the MRU 7. That is, an idea of the method is that after an RU/MRU set corresponding to a specific value of 7 bits is provided, a specific MRU in the set may be determined with reference to the 2 bits BS and B0.

It should be noted that an MRUx or RUx of a corresponding resource unit size may represent a specific RU/MRU location.

A primary/secondary location indication method is used for the 2 bits BS and B0, and the 2-bit indication may indicate a location of 80 MHz in which a smallest RU in an RU/MRU is located. Details are shown in Table 4(3).

TABLE 4(3)

| B7-B1 | BW subfield (bandwidth subfield) | RU size (resource unit size) | RU index 11be (11be resource unit index) | Description |
|---|---|---|---|---|
| 0-8 | 20 MHz, 40 MHz, 80 MHz, 160 MHz, and 320 MHz | 26 | RU 1 to RU 9 | 26-tone RU: 11ax: RUs 1-37, where an RU 19 is a DC RU in 80 MHz (11ax: RUs 1-37, where an RU 19 is a DC RU in 80 MHz) 11be: RUs 1-18 in lower 40 MHz and 20-37 in upper 40 MHz, where an RU 19 does not exist (11be: 1-18 in lower 40 MHz and 20-37 in upper 40 MHz, where an RU 19 does not exist or is not defined) (A DC RU represents a direct current RU) |
| 9-17 | 40 MHz, 80 MHz, 160 MHz, and 320 MHz | | RU 10 to RU 18 | |
| 18 | 80 MHz, 160 MHz, and 320 MHz | | Not defined (not defined) | |
| 19-36 | 80 MHz, 160 MHz, and 320 MHz | | RU 20 to RU 37 | |
| 37-40 | 20 MHz, 40 MHz, 80 MHz, 160 MHz, and 320 MHz | 52 | RU 1 to RU 4 | Same numbering for 11ax and 11be (same numbering for 11ax and 11be) |
| 41-44 | 40 MHz, 80 MHz, 160 MHz, and 320 MHz | | RU 5 to RU 8 | |
| 45-52 | 80 MHz, 160 MHz, and 320 MHz | | RU 9 to RU 16 | |
| 53 and 54 | 20 MHz, 40 MHz, 80 MHz, 160 MHz, and 320 MHz | 106 | RU 1 and RU 2 | |
| 55 and 56 | 40 MHz, 80 MHz, 160 MHz, and 320 MHz | | RU 3 and RU 4 | |
| 57-60 | 80 MHz, 160 MHz, and 320 MHz | | RU 5 to RU 8 | |
| 61 | 20 MHz, 40 MHz, 80 MHz, 160 MHz, and 320 MHz | 242 | RU 1 | |
| 62 | 40 MHz, 80 MHz, 160 MHz, and 320 MHz | | RU 2 | |
| 63 and 64 | 80 MHz, 160 MHz, and 320 MHz | | RU 3 and RU 4 | |
| 65 | 40 MHz, 80 MHz, 160 MHz, and 320 MHz | 484 | RU 1 | |
| 66 | 80 MHz, 160 MHz, and 320 MHz | | RU 2 | |
| 67 | 80 MHz, 160 MHz, and 320 MHz | 996 | RU 1 | |
| 68 | | Reserved | | B0 is set to 0 (B0 is set to 0) |
| | 160 MHz and 320 MHz | 2 × 996 | RU 1 | B0 is set to 1 (B0 is set to 1) |
| 69 | | Reserved | | BS-B0 is not equal to 11 (BS-B0 is not equal to 11) |
| | 320 MHz | 4 × 996 | RU 1 | Both BS and B0 are set to 1 (both BS and B0 are set to 1, in other words, 11) |
| 70-72 | 20 MHz, 40 MHz, 80 MHz, 160 MHz, and 320 MHz | RU 52 + RU 26 | MRU 1 to MRU 3 | The MRU index indicates the MRU in the 80 MHz segment that is indicated by BS and B0 (the MRU index indicates the MRU in the 80 MHz segment that is indicated by BS and B0) |
| 73-75 | 40 MHz, 80 MHz, 160 MHz, and 320 MHz | | MRU 4 to MRU 6 | |
| 76-81 | 80 MHz, 160 MHz, and 320 MHz | | MRU 7-MRU 12 | |

TABLE 4(3)-continued

| B7-B1 | BW subfield (bandwidth subfield) | RU size (resource unit size) | RU index 11be (11be resource unit index) | Description |
|---|---|---|---|---|
| 82-83 | 20 MHz, 40 MHz, 80 MHz, 160 MHz, and 320 MHz | RU 106 + RU 26 | MRU 1 and MRU 2 | |
| 84-85 | 40 MHz, 80 MHz, 160 MHz, and 320 MHz | | MRU 3 and MRU 4 | |
| 86-89 | 80 MHz, 160 MHz, and 320 MHz | | MRU 5-MRU 8 | |
| 90-93 | 80 MHz, 160 MHz, and 320 MHz | RU 484 + RU 242 | MRU 1 to MRU 4 | The MRU index indicates the RU in the 80 MHz segment that is indicated by BS and B0 (the MRU index indicates the MRU in the 80 MHz segment that is indicated by BS and B0) |
| 94<br>95 | 160 MHz and 320 MHz | RU 996 + RU 484 | MRU 1 or MUR 3<br>MRU 2 or MUR 4 | Indicate the MRU that includes the 484-tone RU that is located in the 80-segment indicated by BS and B0 (indicate the MRU that includes the 484-tone RU that is located in the 80 MHz segment indicated by BS and B0) |
| 96<br>97<br>98<br>99 | 160 MHz and 320 MHz | RU 996 + RU 484 + RU 242 | MRU 1 or MRU 5<br>MRU 2 or MRU 6<br>MRU 3 or MRU 7<br>MRU 4 or MRU 8 | Indicate the MRU that includes the 242-tone RU that is located in the 80 segment indicated by BS and B0 (indicate the MRU that includes the 242-tone RU that is located in the 80 MHz segment indicated by BS and B0) |
| 100 | 320 MHz | RU 2 × 996 + RU 484 | MRU 1, MRU 3, or MRU 5 | Indicate the MRU that includes the 484-tone RU that is located in the 80 segment indicated by BS and B0 (indicate the MRU that includes the 484-tone RU that is located in the 80 MHz segment indicated by BS and B0) |
| 101 | | | MRU 2, MRU 4, or MRU 6 | Indicate the MRU that includes the 484-tone RU that is located in the 80 segment indicated by BS and B0 (indicate the MRU that includes the 484-tone RU that is located in the 80 MHz segment indicated by BS and B0) |
| 102 | | | MRU 7, MRU 9, or MRU 11 | Indicate the MRU that includes the 484-tone RU that is located in the 80 segment indicated by BS and B0 (indicate the MRU that includes the 484-tone RU that is located in the 80 MHz segment indicated by BS and B0) |
| 103 | | | MRU 8, MRU 10, or MRU 12 | Indicate the MRU that includes the 484-tone RU that is located in the 80 segment indicated by BS and B0 (indicate the MRU that includes the 484-tone RU that is located in the 80 MHz segment indicated by BS and B0) |

TABLE 4(3)-continued

| B7-B1 | BW subfield (bandwidth subfield) | RU size (resource unit size) | RU index 11be (11be resource unit index) | Description |
|---|---|---|---|---|
| 104 | 320 MHz | RU 3 × 996 | MRU 1, MRU 2, MRU 3, or MRU 4 | Indicate the MRU that includes the 996-tone RU that is located in the 80 segment indicated by BS and B0 (indicate the MRU that includes the 996-tone RU that is located in the 80 MHz segment indicated by BS and B0) |
| 105 | 320 MHz | RU 3 × 996 + RU 484 | MRU 1, MRU 3, MRU 5, or MUR 7 | Indicate the MRU that includes the 484-tone RU that is located in the 80 segment indicated by BS and B0 (indicate the MRU that includes the 484-tone RU that is located in the 80 MHz segment indicated by BS and B0) |
| 106 | | | MRU 2, MRU 4, MRU 6, or MUR 8 | Indicate the MRU that includes the 484-tone RU that is located in the 80 segment indicated by BS and B0 (indicate the MRU that includes the 484-tone RU that is located in the 80 MHz segment indicated by BS and B0) |
| 107-127 | | | Reserved | |

For a meaning of the MRU in the table, refer to an appendix "MRU index" shown in Table 4(4a) and Table 4(4b).

An MRU index is an MRU index. It should be noted that the MRU index does not represent a value obtained by using 7 bits or 9 bits in a resource unit allocation subfield, but may be understood as an MRU pattern. Table 4(4a) and Table 4(4b) show MRU indexes existing when there is 160 MHz and there is 320 MHz.

TABLE 4(4a)

| MRU type (MRU type) | MRU index (MRU index) | MRU combination (MRU combination) Note: Empty means empty |
|---|---|---|
| RU 996 + RU 484 | MRU 1 | RU 996 + RU 484; [empty-RU 484 RU 484 RU 996] |
| | MRU 2 | RU 996 + RU 484; [RU 484 empty-RU 484 RU 996] |
| | MRU 3 | RU 996 + RU 484; [RU 996 empty-RU 484 RU 484] |
| | MRU 4 | RU 996 + RU 484; [RU 996 RU 484 empty-RU 484] |
| RU 996 + RU 484 + RU 242 (only for non-OFDMA) | MRU 1 | RU 996 + RU 484 + RU 242; [empty-RU 242 RU 242 RU 484 RU 996] |
| | MRU 2 | RU 996 + RU 484 + RU 242; [RU 242 empty-RU 242 RU 484 RU 996] |
| | MRU 3 | RU 996 + RU 484 + RU 242; [RU 484 empty-RU 242 RU 242 RU 996] |
| | MRU 4 | RU 996 + RU 484 + RU 242; [RU 484 RU 242 empty-RU 242 RU 996] |
| | MRU 5 | RU 996 + RU 484 + RU 242; [RU 996 empty-RU 242 RU 242 RU 484] |
| | MRU 6 | RU 996 + RU 484 + RU 242; [RU 996 RU 242 empty-RU 242 RU 484] |
| | MRU 7 | RU 996 + RU 484 + RU 242; [RU 996 RU 484 empty-RU 242 RU 242] |
| | MRU 8 | RU 996 + RU 484 + RU 242; [RU 996 RU 484 RU 242 empty-RU 242] |

TABLE 4(4b)

| MRU type (MRU type) | MRU index (MRU index) | MRU combination (MRU combination) Note: Empty means empty |
|---|---|---|
| 2 × RU 996 + RU 484 | MRU 1 | 2 × RU 996 + RU 484; [empty-RU 484 RU 484 RU 996 RU 996 empty-RU 996] |
| | MRU 2 | 2 × RU 996 + RU 484; [RU 484 empty-RU 484 RU 996 RU 996 empty-RU 996] |
| | MRU 3 | 2 × RU 996 + RU 484; [RU 996 empty-RU 484 RU 484 RU 996 empty-RU 996] |
| | MRU 4 | 2 × RU 996 + RU 484; [RU 996 RU 484 empty-RU 484 RU 996 empty-RU 996] |
| | MRU 5 | 2 × RU 996 + RU 484; [RU 996 RU 996 empty-RU 484 RU 484 empty-RU 996] |
| | MRU 6 | 2 × RU 996 + RU 484; [RU 996 RU 996 RU 484 empty-RU 484 empty-RU 996] |
| | MRU 7 | 2 × RU 996 + RU 484; [empty-RU 996 empty-RU 484 RU 484 RU 996 RU 996] |
| | MRU 8 | 2 × RU 996 + RU 484; [empty-RU 996 RU 484 empty-RU 484 RU 996 RU 996] |
| | MRU 9 | 2 × RU 996 + RU 484; [empty-RU 996 RU 996 empty-RU 484 RU 484 RU 996] |
| | MRU 10 | 2 × RU 996 + RU 484; [empty-RU 996 RU 996 RU 484 empty-RU 484 RU 996] |
| | MRU 11 | 2 × RU 996 + RU 484; [empty-RU 996 RU 996 RU 996 empty-RU 484 RU 484] |
| | MRU 12 | 2 × RU 996 + RU 484; [empty-RU 996 RU 996 RU 996 RU 484 empty-RU 484] |
| 3 × RU 996 | MRU 1 | 3 × RU 996; [empty-RU 996 RU 996 RU 996 RU 996] |
| | MRU 2 | 3 × RU 996; [RU 996 empty-RU 996 RU 996 RU 996] |
| | MRU 3 | 3 × RU 996; [RU 996 RU 996 empty-RU 996 RU 996] |
| | MRU 4 | 3 × RU 996; [RU 996 RU 996 RU 996 empty-RU 996] |
| 3 × RU 996 + RU 484 | MRU 1 | 3 × RU 996 + RU 484; [empty-RU 484 RU 484 RU 996 RU 996 RU 996] |
| | MRU 2 | 3 × RU 996 + RU 484; [RU 484 empty-RU 484 RU 996 RU 996 RU 996] |
| | MRU 3 | 3 × RU 996 + RU 484; [RU 996 empty-RU 484 RU 484 RU 996 RU 996] |
| | MRU 4 | 3 × RU 996 + RU 484; [RU 996 RU 484 empty-RU 484 RU 996 RU 996] |
| | MRU 5 | 3 × RU 996 + RU 484; [RU 996 RU 996 empty-RU 484 RU 484 RU 996] |
| | MRU 6 | 3 × RU 996 + RU 484; [RU 996 RU 996 RU 484 empty-RU 484 RU 996] |
| | MRU 7 | 3 × RU 996 + RU 484; [RU 996 RU 996 RU 996 empty-RU 484 RU 484] |
| | MRU 8 | 3 × RU 996 + RU 484; [RU 996 RU 996 RU 996 RU 484 empty-RU 484] |

It should be understood that the mapping relationship between the index and the RU/MRU in the table, for example, Table 4(1), Table 4(2), Table 4(2a), Table 4(2b), Table 4(2c), Table 4(2d), Table 4(3), Table 4(4a), or Table 4(4b), provided in embodiments of this application is merely an example. In specific implementation, another table form may be derived based on the technical solutions provided in embodiments of this application, and shall fall within the protection scope of embodiments of this application. It should be further understood that the primary/secondary indication method provided in embodiments of this application may be implemented in combination with another embodiment of this application provided that solutions do not conflict, for example, may be implemented in combination with resource unit indication methods and an apparatus provided in Embodiment 1 to Embodiment 6.

Embodiment 2: The resource unit indication method 120 is mainly described in Embodiment 2.

Figure 15:
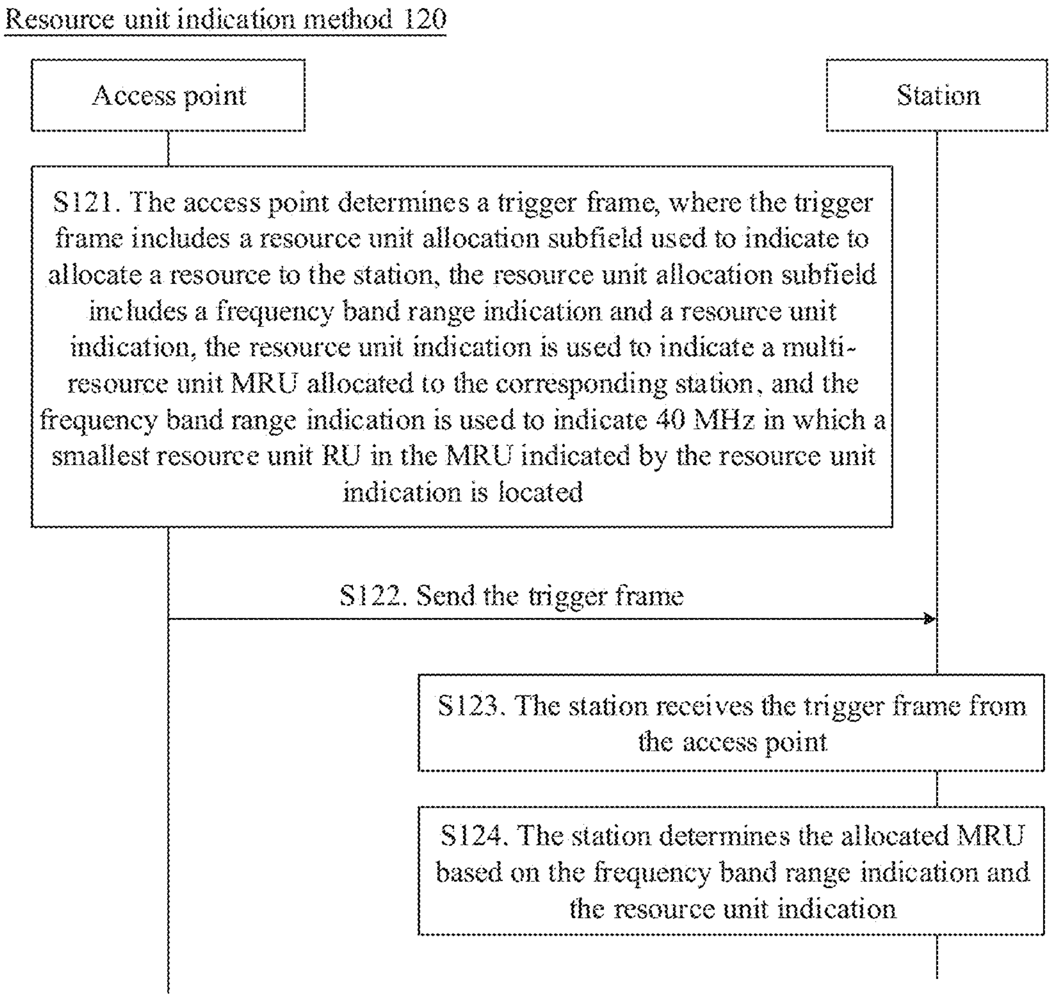
FIG. 15 is a schematic flowchart of a resource unit indication method 120 according to an embodiment of this application.

FIG. 15 is a schematic flowchart of the resource unit indication method 120 according to this embodiment of this application. A difference between the resource unit indication method 120 shown in FIG. 15 and the resource unit indication method 110 shown in FIG. 6 lies in that a frequency band range indication indicates a different frequency band range, that is, the frequency band range indication in the resource unit indication method 120 is used to indicate 40 MHz in which a smallest RU in an MRU indicated by a resource unit indication is located. As shown in FIG. 15, the resource unit indication method 120 may include but is not limited to the following steps.

S121. An access point determines a trigger frame.

The trigger frame includes a resource unit allocation subfield used to indicate to allocate a resource to a station. The resource unit allocation subfield includes a frequency band range indication and a resource unit indication. The resource unit indication is used to indicate a multi-resource unit MRU allocated to the corresponding station. The frequency band range indication is used to indicate 40 MHz in which a smallest resource unit RU in the MRU indicated by the resource unit indication is located.

S122. The access point sends the trigger frame.

S123. The station receives the trigger frame from the access point.

S124. The station determines the allocated MRU based on the frequency band range indication and the resource unit indication.

In an implementation, that the station determines the allocated MRU based on the frequency band range indication and the resource unit indication in step S124 includes: The station determines the 40 MHz indicated by the frequency band range indication, may learn that the smallest RU in the MRU indicated by the resource unit indication is in the 40 MHZ, and then learns of the allocated MRU with reference to an index indicated by the resource unit indication.

For example, the MRU indicated by the resource unit indication is a (52+26)-tone RU, and the frequency band range indicated by the frequency band range indication is 40 MHz in which a 26-tone RU in the (52+26)-tone RU is located. Alternatively, the MRU indicated by the resource unit indication is a (106+26)-tone RU, and the frequency band range indicated by the frequency band range indication is 40 MHz in which a 26-tone RU in the (106+26)-tone RU is located. Alternatively, the MRU indicated by the resource unit indication is a (484+242)-tone RU, and the frequency band range indicated by the frequency band range indication is 40 MHz in which a 242-tone RU in the (484+242)-tone RU is located. Alternatively, the MRU indicated by the resource unit indication is a (996+484)-tone RU, and the frequency band range indicated by the frequency band range indication is 40 MHz in which a 484-tone RU in the (996+484)-tone RU is located. Alternatively, the MRU indicated by the resource unit indication is a (2*996+484)-tone RU, and the frequency band range indicated by the frequency band range indication is 40 MHz in which a 484-tone RU in the (2*996+484)-tone RU is located. Alternatively, the MRU indicated by the resource unit indication is a 3*996-tone RU, and the frequency band range indicated by the frequency band range indication is 40 MHz in which one 996-tone RU in the 3*996-tone RU is located. Alternatively, the MRU indicated by the resource unit indication is a (3*996+484)-tone RU, and the frequency band range indicated by the frequency band range indication is 40 MHz in which a 484-tone RU in the (3*996+484)-tone RU is located. Alternatively, the MRU indicated by the resource unit indication is a (996+484+242)-tone RU, and the frequency band range indicated by the frequency band range indication is 40 MHz in which a 242-tone RU in the (996+484+242)-tone RU is located.

In this case, the 40 MHz in which the 996-tone RU is located indicates 40 MHz covered by the 996-tone RU. The 996-tone RU covers two 40 MHz frequency band ranges, and therefore the frequency range indication may indicate a location of either of the two 40 MHz frequency band ranges, is predefined to indicate a location of lowest 40 MHz in the two 40 MHz frequency band ranges, or is predefined to indicate a location of highest 40 MHz in the two 40 MHz frequency band ranges.

It is assumed that the resource unit allocation subfield includes 9 bits, and the frequency band range indication is a first bit to a third bit, denoted as B0, B1, and B2, in the resource unit allocation subfield. In this case, B0, B1, and B2 indicate 40 MHz in 320 MHz. It is assumed that Table 5 shows 40 MHz frequency band ranges that need to be indicated by the frequency band range indication (B0, B1, and B2), to indicate the 40 MHz in which the smallest RU in the MRU indicated by the resource unit indication is located. The 40 MHz frequency band ranges in the 320 MHz are sequentially referred to as first 40 MHz, second 40 MHz, third 40 MHz, fourth 40 MHz, fifth 40 MHz, sixth 40 MHz, seventh 40 MHz, and eighth 40 MHz in ascending order of frequencies. As shown in Table 5, there are different values for B0, B1, and B2, to respectively indicate the eight 40 MHz frequency band ranges.

TABLE 5

| Frequency band ranges that need to be indicated by the frequency band range indication (B0, B1, and B2) | |
|---|---|
| B2 to B0 in the resource unit allocation subfield (B2-B0 of RU Allocation subfield) | Meaning |
| 000 | First 40 MHz in the 320 MHz |
| 001 | Second 40 MHz in the 320 MHz |
| 010 | Third 40 MHz in the 320 MHz |
| 011 | Fourth 40 MHz in the 320 MHz |
| 100 | Fifth 40 MHz in the 320 MHz |
| 101 | Sixth 40 MHz in the 320 MHz |
| 110 | Seventh 40 MHz in the 320 MHz |
| 111 | Eighth 40 MHz in the 320 MHz |

The resource unit indication is a fourth bit to a ninth bit, denoted as B3 to B8, in the resource unit allocation subfield. In this case, with reference to the frequency band range indication and RUs or MRUs that needs to be indicated, the RUs or MRUs that need to be indicated by the resource unit indication may be shown in Table 6 but are not limited to those in Table 6. Values of B3 to B8 are in the first column in Table 6, and may be referred to as indexes indicated by the resource unit indication. The second column in Table 6 indicates a resource unit size corresponding to each index. The third column in Table 6 indicates the number of indexes, namely, the number of entries, corresponding to each resource unit size. In Table 6, a corresponding RU or MRU may be determined with reference to the frequency band range indication for each index.

TABLE 6

| Entries that can be indicated by the resource unit indication (B8 to B3) | | |
|---|---|---|
| B8 to B3 in the resource unit allocation subfield (B8-B3 of RU Allocation subfield) | RU size (RU size) | Number of entries (Number of entries) |
| 0-17 | 26 | 18 |
| 18-25 | 52 | 8 |
| 26-29 | 106 | 4 |
| 30-31 | 242 | 2 |
| 32 | 484 | 1 |
| 33 | 996 | 1 |
| 34 | 2 × 996 | 1 |
| 35 | 4 × 996 | 1 |
| 36-41 | 52 + 26 | 6 |
| 42-45 | 106 + 26 | 4 |
| 46-47 | 484 + 242 | 2 |
| 48 | 996 + 484 | 1 |
| 49-51 | 2 × 996 + 484 | 3 |
| 52-54 | 3 × 996 | 3 |
| 55 | 3 × 996 + 484 | 1 |
| 56-57 | 996 + 484 + 242 | 2 |

As shown in FIG. 3, there are 18 locations for the 26-tone RU in the 40 MHz. Therefore, based on the 40 MHz indicated by the frequency band range indication, the resource unit indication indicates one of the indexes 0 to 17 shown in Table 6, to indicate one corresponding 26-tone RU in the 40 MHz. It may be learned that the number of indexes required to indicate the location of the 26-tone RU in a bandwidth is reduced in this implementation.

As shown in FIG. 3, there are eight locations for the 52-tone RU in the 40 MHz. Therefore, based on the 40 MHz indicated by the frequency band range indication, the resource unit indication indicates one of the indexes 18 to 25 shown in Table 6, to indicate one corresponding 52-tone RU in the 40 MHz. It may be learned that the number of indexes required to indicate the location of the 52-tone RU in a bandwidth is reduced in this implementation.

As shown in FIG. 3, there are four locations for the 106-tone RU in the 40 MHz. Therefore, based on the 40 MHz indicated by the frequency band range indication, the resource unit indication indicates one of the indexes 26 to 29 shown in Table 6, to indicate one corresponding 106-tone RU in the 40 MHz.

As shown in FIG. 3, there are two locations for the 242-tone RU in the 40 MHz. Therefore, based on the 40 MHz indicated by the frequency band range indication, the resource unit indication indicates one of the indexes 30 and 31 shown in Table 6, to indicate one corresponding 242-tone RU in the 40 MHz.

As shown in FIG. 3, there is one location for the 484-tone RU in the 40 MHz. Therefore, based on the 40 MHz indicated by the frequency band range indication, the resource unit indication indicates the index 32 shown in Table 6, to indicate the 484-tone RU corresponding to the 40 MHz.

As shown in FIG. 3, the 996-tone RU occupies two 40 MHz frequency band ranges, and therefore the frequency band range indication may indicate either of the two 40 MHz frequency band ranges. Correspondingly, based on the 40 MHz indicated by the frequency band range indication, the resource unit indication may indicate the index 33 shown in Table 6, to indicate the 996-tone RU corresponding to the 40 MHz. For example, if the frequency band range indication is 000, it may be learned, based on Table 5, that the 40 MHz indicated by the frequency band range indication is the first 40 MHz in the 320 MHz. If the resource unit indication indicates the index 33, it may be learned, with reference to Table 6, that an RU corresponding to the index 33 is a 996-tone RU, and it may be learned, with reference to the first 40 MHz in the 320 MHz that is indicated by the frequency band range indication, that the 996-tone RU indicated by the resource unit indication is a first 996-tone RU in the 320 MHz.

The 2*996-tone RU cannot span two 160 MHz frequency band ranges, in other words, a frequency band range in which the 2*996-tone RU is located can only be primary 160 MHz or secondary 160 MHz. Therefore, the frequency band range indication may indicate 40 MHz in which one 996-tone RU in the 2*996-tone RU is located, and a location of the 2*996-tone RU may be learned of. Therefore, the resource unit indication needs only one index 34. For example, the station may determine, based on the frequency band range indication and Table 5, that the 40 MHz in which the smallest RU in the MRU is located is the first 40 MHz, and then the station may learn, with reference to information indicating that an RU size corresponding to the index 34 indicated by the resource unit indication is a 2*996-tone RU, that the allocated 2*996-tone RU corresponds to the primary 160 MHz.

There is only one 4*996-tone RU in the 320 MHz. Therefore, the resource unit indication may indicate one index 35, so that the station may learn that the allocated RU is the 4*996-tone RU.

There are three combinations shown in FIG. 7 for the (52+26)-tone RU in 20 MHz. Therefore, based on the 40 MHz in which a 26-tone RU is located and that is indicated by the frequency band range indication, the resource unit indication further needs to indicate one of the indexes 36 to 41, to indicate one corresponding (52+26)-tone RU in the 40 MHz. The indexes 36 to 41 in ascending order may be in a one-to-one correspondence with start frequencies of the six (52+26)-tone RUs in ascending order.

There are two combinations shown in FIG. 8 for the (106+26)-tone RU in 20 MHz. Therefore, there are four (namely, 2*2) combinations for the (106+26)-tone RU in the 40 MHz. Therefore, based on the 40 MHz in which a 26-tone RU is located and that is indicated by the frequency band range indication, the resource unit indication further needs to indicate one of the indexes 42 to 45, to indicate one corresponding (106+26)-tone RU in the 40 MHz. The indexes 42 to 45 in ascending order may be in a one-to-one correspondence with start frequencies of the eight (106+26)-tone RUs in ascending order.

There are four combinations shown in FIG. 9 for the (484+242)-tone RU in 80 MHz. Therefore, based on the 40 MHz in which a 242-tone RU is located and that is indicated by the frequency band range indication, the resource unit indication needs to indicate only either of two locations of the 242-tone RU in the 40 MHz because a 484-tone RU in the (484+242)-tone RU is at a fixed location. Therefore, the resource unit indication further needs to indicate one of the indexes 46 and 47, to indicate one corresponding (484+242)-tone RU. The indexes 46 and 47 in ascending order may be in a one-to-one correspondence with start frequencies of the 242-tone RU at the two locations in the 40 MHz in ascending order. For example, the index 46 corresponds to a first 242-tone RU in the 40 MHZ, and the index 47 corresponds to a second 242-tone RU in the 40 MHz.

The (996+484)-tone RU may be located in primary 160 MHz or secondary 160 MHz, and therefore there are four combinations shown in FIG. 10 for the (996+484)-tone RU in 160 MHz. Therefore, based on the 40 MHz in which a 484-tone RU is located and that is indicated by the frequency band range indication, the station may directly learn of locations of a 996-tone RU and the 484-tone RU in the (996+484)-tone RU. Therefore, the resource unit indication needs to indicate only one index 48.

In this way, for a side of the access point, the frequency band range indication may indicate the 40 MHz in which the 484-tone RU in the (996+484)-tone RU is located, and the resource unit indication may indicate the index 48, to notify the station that a size of the allocated RU is the (996+484)-tone RU. Correspondingly, after receiving the resource unit allocation subfield, the station may determine a location of the allocated (996+484)-tone RU based on the 40 MHz indicated by the frequency band range indication and with reference to the index 48 indicated by the resource unit indication and Table 6.

In an implementation, there is a limitation that the (2*996+484)-tone RU indicated by the resource unit indication exists only in lowest or highest 240 MHz in the 320 MHz. In this way, there are six combinations shown in FIG. 11 for the (2*996+484)-tone RU in the 240 MHz, in other words, there are six combinations shown in FIG. 11 for the (2*996+484)-tone RU in the lowest or highest 240 MHz in the 320 MHz. Based on the 40 MHz in which a 484-tone RU in the (2*996+484)-tone RU is located and that is indicated by the frequency band range indication, the remaining two 996-tone RUs may be two 996-tone RUs in the lowest 240 MHz or two 996-tone RUs in the highest 240 MHz. Therefore, the resource unit indication further needs two indexes, for example, the index 52 and an index 53. One index corresponds to the lowest 240 MHZ, and the other index corresponds to the highest 240 MHz.

In another implementation, to simplify logic, there is no limitation that the (2*996+484)-tone RU indicated by the resource unit indication exists only in lowest or highest 240 MHz in the 320 MHz. In this way, based on the 40 MHz in which a 484-tone RU in the (2*996+484)-tone RU is located and that is indicated by the frequency band range indication, the remaining two 996-tone RUs may be any two of three other 996-tone RUs in a frequency band range, in the 320 MHZ, other than the 80 MHz in which the 484-tone RU is located. Therefore, the resource unit indication further needs to indicate three indexes, namely, the indexes 49 to 51, to indicate a corresponding location of the (2*996+484)-tone RU.

There are four combinations shown in FIG. 12 for the 3*996-tone RU in the 320 MHz. Therefore, based on the 40 MHz in which a 996-tone RU is located and that is indicated by the frequency band range indication, there are three options for the remaining two 996-tone RUs in the 3*996-tone RU in the 320 MHz. Therefore, the resource unit indication further needs to indicate one of the indexes 52 to 54, to indicate a location of the remaining two 996-tone RUs combined with the 996-tone RU corresponding to the 40 MHz in the 320 MHz. The indexes 52 to 54 in ascending order may be in a one-to-one correspondence with start frequencies, in ascending order, of the three 3*996-tone RUs that exist when there are the three options for the remaining two 996-tone RUs.

For example, a size of the MRU indicated by the resource unit indication is a 3*996-tone RU, and indexes indicated by the resource unit indication are in a one-to-one correspondence with start frequencies of optional combinations of the 3*996-tone RU in ascending order. In this case, when allocating a 3*996-tone RU shown in the last row shown in FIG. 12 to the station, the access point needs to set B0B1B2 corresponding to the station to 000 (or 001), and set B3 to B8 to 52 with reference to Table 5. Then, the station learns that the 40 MHz in which the smallest RU in the MRU is located is the first or second 40 MHz in the 320 MHz, an RU size corresponding to an index indicated by B3 to B8 is a 3*996-tone RU, and the index indicated by B3 to B8 is 52. The index 52 in Table 6 corresponds to a 3*996-tone RU shown in the third row in FIG. 12, an index 53 corresponds to a 3*996-tone RU shown in the second row in FIG. 12, and the index 54 corresponds to a 3*996-tone RU shown in the first row in FIG. 12. Therefore, the station may learn, based on the index 52, that the allocated 3*996-tone RU is the 3*996-tone RU shown in the third row in FIG. 12.

There are eight combinations shown in FIG. 13 for the (3*996+484)-tone RU in the 320 MHz. Therefore, based on the 40 MHz in which a 484-tone RU is located and that is indicated by the frequency band range indication, there is only one option for the remaining three 996-tone RUs in the 320 MHZ, and the 484-tone RU is at a fixed location. Therefore, the resource unit indication needs only one index 54.

There are four combinations shown in FIG. 14 for the (484+242)-tone RU in 80 MHz, and therefore there are eight combinations for the (996+484+242)-tone RU in 160 MHz. Therefore, based on the 40 MHz in which a 242-tone RU is located and that is indicated by the frequency band range indication, there is only one option for a 996-tone RU in a frequency band range other than the 80 MHz in the 160 MHz, but there are two locations for the 242-tone RU in the 40 MHz. Therefore, the resource unit indication further needs to indicate one of the indexes 55 and 56, to indicate one location of the 242-tone RU in the 40 MHz. The indexes 55 and 56 in ascending order may be in a one-to-one correspondence with start frequencies of the 242-tone RU at the two locations in the 40 MHz in ascending order.

It may be learned from the foregoing analysis that the frequency band range in which the smallest RU in the MRU is located can be further notified by using the frequency band range indicated by the frequency band range indication, and therefore this helps the resource unit indication to use a smaller number of indexes to respectively indicate various possible locations of the MRU. For example, as shown in Table 6, the resource unit indication needs only two indexes to respectively indicate the eight combinations of the (996+484+242)-tone RU. For another example, as shown in Table 6, the resource unit indication needs only one index to respectively indicate the eight combinations of the (3*996+484)-tone RU. In comparison with a manner in which the frequency band range indication indicates only lowest 80 MHz related to the MRU, the frequency band range indication in the resource unit indication method 120 may carry more information, in other words, may carry the 40 MHz in which the smallest RU in the MRU is located. For example, if the frequency band range indication indicates only the lowest 80 MHz related to the MRU, the resource unit indication needs four indexes to respectively indicate the four combinations of the (996+484)-tone RU shown in FIG. 10. If the frequency band range indication is used to indicate the 40 MHz in which the smallest RU in the MRU is located, the resource unit indication needs only one index to indicate all the combinations of the (996+484)-tone RU, as shown in Table 6. Therefore, the frequency band range indication in the resource unit indication method 120 may carry more information, and this helps the resource unit indication to use a smaller number of indexes to respectively indicate various possible locations of the MRU.

In this embodiment of this application, the frequency band range indication is used to indicate the frequency band range in which the smallest RU in the MRU is located. In addition to the 80 MHz in the resource unit indication method 110 and the 40 MHz in the resource unit indication method 120, the frequency band range indication may indicate 160 MHz, 240 MHz, or 320 MHz. In other words, in a resource unit indication method, the frequency band range indication is used to indicate 160 MHz in which the smallest RU in the MRU is located. In another resource unit indication method, the frequency band range indication is used to indicate 240 MHz in which the smallest RU in the MRU is located. In still another resource unit indication method, the frequency band range indication is used to indicate 320 MHz in which the smallest RU in the MRU is located. For related content of these resource unit indication methods, refer to the resource unit indication method 110 and the resource unit indication method 120. Details are not described herein.

In addition, in the foregoing resource unit indication methods, when the frequency band range in which the smallest RU in the MRU is located is greater than the frequency band range indicated by the frequency band range indication, the frequency band range indicated by the frequency band range indication may be a lowest frequency band range or a highest frequency band range covered by the smallest RU, or the frequency band range indicated by the frequency band range indication may be any frequency band range or a preset frequency band range. For example, in a resource unit indication method, when the frequency band range indicated by the frequency band range indication is less than the frequency band range in which the smallest RU in the MRU is located, the frequency band range indicated by the frequency band range indication is the lowest frequency band range corresponding to the smallest RU. For another example, in a resource unit indication method, when the frequency band range indicated by the frequency band range indication is less than the frequency band range in which the smallest RU in the MRU is located, the frequency band range indicated by the frequency band range indication is the highest frequency band range corresponding to the smallest RU.

For example, in the resource unit indication method 120, it is assumed that the MRU indicated by the resource unit indication is a 3*996-tone RU, and a smallest RU in the 3*996-tone RU is a 996-tone RU. The 40 MHz indicated by the frequency band range indication is less than a frequency band range corresponding to the smallest RU, and therefore the 40 MHz indicated by the frequency band range indication may be any 40 MHz frequency band range corresponding to the 996-tone RU, or may be predefined lowest 40 MHz or highest 40 MHz corresponding to the 996-tone RU.

In addition, if there are a plurality of smallest RUs in the MRU, the frequency band range indication may indicate any frequency band range or a preset frequency band range, for example, a frequency band range in which a first smallest RU is located or a frequency band range in which a last smallest RU is located. For example, in the resource unit indication method 110, the 3*996-tone RU includes three smallest RUs, which are all 996-tone RUs. Therefore, the 80 MHz indicated by the frequency band range indication may be 80 MHz in which any 996-tone RU is located, 80 MHz in which a first 996-tone RU in the 3*996-tone RU is located, or 80 MHz in which a last 996-tone RU in the 3*996-tone RU is located.

Optionally, this application further provides some resource unit indication methods. If the MRU indicated by the resource unit indication is a (2*996+484)-tone RU, when the 80 MHz indicated by the frequency band range indication is the first or second 80 MHz in the 320 MHz, it indicates that 240 MHz in which the (2*996+484)-tone RU is located is the first 80 MHz to the third 80 MHz in the 320 MHz; or when the 80 MHz indicated by the frequency band range indication is the third or fourth 80 MHz in the 320 MHz, it indicates that 240 MHz in which the (2*996+484)-tone RU is located is the second 80 MHz to the fourth 80 MHz in the 320 MHz. In this way, the station may learn of, based on the frequency band range indication, the 240 MHz in which the (2*996+484)-tone RU indicated by the resource unit indication is located.

Embodiment 3: The resource unit indication method 210 is mainly described in Embodiment 3.

Figure 16:
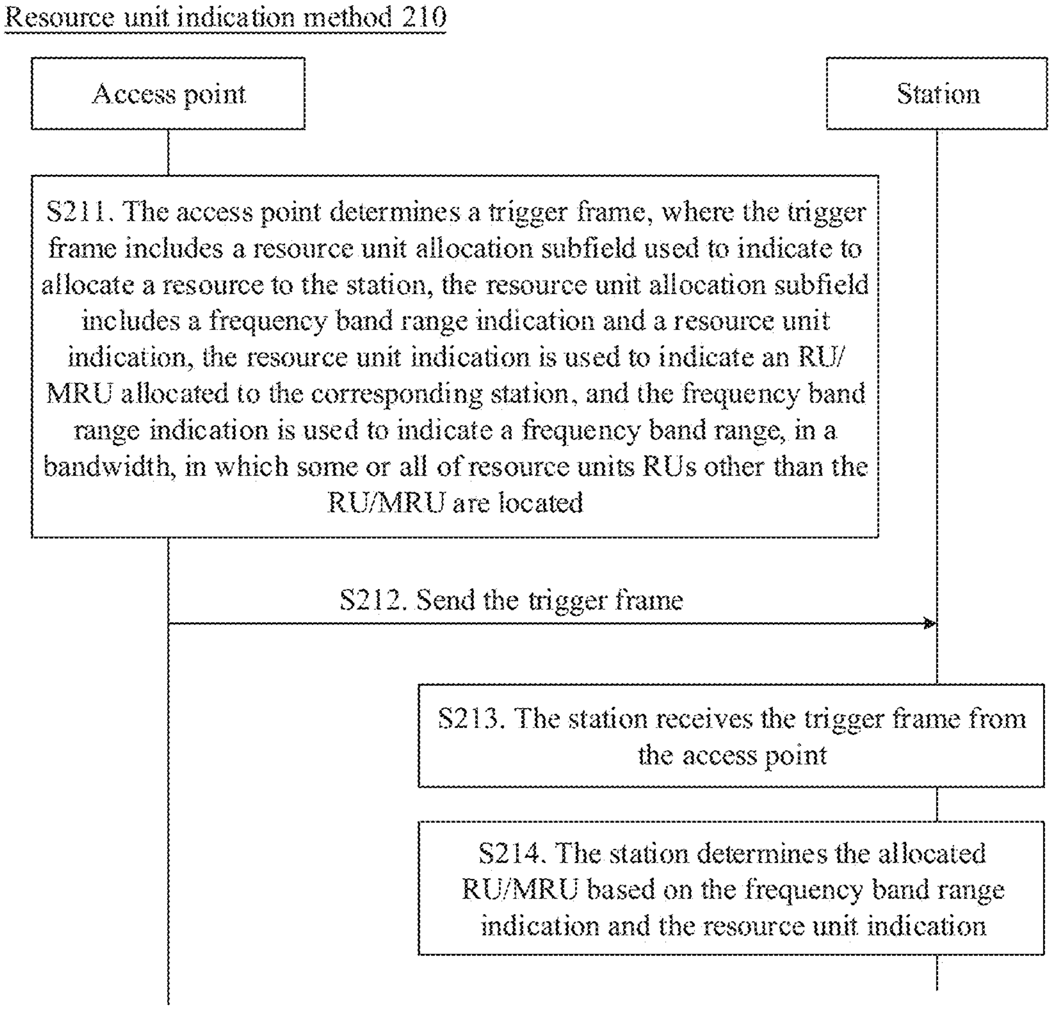
FIG. 16 is a schematic flowchart of a resource unit indication method 210 according to an embodiment of this application.

This application further provides the resource unit indication method 210. In the resource unit indication method 210, a frequency band range indication is used to indicate a frequency band range, in a bandwidth, in which some or all of resource units RUs other than an RU/MRU indicated by a resource unit indication are located. FIG. 16 is a schematic flowchart of the resource unit indication method 210 according to this embodiment of this application. As shown in FIG. 16, the resource unit indication method 210 may include but is not limited to the following steps.

S211. An access point determines a trigger frame.

The trigger frame includes a resource unit allocation subfield used to indicate to allocate a resource to a station. The resource unit allocation subfield includes a frequency band range indication and a resource unit indication. The resource unit indication is used to indicate an RU/MRU allocated to the corresponding station. The frequency band range indication is used to indicate a frequency band range, in a bandwidth, in which some or all of resource units RUs other than the RU/MRU are located.

S212. The access point sends the trigger frame.

S213. The station receives the trigger frame.

S214. The station determines the allocated RU/MRU based on the resource unit indication and the frequency band range indication.

That the station determines the allocated RU/MRU based on the resource unit indication and the frequency band range indication may include: The station determines, from a frequency band range, in 320 MHz, other than the frequency band range indicated by the frequency band range indication, the RU/MRU indicated by the resource unit indication.

In an implementation, the frequency band range indicated by the frequency band range indication is 40 MHz in the bandwidth, and the MRU indicated by the resource unit indication is determined from a frequency band range other than the 40 MHz indicated by the frequency band range indication.

For example, if the frequency band range indicated by the frequency band range indication is first 40 MHz in the 320 MHz, the MRU indicated by the resource unit indication is determined from a frequency band range other than the first 40 MHz in the 320 MHz. If the MRU indicated by the resource unit indication is a (3*996+484)-tone RU, as shown in FIG. 13, the (3*996+484)-tone RU indicated by the resource unit indication is determined from the frequency range other than the first 40 MHz in the 320 MHZ, in other words, is a (3*996+484)-tone RU shown in the second row in FIG. 13.

In another implementation, the frequency band range indicated by the frequency band range indication is 80 MHz in the bandwidth, and the MRU indicated by the resource unit indication is determined from a frequency band range other than the 80 MHz indicated by the frequency band range indication.

For example, if the frequency band range indicated by the frequency band range indication is first 80 MHz in the 320 MHZ, the RU/MRU indicated by the resource unit indication is determined from second 80 MHz to fourth 80 MHz other than the first 80 MHz in the 320 MHz. If the MRU indicated by the resource unit indication is a 3*996-tone RU, a 3*996-tone RU corresponding to the second 80 MHz to the fourth 80 MHz is the MRU allocated to the station, for example, a 3*996-tone RU shown in the first row in FIG. 12.

In still another implementation, the frequency band range indicated by the frequency band range indication is 160 MHz in the bandwidth, and the MRU indicated by the resource unit indication is determined from 160 MHz other than the 160 MHz indicated by the frequency band range indication.

For example, if the frequency band range indicated by the frequency band range indication is primary 160 MHz in the 320 MHZ, the MRU indicated by the resource unit indication is determined from secondary 160 MHz in the 320 MHz. If a size of the MRU indicated by the resource unit indication is a (996+484)-tone RU, as shown in FIG. 10, the resource unit indication further needs to use one of four indexes to indicate one (996+484)-tone RU in FIG. 10.

It may be learned that in the resource unit indication method 210, the frequency band range indicated by the frequency band range indication is a frequency band range that is not related to the RU/MRU indicated by the resource unit indication, in other words, the station needs to determine, from the frequency band range other than the frequency band range indicated by the frequency band range indication, the RU/MRU indicated by the resource unit indication.

Embodiment 4: The resource unit indication method 220 is mainly described in Embodiment 4.

Figure 17:
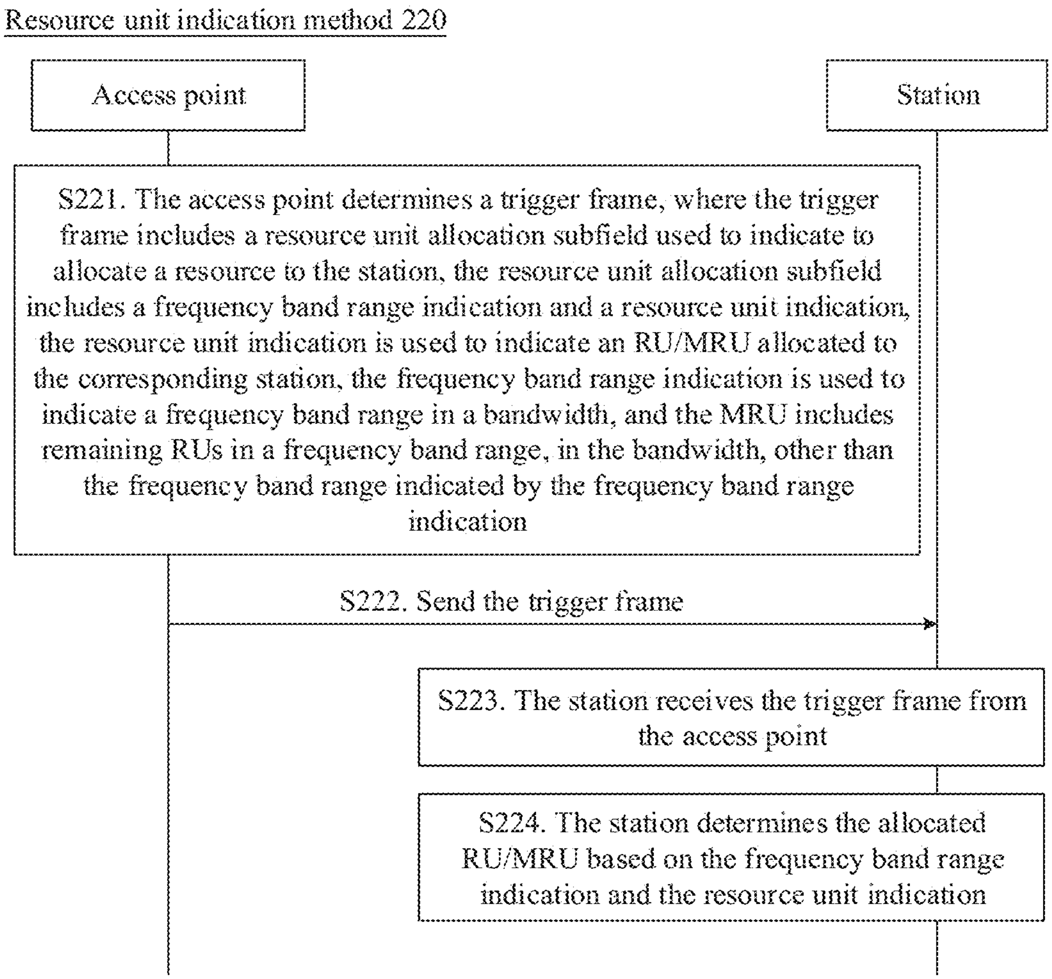
FIG. 17 is a schematic flowchart of a resource unit indication method 220 according to an embodiment of this application.

This application further provides the resource unit indication method 220. In the resource unit indication method 220, a frequency band range indication is used to indicate a frequency band range in a bandwidth, and an RU/MRU allocated to a station includes an RU in a frequency band range other than the frequency band range in the bandwidth. FIG. 17 is a schematic flowchart of the resource unit indication method 220 according to this embodiment of this application. As shown in FIG. 17, the resource unit indication method 220 may include but is not limited to the following steps.

S221. An access point determines a trigger frame.

The trigger frame includes a resource unit allocation subfield used to indicate to allocate a resource to the station. The resource unit allocation subfield includes a frequency band range indication and a resource unit indication. The resource unit indication is used to indicate an RU/MRU allocated to the corresponding station. The frequency band range indication is used to indicate a frequency band range in a bandwidth. The MRU includes remaining RUs in a frequency band range, in the bandwidth, other than the frequency band range indicated by the frequency band range indication.

S222. The access point sends the trigger frame.

S223. The station receives the trigger frame.

S224. The station determines the allocated RU/MRU based on the resource unit indication and the frequency band range indication.

That the station determines the allocated RU/MRU based on the resource unit indication and the frequency band range indication may include: The station uses an RU/MRU corresponding to a frequency band range, in 320 MHZ, other than the frequency band range indicated by the frequency band range indication as the allocated RU/MRU.

Optionally, the frequency band range indicated by the frequency band range indication is 40 MHz in the bandwidth, and the MRU indicated by the resource unit indication includes remaining RUs in a frequency band range, in the bandwidth, other than the 40 MHz indicated by the frequency band range indication.

For example, if the frequency band range indicated by the frequency band range indication is first 40 MHz in the 320 MHz, RUs in a frequency band range other than the first 40 MHz in the 320 MHz are respectively a 484-tone RU and three 996-tone RUs, as shown in FIG. 13. If the MRU indicated by the resource unit indication is a (3*996+484)-tone RU, the MRU is an RU in the frequency band range other than the first 40 MHz in the 320 MHz, for example, a (3*996+484)-tone RU shown in the second row in FIG. 13.

Optionally, the frequency band range indicated by the frequency band range indication is 80 MHz in the bandwidth, and the MRU indicated by the resource unit indication includes remaining RUs in a frequency band range, in the bandwidth, other than the 80 MHz indicated by the frequency band range indication.

For example, if the frequency band range indicated by the frequency band range indication is first 80 MHz in the 320 MHZ, the RU/MRU indicated by the resource unit indication is determined from the second to the fourth 80 MHz in the 320 MHz except the first 80 MHz. If the MRU indicated by the resource unit indication is a 3*996-tone RU, a 3*996-tone RU corresponding to the second 80 MHz to the fourth 80 MHz is the MRU allocated to the station, for example, a 3*996-tone RU shown in the first row in FIG. 12.

In still another implementation, the frequency band range indicated by the frequency band range indication is 160 MHz in the bandwidth, and the MRU indicated by the resource unit indication includes remaining RUs in a frequency band range other than the 160 MHz indicated by the frequency band range indication.

For example, if the frequency band range indicated by the frequency band range indication is primary 160 MHz in the 320 MHZ, the MRU indicated by the resource unit indication is a 2*996-tone RU corresponding to secondary 160 MHz.

It may be learned that in the resource unit indication method 220, the RU/MRU indicated by the resource unit indication is an RU/MRU corresponding to the frequency band range other than the frequency band range indicated by the frequency band range indication. In this way, the number of indexes that need to be indicated by the resource unit indication is further reduced. In addition, processing logic can be simplified, to help reduce processing complexity of the station.

Embodiment 5: The resource unit indication method 310 is mainly described in Embodiment 5.

This application further provides a resource unit indication method. In the resource unit indication method, a granularity of a frequency band range indicated by a frequency band range indication is related to an RU/MRU indicated by a resource unit indication. When a frequency band range occupied by the RU/MRU (or in which the RU/MRU is located) is less than or equal to 80 MHz, the granularity of the frequency band range indicated by the frequency band range indication is 80 MHz. When a frequency band range occupied by the RU/MRU is greater than 80 MHz and less than or equal to 160 MHz, the granularity of the frequency band range indicated by the frequency band range indication is 160 MHz. When a frequency band range occupied by the RU/MRU is greater than 160 MHz and less than 320 MHz, the granularity of the frequency band range indicated by the frequency band range indication is 320 MHz.

Alternatively, 240 MHz indicated by the frequency band range indication may be added. In this case, when a frequency band range occupied by the RU/MRU is greater than 160 MHz and less than or equal to 240 MHz, the granularity of the frequency band range indicated by the frequency band range indication is 240 MHz. When a frequency band range occupied by the RU/MRU is greater than 240 MHz and less than or equal to 320 MHz, the granularity of the frequency band range indicated by the frequency band range indication is 320 MHz.

In this specification, the frequency band range indicated by the frequency band range indication actually refers to a value and a location of the frequency band range, namely, a location of the frequency range in a bandwidth or the frequency band range in a bandwidth. For example, if the frequency band range indicated by the frequency band range indication is 80 MHz in the bandwidth, it indicates that the granularity of the frequency band range indicated by the frequency band range indication is 80 MHz and indicates a location of the 80 MHz in the bandwidth.

It is assumed that the frequency band range indication is first two bits, denoted as B0 and B1, in a resource unit allocation subfield.

When the granularity of the frequency band range indicated by the frequency band range indication is 80 MHz, B0 and B1 may represent four states to respectively indicate four 80 MHz frequency band ranges in 320 MHz.

When the granularity of the frequency band range indicated by the frequency band range indication is 160 MHz, in a manner, 0 or 1 in B0 is used to indicate highest 160 MHz or lowest 160 MHz, and B1 may be reserved. In another manner, 0 or 1 in B1 may be used to indicate highest 160 MHz or lowest 160 MHZ, and B0 is reserved. In still another manner, B0 corresponds to highest 160 MHz, and B1 corresponds to lowest 160 MHz. If B0 is set to 1, it indicates that the frequency band range indicated by the frequency band range indication is the highest 160 MHz. If B1 is set to 1, it indicates that the frequency band range indicated by the frequency band range indication is the lowest 160 MHZ. In still another manner, two of four states indicated by B0 and B1 may be used for indication. For example, 00 corresponds to lowest 240 MHz, and 01 corresponds to highest 240 MHz.

When the granularity of the frequency band range indicated by the frequency band range indication is 320 MHz, in a manner, there are no a plurality of 320 MHz locations, and therefore values of B0 and B1 are not limited in this application, and B0 and B1 may be reserved or randomly set. In another manner, one of four states represented by B0 and B1, for example, 00, may be used to indicate that the frequency band range indicated by the frequency band range indication is 320 MHz.

When the granularity of the frequency band range indicated by the frequency band range indication is 240 MHz, B0 and B1 may represent four states to respectively indicate four 240 MHz combinations in 320 MHz.

When a 240 MHz frequency band range in which the MRU is located is required to be a continuous 240 MHz frequency band range, in a manner, B0 corresponds to highest 240 MHz, and B1 corresponds to lowest 240 MHz. If B0 is set to 1, it indicates that the frequency band range indicated by the frequency band range indication is the highest 240 MHz. If B1 is set to 1, it indicates that the frequency band range indicated by the frequency band range indication is the lowest 240 MHz. In another manner, two of four states represented by B0 and B1 may be used to indicate the continuous 240 MHz frequency band range. For example, 00 corresponds to lowest 240 MHz, and 01 corresponds to highest 240 MHz.

Figure 18:
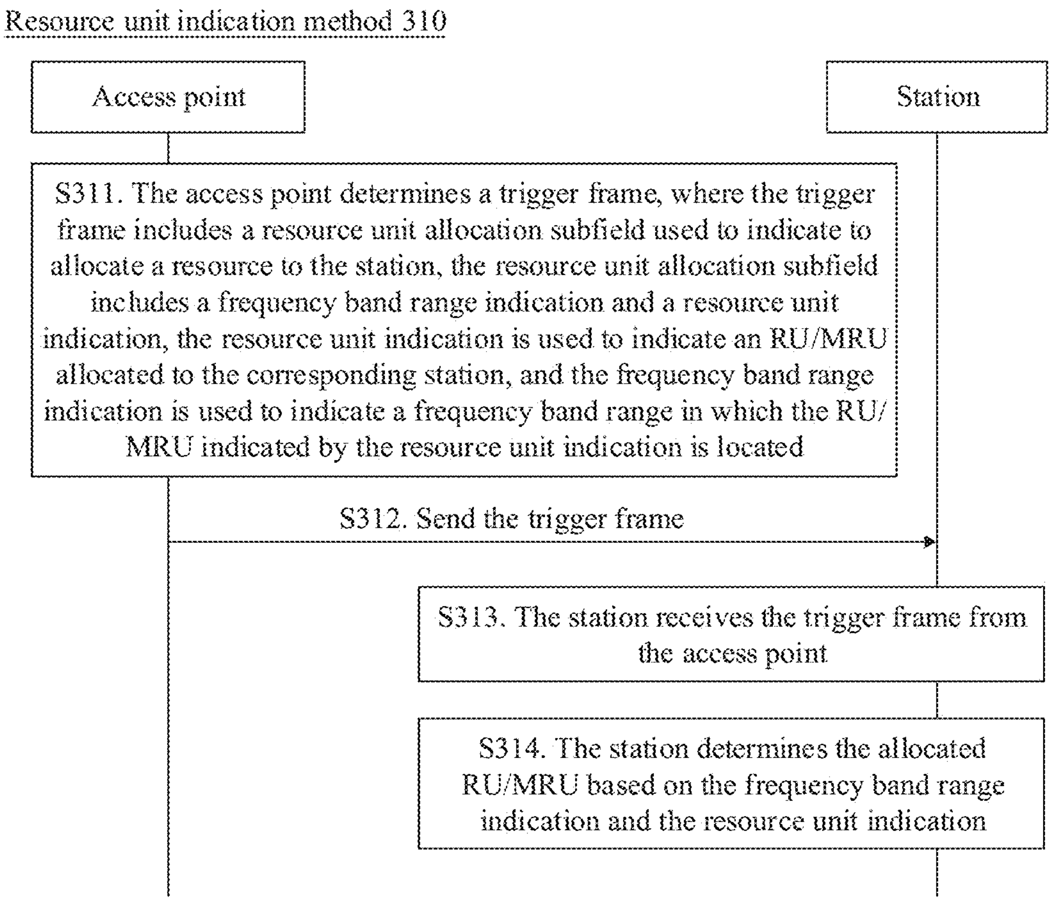
FIG. 18 is a schematic flowchart of a resource unit indication method 310 according to an embodiment of this application.

The resource unit indication method 310 is described by using an example in which "a frequency band range indication is used to indicate a frequency band range in which an RU/MRU indicated by a resource unit indication is located". FIG. 18 is a schematic flowchart of the resource unit indication method 310 according to this embodiment of this application. As shown in FIG. 18, the resource unit indication method 310 may include but is not limited to the following steps.

S311. An access point determines a trigger frame.

The trigger frame includes a resource unit allocation subfield used to indicate to allocate a resource to a station. The resource unit allocation subfield includes a frequency band range indication and a resource unit indication. The resource unit indication is used to indicate an RU/MRU allocated to the corresponding station. The frequency band range indication is used to indicate a frequency band range in which the RU/MRU indicated by the resource unit indication is located.

S312. The access point sends the trigger frame.

S313. The station receives the trigger frame.

S314. The station determines the allocated RU/MRU based on the frequency band range indication and the resource unit indication.

In the method, a relationship between the MRU/RU indicated by the resource unit indication and the frequency band range indicated by the frequency band range indication may be as follows.

When the frequency band range in which the MRU/RU indicated by the resource unit indication is located is less than or equal to 80 MHZ, the frequency band range indicated by the frequency band range indication is 80 MHz in a bandwidth; or when the frequency band range in which the MRU/RU indicated by the resource unit indication is located is greater than 80 MHz and less than or equal to 160 MHz, the frequency band range indicated by the frequency band range indication is 160 MHz in a bandwidth; or when the frequency band range in which the MRU/RU indicated by the resource unit indication is located is greater than 160 MHz and less than or equal to 240 MHz, the frequency band range indicated by the frequency band range indication is 240 MHz or 320 MHz in a bandwidth; or when the frequency band range in which the MRU/RU indicated by the resource unit indication is located is greater than 240 MHz and less than or equal to 320 MHz, the frequency band range indicated by the frequency band range indication is 320 MHz in a bandwidth.

In this case, in the relationship between the MRU/RU indicated by the resource unit indication and the frequency band range indicated by the frequency band range indication, the number of indexes that need to be indicated by the resource unit indication may be determined with reference to the RUs/MRUs shown in FIG. 3 and FIG. 7 to FIG. 14, to obtain an index table shown in Table 7.

TABLE 7

| Entries that can be indicated by the resource unit indication (B8 to B2) | | | | |
|---|---|---|---|---|
| B8 to B2 in the resource unit allocation subfield (B8-B2 of RU Allocation subfield) | RU size | Number of entries | Note | B1 and B0 |
| 0-35 | 26 | 36 | 36 in 80 MHz | Indicate 80 MHz |
| 36-51 | 52 | 16 | 16 in 80 MHz | Indicate 80 MHz |
| 52-59 | 106 | 8 | 8 in 80 MHz | Indicate 80 MHz |
| 60-63 | 242 | 4 | 4 in 80 MHz | Indicate 80 MHz |
| 64-65 | 484 | 2 | 2 in 80 MHz | Indicate 80 MHz |
| 66 | 996 | 1 | 1 in 80 MHz | Indicate 80 MHz |
| 67 | 2 × 996 | 1 | 1 in 160 MHz | Indicate 160 MHz |
| 68 | 4 × 996 | 1 | 1 in 320 MHz | Indicate 320 MHz |
| 69-80 | 52 + 26 | 12 | 12 in 80 MHz | Indicate 80 MHz |

TABLE 7-continued

Entries that can be indicated by the resource unit indication (B8 to B2)

| B8 to B2 in the resource unit allocation subfield (B8-B2 of RU Allocation subfield) | RU size | Number of entries | Note | B1 and B0 |
|---|---|---|---|---|
| 81-88 | 106 + 26 | 8 | 8 in 80 MHz | Indicate 80 MHz |
| 89-92 | 484 + 242 | 4 | 4 in 80 MHz | Indicate 80 MHz |
| 93-96 | 996 + 484 | 4 | 4 in 160 MHz | Indicate 160 MHz |
| 97-102 | 2 × 996 + 484 | 6 | 6 in 240 MHz in an implementation 1 (or 12 in 320 MHz in an implementation 2) | Indicate 240 MHz in the implementation 1 (or indicate 320 MHz in the implementation 2) |
| 103-106 | 3 × 996 | 4 | 4 in 320 MHz in the implementation 2 (or 1 in 240 MHz in the implementation 1) | Indicate 320 MHz in the implementation 2 (or indicate 240 MHz in the implementation 1) |
| 107-114 | 3 × 996 + 484 | 8 | 8 in 320 MHz | Indicate 320 MHz |
| 115-122 | 996 + 484 + 242 | 8 | 8 in 160 MHz | Indicate 320 MHz |

When the frequency band range in which the RU/MRU indicated by the resource unit indication is located is less than or equal to 80 MHz, the 80 MHz indicated by the frequency band range indication is 80 MHz in which the RU/MRU is located. The number of entries corresponding to each RU/MRU size is equal to the number of optional locations of an RU/MRU of the size in the 80 MHz.

Therefore, as shown in Table 7, the number of indexes corresponding to the 26-tone RU is equal to the number 36 of optional locations of the 26-tone RU in the 80 MHz, and each index corresponds to one 26-tone RU in the 80 MHz.

As shown in Table 7, the number of indexes corresponding to the (52+26)-tone RU is equal to the number of optional locations of the (52+26)-tone RU in the 80 MHz. As shown in FIG. 7, there are 12 (namely, 4*3) optional locations for the (52+26)-tone RU in the 80 MHz. Therefore, the resource unit indication needs 12 indexes to respectively indicate all (52+26)-tone RUs in the 80 MHz.

As shown in Table 7, the number of indexes corresponding to the (106+26)-tone RU is equal to the number of optional locations of the (106+26)-tone RU in the 80 MHz. As shown in FIG. 8, there are eight optional locations for the (106+26)-tone RU in the 80 MHz. Therefore, the resource unit indication needs eight indexes to respectively indicate all (106+26)-tone RUs in the 80 MHz.

As shown in Table 7, the number of indexes corresponding to the (484+242)-tone RU is equal to the number of optional locations of the (484+242)-tone RU in the 80 MHz. As shown in FIG. 9, there are four optional locations for the (484+242)-tone RU in the 80 MHz. Therefore, the resource unit indication needs four indexes to respectively indicate all (484+242)-tone RUs in the 80 MHz.

When the frequency band range in which the RU/MRU indicated by the resource unit indication is located is greater than 80 MHz and less than or equal to 160 MHz, the 160 MHz indicated by the frequency band range indication is 160 MHz in which the RU/MRU is located. The number of entries corresponding to each RU/MRU size is equal to the number of optional locations of an RU/MRU of the size in the 160 MHz.

Therefore, as shown in Table 7, the number of indexes corresponding to the 2*996-tone RU is equal to the number 1 of optional locations of the 2*996-tone RU in the 160 MHz. Therefore, the resource unit indication needs to indicate only one index, and the station may learn of the allocated 2*996-tone RU with reference to the frequency band range indication.

As shown in Table 7, the number of indexes corresponding to the (996+484)-tone RU is equal to the number 4 (as shown in FIG. 10) of optional locations of the (996+484)-tone RU in the 160 MHz. Therefore, the resource unit indication needs four indexes to respectively indicate all (996+484)-tone RUs in the 160 MHz.

There are two implementations for a case in which the frequency band range in which the RU/MRU indicated by the resource unit indication is located is greater than 160 MHz and less than or equal to 320 MHz. A 240 MHz frequency band range is introduced in the implementation 1, and no 240 MHz frequency band range is introduced in the implementation 2. The two implementations are separately described below.

Implementation 1: There is a 240 MHz frequency band range for the frequency band range indicated by the frequency band range indication.

When the frequency band range in which the RU/MRU indicated by the resource unit indication is located is greater than 160 MHz and less than or equal to 240 MHZ, the frequency band range indicated by the frequency band range indication is 240 MHz, namely, 240 MHz in which the RU/MRU is located. The number of entries corresponding to each RU/MRU size is equal to the number of optional locations of an RU/MRU of the size in the 240 MHz.

The number of indexes corresponding to the (2*996+484)-tone RU is equal to the number 6 (the number 6 of optional locations shown in FIG. 11) of optional locations of the (2*996+484)-tone RU in the 240 MHz. Therefore, the resource unit indication needs six indexes (for example, the indexes 97 to 102 shown in Table 7) to respectively indicate all (2*996+484)-tone RUs in the 240 MHz.

The number of indexes corresponding to the 3*996-tone RU is equal to the number 1 of optional locations of the 3*996-tone RU in the 240 MHz. Therefore, the resource unit indication needs one index to indicate the 3*996-tone RU in the 240 MHz.

When the frequency band range in which the RU/MRU indicated by the resource unit indication is located is greater than 240 MHz and less than or equal to 320 MHZ, the frequency band range indicated by the frequency band range indication is 320 MHz, namely, 320 MHz in which the RU/MRU is located. The number of entries corresponding to each RU/MRU size is equal to the number of optional locations of an RU/MRU of the size in the 320 MHz.

The number of indexes corresponding to the 4*996-tone RU is equal to the number 1 of optional locations of the 4*996-tone RU in the 320 MHz. Therefore, the resource unit indication needs one index (for example, the index 68 shown in Table 7) to indicate the 4*996-tone RU.

The number of indexes corresponding to the (3*996+484)-tone RU is equal to the number 8 (as shown in FIG. 13) of optional locations of the (3*996+484)-tone RU in the 320 MHz. Therefore, the resource unit indication needs eight indexes (for example, the indexes 107 to 114 shown in Table 7) to indicate all (3*996+484)-tone RUs in the 320 MHz.

The number of indexes corresponding to the (996+484+242)-tone RU is equal to the number 8 (2*number 4 of optional locations shown in FIG. 14) of optional locations of the (996+484+242)-tone RU in the 320 MHz. Therefore, the resource unit indication needs eight indexes (for example, the indexes 115 to 122 shown in Table 7) to indicate all (996+484+242)-tone RUs in the 320 MHz.

Implementation 2: There is no 240 MHz frequency band range for the frequency band range indicated by the frequency band range indication.

When the frequency band range in which the RU/MRU indicated by the resource unit indication is located is greater than 160 MHz and less than or equal to 320 MHz, the frequency band range indicated by the frequency band range indication is 320 MHZ, namely, 320 MHz in which the RU/MRU is located. The number of entries corresponding to each RU/MRU size is equal to the number of optional locations of an RU/MRU of the size in the 320 MHz.

The number of indexes corresponding to the (2*996+484)-tone RU is equal to the number 12 (2*number 6 of optional locations shown in FIG. 11) of optional locations of the (2*996+484)-tone RU in the 320 MHz. Therefore, the resource unit indication needs 12 indexes to respectively indicate all (2*996+484)-tone RUs in the 320 MHz.

The number of indexes corresponding to the 4*996-tone RU is equal to the number 1 of optional locations of the 4*996-tone RU in the 320 MHz. Therefore, the resource unit indication needs one index (for example, the index 68 shown in Table 7) to indicate the 4*996-tone RU.

The number of indexes corresponding to the 3*996-tone RU is equal to the number 4 (as shown in FIG. 12) of optional locations of the 3*996-tone RU in the 320 MHz. Therefore, the resource unit indication needs four indexes (for example, the indexes 103 to 106 shown in Table 7) to indicate all 3*996-tone RUs in the 320 MHz.

The number of indexes corresponding to the (3*996+484)-tone RU is equal to the number 8 (as shown in FIG. 13) of optional locations of the (3*996+484)-tone RU in the 320 MHz. Therefore, the resource unit indication needs eight indexes (for example, the indexes 107 to 114 shown in Table 7) to indicate all (3*996+484)-tone RUs in the 320 MHz.

The number of indexes corresponding to the (996+484+242)-tone RU is equal to the number 8 (2*number 4 of optional locations shown in FIG. 14) of optional locations of the (996+484+242)-tone RU in the 320 MHz. Therefore, the resource unit indication needs eight indexes (for example, the indexes 115 to 122 shown in Table 7) to indicate all (996+484+242)-tone RUs in the 320 MHz.

It may be learned that the two implementations affect the number of indexes corresponding to each of the (2*996+484)-tone RU and 3*996-tone RU. For example, in the implementation 1, the number of indexes corresponding to the (2*996+484)-tone RU is 6, and the number of indexes corresponding to the 3*996-tone RU is 1; and in the implementation 2, the number of indexes corresponding to the (2*996+484)-tone RU is 12, and the number of indexes corresponding to the 3*996-tone RU is 4.

In an implementation, indexes corresponding to RUs/MRUs of a same size may be determined based on a one-to-one correspondence between the indexes in ascending order and start frequencies of the RUs/MRUs in ascending order. If start frequencies of a plurality of MRUs are the same, an order of start frequencies of second RUs is used for determining, and so on. If start frequencies of all RUs in the plurality of MRUs are the same, an order of sizes of last RUs with a same start frequency is used for arrangement. For example, indexes corresponding to the (2*996+484)-tone RU in the implementation 1 are the indexes 97 to 102, and start frequencies of all the following (2*996+484)-tone RUs in the 240 MHz are in ascending order: a first combination in the second row in FIG. 11, a first combination in the third row in FIG. 11, a second combination in the third row in FIG. 11, a first combination in the first row in FIG. 11, a second combination in the second row in FIG. 11, and a second combination in the first row in FIG. 11. Therefore, the index 97 represents the first combination in the second row in FIG. 11, an index 98 represents the first combination in the third row in FIG. 11, an index 99 represents the second combination in the third row in FIG. 11, an index 100 represents the first combination in the first row in FIG. 11, an index 101 represents the second combination in the second row in FIG. 11, and the index 102 represents the second combination in the first row in FIG. 11.

In another implementation, indexes corresponding to RUs/MRUs of a same size may be determined based on a one-to-one correspondence between the indexes in ascending order and start frequencies, in ascending order, of punctured RUs (namely, RUs not included in the RUs/MRUs) in a bandwidth in which the RUs/MRUs are located. For example, in the 3*996-tone RU shown in FIG. 12, a punctured RU in a bandwidth in which a 3*996-tone RU shown in the first row is located has a lowest frequency, and therefore the 3*996-tone RU shown in the first row corresponds to a smallest index; a punctured RU in a bandwidth in which a 3*996-tone RU shown in the second row is located has a second lowest frequency, and therefore the 3*996-tone RU shown in second first row corresponds to a second smallest index; a punctured RU in a bandwidth in which a 3*996-tone RU shown in the third row is located has a second highest frequency, and therefore the 3*996-tone RU shown in third first row corresponds to a second largest index; and a punctured RU in a bandwidth in which a 3*996-tone RU shown in the fourth row is located has a highest frequency, and therefore the 3*996-tone RU shown in the fourth row corresponds to a largest index.

In still another implementation, indexes corresponding to RUs/MRUs of a same size may be determined based on a one-to-one correspondence between the indexes in ascending order and frequencies of weight RUs in the RUs/MRUs in descending order. For example, in the 3*996-tone RU shown in FIG. 12, all of three 996-tone RUs in a 3*996-tone RU shown in the first row have a highest frequency, and therefore the 3*996-tone RU shown in the first row corresponds to a smallest index; two 996-tone RUs in a 3*996-tone RU shown in the second row have a second highest frequency, and therefore the 3*996-tone RU shown in the second row corresponds to a second smallest index; one 996-tone RU in a 3*996-tone RU shown in the third row has a second lowest frequency, and therefore the 3*996-tone RU shown in the third row corresponds to a second largest index; and all of three 996-tone RUs in a 3*996-tone RU shown in the fourth row have a lowest frequency, and therefore the 3*996-tone RU shown in the fourth row corresponds to a largest index.

It may be learned that in the resource unit indication method 310, when determining the allocated RU/MRU based on the frequency band range indication and the resource unit indication, the station may determine, based on a size of the RU/MRU corresponding to an index indicated by the resource unit indication in Table 7, the frequency band range in which the RU/MRU is located and that is indicated by the frequency band range indication, and then determine, in the frequency band range, the RU/MRU corresponding to the index indicated by the resource unit indication. It may be learned that the resource unit indication may directly indicate the RU/MRU in the frequency band range. When more information is carried by using the frequency band range indication, logic is simplified as much as possible, to help reduce processing complexity of the station.

In addition, in the foregoing resource unit indication methods, the resource unit allocation subfield occupies N bits, the frequency band range indication occupies a bit 0 to a bit x, and the resource unit indication occupies a bit (x+1) to a bit N. A value of x is related to the bandwidth and the frequency band range indicated by the frequency band range indication, and both N and x are greater than 0. For example, x is equal to 1 in the resource unit indication method 110, x is equal to 2 in the resource unit indication method 120, or x is equal to 2 in the resource unit indication method 310.

In addition, in the foregoing embodiments, locations of the frequency band range indication and the resource unit indication in the N bits may be interchanged. That is, in the foregoing embodiments, that first two or three bits indicate the frequency band range indication and the remaining bits indicate the resource unit indication may be replaced as follows: First eight or seven bits indicate the resource unit indication, and the remaining bits indicate the frequency band range indication.

In addition, the "frequency band range" in this specification may also be referred to as a "frequency range", and the frequency band range indication may also be referred to as a frequency range indication. The frequency range or the frequency band range corresponds to a continuous frequency.

Embodiment 6: The resource unit indication method 410 is mainly described in Embodiment 6.

This application further provides the resource unit indication method 410. In the method, a resource unit allocation subfield corresponding to a station occupies N bits, and an index indicated by the N bits directly represents an absolute location of a multi-resource unit MRU in a bandwidth; and then the station may directly learn of the allocated MRU by querying a table based on the index indicated by the N bits. In other words, in the method, the following distinction is no longer made: A first part of bits indicates a frequency band range of a specific granularity, and a second part of bits indicates a combination mode related to the frequency band range. Therefore, the method may be referred to as a resource unit combination indication method. Therefore, logic of the resource unit indication method in this application is more simplified, to further reduce processing complexity of the station. The method is described below.

Figure 19:
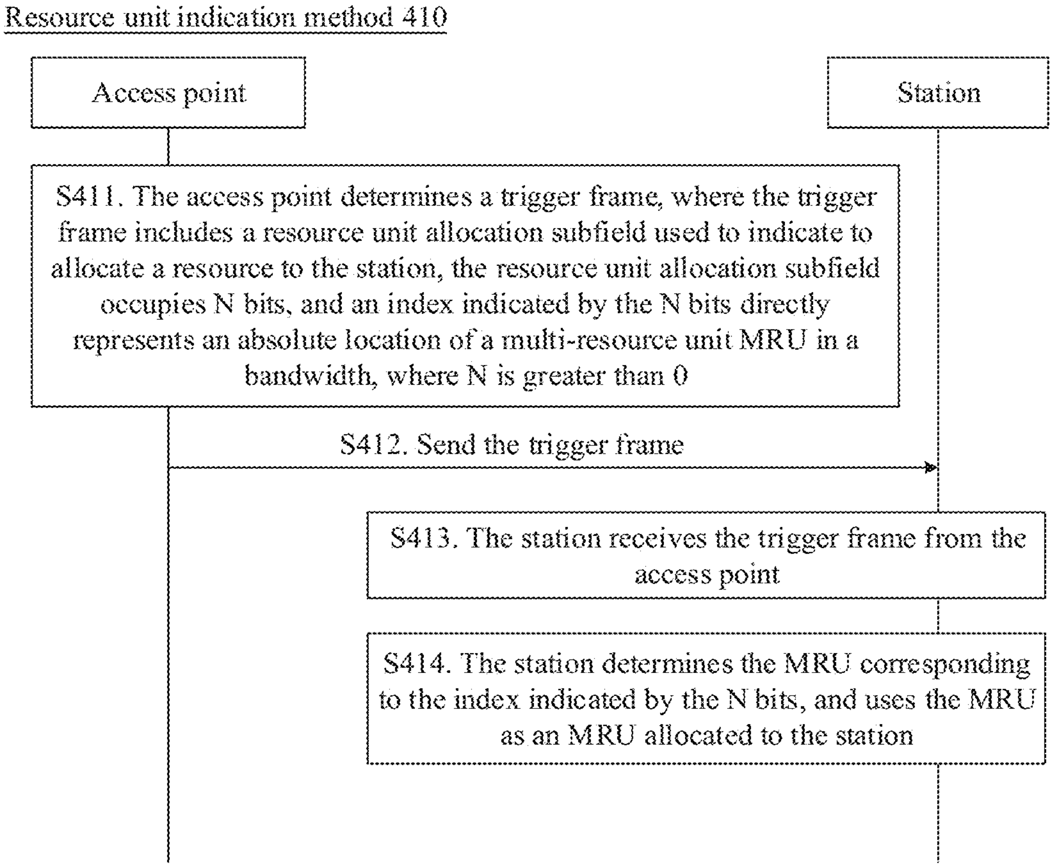
FIG. 19 is a schematic flowchart of a resource unit indication method 410 according to an embodiment of this application.

FIG. 19 is a schematic flowchart of the resource unit indication method 410 according to this embodiment of this application. The resource unit indication method 410 shown in FIG. 19 may include but is not limited to the following steps.

S411. An access point determines a trigger frame.

The trigger frame includes a resource unit allocation subfield used to indicate to allocate a resource to the station, the resource unit allocation subfield occupies N bits, and an index indicated by the N bits directly represents an absolute location of a multi-resource unit MRU in a bandwidth, where N is greater than 0.

S412. The access point sends the trigger frame.

S413. The station receives the trigger frame.

S414. The station determines the MRU directly corresponding to the index indicated by the N bits, and uses the MRU as an MRU allocated to the station.

In step S414, the station may query a resource unit allocation table for the MRU corresponding to the index indicated by the N bits, and use the MRU as the MRU allocated to the station. The index indicated by the N bits is the N bits in the resource unit allocation subfield corresponding to the station.

For example but not for limitation, the resource unit allocation table may be shown in Table 8. The N bits are used to indicate an absolute location of each RU/MRU in the bandwidth, where N is equal to 9, and are denoted as B0 to B8.

TABLE 8

Resource unit allocation table

| B8 to B0 in the resource unit allocation subfield (B8-B0 of RU Allocation subfield) | RU size | Number of entries |
|---|---|---|
| 0-143 | 26 | 144 |
| 144-207 | 52 | 64 |
| 208-239 | 106 | 32 |
| 240-255 | 242 | 16 |
| 256-263 | 484 | 8 |
| 264-267 | 996 | 4 |
| 268-269 | 2 × 996 | 2 |
| 270 | 4 × 996 | 1 |
| 271-318 | 52 + 26 | 12*4 |
| 319-350 | 106 + 26 | 8*4 |
| 351-366 | 484 + 242 | 4*4 |
| 367-374 | 996 + 484 | 2*4 |
| 375-386 | 2 × 996 + 484 | 12 = 6*2 |
| 387-390 | 3 × 996 | 4 |
| 391-398 | 3 × 996 + 484 | 8 |
| 399-414 | 996 + 484 + 242 | 8 + 8 |

As shown in FIG. 3, there are 36 locations for the 26-tone RU in 80 MHz, and therefore there are 144 (namely, 4*36) locations for the 26-tone RU in 320 MHz. Therefore, as shown in Table 8, B8 to B0 need to indicate one of the indexes 0 to 143, to indicate one 26-tone RU.

As shown in FIG. 3, there are 16 locations for the 52-tone RU in 80 MHZ, and therefore there are 64 (namely, 4*16) locations for the 52-tone RU in 320 MHz. Therefore, B8 to B0 need to indicate one of the indexes 144 to 207, to indicate one 52-tone RU.

As shown in FIG. 3, there are eight locations for the 106-tone RU in 80 MHz, and therefore there are 32 (namely, 4*8) locations for the 106-tone RU in 320 MHz. Therefore, B8 to B0 need to indicate one of the indexes 208 to 239, to indicate one 106-tone RU.

As shown in FIG. 3, there are four locations for the 242-tone RU in 80 MHZ, and therefore there are 16 (namely, 4*4) locations for the 242-tone RU in 320 MHz. Therefore, B8 to B0 need to indicate one of the indexes 240 to 255, to indicate one 242-tone RU.

As shown in FIG. 3, there are two locations for the 484-tone RU in 80 MHz, and therefore there are eight (namely, 4*2) locations for the 484-tone RU in 320 MHz. Therefore, B8 to B0 need to indicate one of the indexes 256 to 263, to indicate one 484-tone RU.

As shown in FIG. 3, there is one location for the 996-tone RU in 80 MHz, and therefore there are four locations for the 996-tone RU in 320 MHz. Therefore, B8 to B0 need to indicate one of the indexes 264 to 267, to indicate one 996-tone RU.

The 2*996-tone RU cannot span two 160 MHz frequency band ranges, in other words, a frequency band range in which the 2*996-tone RU is located can only be primary 160 MHz or secondary 160 MHz, and therefore there are two locations for the 2*996-tone RU in 320 MHz. Therefore, B8 to B0 need to indicate one of the indexes 268 and 269, to indicate one 2*996-tone RU.

There is only one 4*996-tone RU in 320 MHz. Therefore, B8 to B0 may indicate one index 270, so that the station may learn that the allocated RU is the 4*996-tone RU.

There are three combinations shown in FIG. 7 for the (52+26)-tone RU in 20 MHz, and therefore there are 48 (namely, 16*3) combinations for the (52+26)-tone RU in 320 MHz. Therefore, B8 to B0 need to indicate one of the indexes 271 to 318, to indicate one (52+26)-tone RU.

There are two combinations shown in FIG. 8 for the (106+26)-tone RU in 20 MHZ, and therefore there are 32 (namely, 16*2) combinations for the (106+26)-tone RU in 320 MHz. Therefore, B8 to B0 need to indicate one of the indexes 319 to 350, to indicate one (106+26)-tone RU.

There are four combinations shown in FIG. 9 for the (484+242)-tone RU in 80 MHZ, and therefore there are 16 (namely, 4*4) combinations for the (484+242)-tone RU in 320 MHz. Therefore, B8 to B0 need to indicate one of the indexes 351 to 366, to indicate one (484+242)-tone RU.

The (996+484)-tone RU may be located in primary 160 MHz or secondary 160 MHz, and therefore there are four combinations shown in FIG. 10 for the (996+484)-tone RU in 160 MHz, and therefore there are eight (namely, 2*4) combinations for the (996+484)-tone RU in 320 MHz. Therefore, B8 to B0 need to indicate one of the indexes 367 to 374, to indicate one (996+484)-tone RU.

The (2*996+484)-tone RU is transmitted in 240 MHz, and therefore can exist only in 240 MHz formed by puncturing lowest or highest 80 MHz in 320 MHz. There are six combinations shown in FIG. 11 for the (2*996+484)-tone RU in the 240 MHz, and therefore there are 12 (namely, 2*6) combinations for the (2*996+484)-tone RU in the 320 MHz. Therefore, B8 to B0 need to indicate one of the indexes 375 to 386, to indicate one (2*996+484)-tone RU.

There are four combinations shown in FIG. 12 for the 3*996-tone RU in 320 MHz. Therefore, B8 to B0 need to indicate one of the indexes 387 to 390, to indicate one 3*996-tone RU.

There are eight combinations shown in FIG. 13 for the (3*996+484)-tone RU in 320 MHz. Therefore, B8 to B0 need to indicate one of the indexes 391 to 398, to indicate one (3*996+484)-tone RU.

When the (484+242)-tone RU is located in first 80 MHz in 160 MHz, there are four combinations shown in FIG. 14 for the (996+484+242)-tone RU in the 160 MHz. Correspondingly, when the (484+242)-tone RU is located in second 80 MHz in the 160 MHZ, there are also four combinations for the (996+484+242)-tone RU in the 160 MHz. Therefore, there are eight combinations for the (996+484+242)-tone RU in the 160 MHz. In addition, the (996+484+242)-tone RU can be located only in lowest 160 MHz or highest 160 MHz, and therefore there are 16 (namely, 2*8) combinations for the (996+484+242)-tone RU in 320 MHz. Therefore, B8 to B0 need to indicate one of the indexes 399 to 414, to indicate one (996+484+242)-tone RU.

It may be learned that in the resource unit indication method 410, in the resource unit allocation subfield, no distinction is made for a bit specifically used to indicate a specific frequency band range, and the resource allocation table may be directly searched for the corresponding RU/MRU based on the index indicated by the N bits in the resource unit allocation subfield. Therefore, processing logic is greatly simplified, to help reduce processing complexity of the station.

This application further provides a resource unit indication method. A difference between the resource unit indication method and the resource unit indication method 410 lies in that a resource unit allocation subfield occupies 8 bits, and the resource unit allocation subfield is used to indicate an RU/MRU related to a 160 MHz frequency band range. A station may learn, by using another parameter or signaling, whether the 160 MHz that is related to the RU/MRU and that is indicated by the resource unit allocation subfield is primary 160 MHz or secondary 160 MHz. If the 8 bits occupied by the resource unit allocation subfield are denoted as B7 to B0, B7 to B0 are used to indicate all RUs/MRUs in the primary 160 MHz or the secondary 160 MHz. For example, the RUs/MRUs indicated by B7 to B0 may be shown in Table 9.

TABLE 9

Resource unit allocation table

| B7 to B0 in the resource unit allocation subfield (B7-B0 of the RU Allocation subfield) | RU size | Number of entries |
|---|---|---|
| 0-71 | 26 | 36*2 |
| 72-103 | 52 | 16*2 |
| 104-119 | 106 | 8*2 |
| 120-127 | 242 | 4*2 |
| 128-131 | 484 | 2*2 |
| 132-133 | 996 | 1*2 |
| 134 | 2 × 996 | 1 |
| 135 | 4 × 996 | 1 |
| 136-159 | 52 + 26 | 12*2 |
| 160-175 | 106 + 26 | 8*2 |
| 176-183 | 484 + 242 | 4*2 |
| 184-187 | 996 + 484 | 4 |
| 188-199 | 2 × 996 + 484 | 12 |
| 200-203 | 3 × 996 | 4 |
| 204-211 | 3 × 996 + 484 | 8 |
| 212-219 | 996 + 484 + 242 | 8 |

As shown in FIG. 3, there are 36 locations for the 26-tone RU in 80 MHz, and therefore there are 72 (namely, 2*36) locations for the 26-tone RU in the 160 MHz. Therefore, as shown in Table 9, B7 to B0 need to indicate one of the indexes 0 to 71, to indicate one 26-tone RU.

As shown in FIG. 3, there are 16 locations for the 52-tone RU in 80 MHZ, and therefore there are 32 (namely, 2*16) locations for the 52-tone RU in the 160 MHz. Therefore, B7 to B0 need to indicate one of the indexes 72 to 103, to indicate one 52-tone RU.

As shown in FIG. 3, there are eight locations for the 106-tone RU in 80 MHz, and therefore there are 16 (namely, 2*8) locations for the 106-tone RU in the 160 MHz. Therefore, B7 to B0 need to indicate one of the indexes 104 to 119, to indicate one 106-tone RU.

As shown in FIG. 3, there are four locations for the 242-tone RU in 80 MHz, and therefore there are eight (namely, 2*4) locations for the 242-tone RU in the 160 MHz. Therefore, B7 to B0 need to indicate one of the indexes 120 to 127, to indicate one 242-tone RU.

As shown in FIG. 3, there are two locations for the 484-tone RU in 80 MHZ, and therefore there are four (namely, 2*2) locations for the 484-tone RU in the 160 MHz. Therefore, B7 to B0 need to indicate one of the indexes 128 to 131, to indicate one 484-tone RU.

As shown in FIG. 3, there is one location for the 996-tone RU in 80 MHz, and therefore there are two locations for the 996-tone RU in the 160 MHz. Therefore, B7 to B0 need to indicate one of the indexes 132 and 133, to indicate one 996-tone RU.

The 2*996-tone RU cannot span two 160 MHz frequency band ranges, in other words, a frequency band range in which the 2*996-tone RU is located can only be the primary 160 MHz or the secondary 160 MHZ, and therefore there is one location for the 2*996-tone RU in the 160 MHz. Therefore, B7 to B0 need to indicate the index 134, to indicate the 2*996-tone RU.

There is only one 4*996-tone RU in 320 MHz. Therefore, B7 to B0 may indicate one index 135, so that the station may learn that the allocated RU is the 4*996-tone RU.

There are three combinations shown in FIG. 7 for the (52+26)-tone RU in 20 MHZ, and therefore there are 24 (namely, 8*3) combinations for the (52+26)-tone RU in the 160 MHz. Therefore, B7 to B0 need to indicate one of the indexes 136 to 159, to indicate one (52+26)-tone RU.

There are two combinations shown in FIG. 8 for the (106+26)-tone RU in 20 MHz, and therefore there are 16 (namely, 8*2) combinations for the (106+26)-tone RU in the 160 MHz. Therefore, B7 to B0 need to indicate one of the indexes 160 to 175, to indicate one (106+26)-tone RU.

There are four combinations shown in FIG. 9 for the (484+242)-tone RU in 80 MHZ, and therefore there are eight (namely, 2*4) combinations for the (484+242)-tone RU in the 160 MHz. Therefore, B7 to B0 need to indicate one of the indexes 176 to 183, to indicate one (484+242)-tone RU.

The (996+484)-tone RU may be located in the primary 160 MHz or the secondary 160 MHz, and therefore there are four combinations shown in FIG. 10 for the (996+484)-tone RU in the 160 MHz. Therefore, B7 to B0 need to indicate one of the indexes 184 to 187, to indicate one (996+484)-tone RU.

The (2*996+484)-tone RU is transmitted in 240 MHz, and therefore can exist only in 240 MHz formed by puncturing lowest or highest 80 MHz in 320 MHz. There are six combinations shown in FIG. 11 for the (2*996+484)-tone RU in the 240 MHZ, and therefore there are 12 (namely, 2*6) combinations for the (2*996+484)-tone RU in the 320 MHz. All of the 12 combinations of the (2*996+484)-tone RU overlap the primary 160 MHz or the secondary 160 MHz, and therefore there are 12 combinations for the (2*996+484)-tone RU in the 160 MHz. Therefore, B7 to B0 need to indicate one of the indexes 188 to 195, to indicate one (2*996+484)-tone RU.

There are four combinations shown in FIG. 12 for the 3*996-tone RU in 320 MHZ, and all of the four combinations are in the primary 160 MHz or the secondary 160 MHz. Therefore, there are four combinations for the 3*996-tone RU in the 160 MHz. Therefore, B7 to B0 need to indicate one of the indexes 200 to 203, to indicate one 3*996-tone RU.

There are eight combinations shown in FIG. 13 for the (3*996+484)-tone RU in 320 MHz, and all of the eight combinations are in the primary 160 MHz or the secondary 160 MHz. Therefore, B7 to B0 need to indicate one of the indexes 204 to 211, to indicate one (3*996+484)-tone RU.

When the (484+242)-tone RU is located in first 80 MHz in the 160 MHZ, there are four combinations shown in FIG. 14 for the (996+484+242)-tone RU in the 160 MHz. Correspondingly, when the (484+242)-tone RU is located in second 80 MHz in the 160 MHZ, there are also four combinations for the (996+484+242)-tone RU in the 160 MHz. Therefore, there are eight combinations for the (996+484+242)-tone RU in the 160 MHz. Therefore, B7 to B0 need to indicate one of the indexes 212 to 219, to indicate one (996+484+242)-tone RU.

It may be learned that in the resource unit indication method, 8 bits in the resource unit allocation subfield may be used to indicate all the RU/MRUs in the 160 MHz. Therefore, the number of required bits is reduced, and signaling overheads are reduced.

In the foregoing embodiments, the descriptions of each embodiment have respective focuses. For a part that is not described in detail in an embodiment, refer to related descriptions in other embodiments. In addition, different embodiments may be combined to indicate the RU/MRU allocated to the station. For example, in the resource unit indication method 210 or the resource unit indication method 220, content related to the resource unit indication and the frequency band range indication is applicable to allocation of some MRUs in the resource unit indication method 110 or the resource unit indication method 120. For example, when the description, in the resource unit indication method 210, indicating that if the frequency band range indicated by the frequency band range indication is the first 80 MHz in the 320 MHZ, the MRU indicated by the resource unit indication is the 3*996-tone RU corresponding to the second 80 MHz to the fourth 80 MHz other than the first 80 MHz in the 320 MHz is applied to the resource unit indication method 110, the indexes 99 to 101 shown in Table 4 may be replaced with the index 99. In this way, the station may determine a location of the allocated 3*996-tone RU with reference to a meaning of the frequency band range indication in the resource unit indication method 210.

Therefore, each RU/MRU size, a corresponding index arrangement order, and the number of indexes in Table 4, Table 6, Table 8, or Table 9 are not fixed, and corresponding changes may be made with reference to the foregoing embodiments. In addition, Table 3 and Table 4 are independent of each other, and Table 5 and Table 6 are independent of each other. As described above, meanings of frequency band range indications corresponding to some RUs/MRUs in Table 4 may be different from those in Table 3.

In the foregoing embodiments provided in this application, the methods provided in embodiments of this application are described from the perspectives of the access point and the station. To implement functions in the methods provided in the foregoing embodiments of this application, the access point and the station may each include a hardware structure and/or a software module, to implement the foregoing functions by using the hardware structure, the software module, or a combination of the hardware structure and the software module. A function in the foregoing functions may be performed in a manner of the hardware structure, the software module, or a combination of the hardware structure and the software module.

Figure 20:
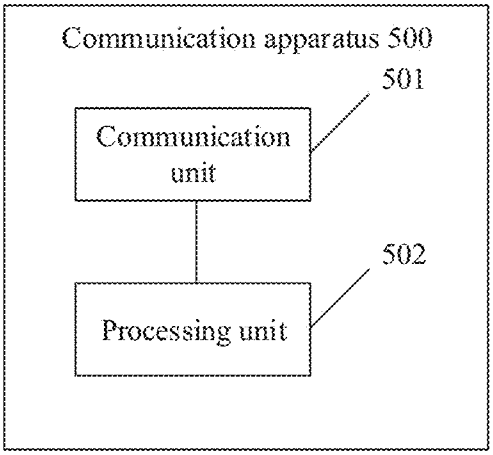
FIG. 20 is a schematic diagram of a structure of a communication apparatus 500 according to an embodiment of this application.

FIG. 20 is a schematic diagram of a structure of a communication apparatus 500 according to an embodiment of this application. The communication apparatus 500 shown in FIG. 20 may include a communication unit 501 and a processing unit 502. The communication unit 501 may include a sending unit and a receiving unit. The sending unit is configured to implement a sending function, the receiving unit is configured to implement a receiving function, and the communication unit 501 may implement a sending function and/or a receiving function. The communication unit may also be described as a transceiver unit.

The communication apparatus 500 may be a station, an apparatus in a station, an access point, or an apparatus in an access point.

In an implementation, the communication apparatus 500 may perform a related operation performed by the station in the resource unit indication method 110 in the foregoing method embodiment, and the communication apparatus 500 may include the communication unit 501 and the processing unit 502.

The communication unit 501 is configured to receive a trigger frame from an access point.

The processing unit 502 is configured to determine an allocated RU/MRU based on a frequency band range indication and a resource unit indication.

Alternatively, the communication apparatus 500 may perform a related operation performed by the access point in the resource unit indication method 110 in the foregoing method embodiment. The processing unit 502 is configured to determine a trigger frame. The communication unit 501 is configured to send the trigger frame.

In this implementation, the trigger frame includes a resource unit allocation subfield used to indicate to allocate a resource to a station. The resource unit allocation subfield includes a frequency band range indication and a resource unit indication. The resource unit indication is used to indicate an RU/MRU allocated to the station. The frequency band range indication is used to indicate 80 MHz in which a smallest RU in the RU/MRU indicated by the resource unit indication is located.

It may be learned that the communication apparatus 500 can allocate the MRU to the station, so that the MRU is more flexibly allocated, to help improve frequency band utilization. In addition, the 80 MHz indicated by the frequency band range indication is 80 MHz in which the smallest RU in the MRU is located. In comparison with a manner in which the frequency band range indication indicates only lowest 80 MHz related to the MRU, the communication apparatus 500 helps reduce the number of indexes required for the resource unit indication to indicate each MRU.

In another implementation, the communication apparatus 500 may perform a related operation performed by the station in the resource unit indication method 120 in the foregoing method embodiment, and the communication apparatus 500 may include the communication unit 501 and the processing unit 502.

The communication unit 501 is configured to receive a trigger frame from an access point.

The processing unit 502 is configured to determine an allocated RU/MRU based on a frequency band range indication and a resource unit indication.

Alternatively, the communication apparatus 500 may perform a related operation performed by the access point in the resource unit indication method 120 in the foregoing method embodiment. The processing unit 502 is configured to determine a trigger frame. The communication unit 501 is configured to send the trigger frame.

In this implementation, the trigger frame includes a resource unit allocation subfield used to indicate to allocate a resource to a station. The resource unit allocation subfield includes a frequency band range indication and a resource unit indication. The resource unit indication is used to indicate an RU/MRU allocated to the station. The frequency band range indication is used to indicate 40 MHz in which a smallest RU in the RU/MRU indicated by the resource unit indication is located.

It may be learned that the communication apparatus 500 can allocate the MRU to the station, so that the MRU is more flexibly allocated, to help improve frequency band utilization. In addition, the 40 MHz indicated by the frequency band range indication is 40 MHz in which the smallest RU in the MRU is located. In comparison with a manner in which the frequency band range indication indicates only lowest 80 MHz related to the MRU, the communication apparatus 500 helps reduce the number of indexes required for the resource unit indication to indicate each MRU.

In still another implementation, the communication apparatus 500 may perform a related operation performed by the station in the resource unit indication method 210 in the foregoing method embodiment, and the communication apparatus 500 may include the communication unit 501 and the processing unit 502.

The communication unit 501 is configured to receive a trigger frame from an access point.

The processing unit 502 is configured to determine an allocated RU/MRU based on a frequency band range indication and a resource unit indication.

Alternatively, the communication apparatus 500 may perform a related operation performed by the access point in the resource unit indication method 210 in the foregoing method embodiment. The processing unit 502 is configured to determine a trigger frame. The communication unit 501 is configured to send the trigger frame.

In this implementation, the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the station, and the frequency band range indication is used to indicate a frequency band range, in a bandwidth, in which some or all of resource units RUs other than the MRU are located.

It may be learned that in the communication apparatus 500, the MRU that needs to be indicated by the resource unit indication is determined from a frequency band range less than the bandwidth. Therefore, in comparison with a case in which the MRU that needs to be indicated by the resource unit indication is determined from a frequency band range corresponding to the bandwidth, the number of indexes that need to be indicated by the resource unit indication is reduced.

In still another implementation, the communication apparatus 500 may perform a related operation performed by the station in the resource unit indication method 220 in the foregoing method embodiment, or the communication apparatus 500 may perform a related operation performed by the access point in the resource unit indication method 220 in the foregoing method embodiment. A difference between a trigger frame in this implementation and the trigger frame in the resource unit indication method 210 lies in that in this implementation, a resource unit indication is used to indicate a multi-resource unit MRU allocated to a station, a frequency band range indication is used to indicate a frequency band range, and the MRU includes remaining RUs in a frequency band range, in a bandwidth, other than the frequency band range indicated by the frequency band range indication.

It may be learned that the MRU indicated by the resource unit indication is a combination of the remaining RUs in the frequency band range, in the bandwidth, other than the frequency band range indicated by the frequency band range indication. Therefore, in comparison with a case in which the MRU that needs to be indicated by the resource unit indication is determined from a frequency band range corresponding to the bandwidth, the communication apparatus 500 helps reduce the number of indexes that need to be indicated by the resource unit indication.

In still another implementation, the communication apparatus 500 may perform a related operation performed by the station in the resource unit indication method 310 in the foregoing method embodiment, and the communication apparatus 500 may include the communication unit 501 and the processing unit 502.

The communication unit 501 is configured to receive a trigger frame from an access point.

The processing unit 502 is configured to determine an allocated RU/MRU based on a frequency band range indication and a resource unit indication.

Alternatively, the communication apparatus 500 may perform a related operation performed by the access point in the resource unit indication method 310 in the foregoing method embodiment. The processing unit 502 is configured to determine a trigger frame. The communication unit 501 is configured to send the trigger frame.

In this implementation, the trigger frame includes a resource unit allocation subfield used to indicate to allocate a resource to a station, the resource unit allocation subfield includes a frequency band range indication and a resource unit indication, the resource unit indication is used to indicate a multi-resource unit MRU allocated to the station, and the frequency band range indication is used to indicate a frequency band range in which the MRU indicated by the resource unit indication is located.

It may be learned that in the communication apparatus 500, the resource unit indication may indicate only an RU/MRU in the frequency band range, and therefore the number of indexes that need to be indicated by the resource unit indication to indicate MRUs of the size is reduced. In other words, in the communication apparatus 500, the frequency band range indication may carry more information, and logic of the resource unit indication is simplified as much as possible, to help reduce processing complexity of the station.

In still another implementation, the communication apparatus 500 may perform a related operation performed by the station in the resource unit indication method 410 in the foregoing method embodiment, and the communication apparatus 500 may include the communication unit 501 and the processing unit 502.

The communication unit 501 is configured to receive a trigger frame from an access point.

The trigger frame includes a resource unit allocation subfield used to indicate to allocate a resource to a station, the resource unit allocation subfield occupies N bits, and an index indicated by the N bits directly represents an absolute location of a multi-resource unit MRU in a bandwidth, where N is greater than 0.

The processing unit 502 is configured to: determine the MRU directly corresponding to the index indicated by the N bits, and use the MRU as an MRU allocated to the station.

Alternatively, the communication apparatus 500 may perform a related operation performed by the access point in the resource unit indication method 410 in the foregoing method embodiment. The processing unit 502 is configured to determine a trigger frame. The communication unit 501 is configured to send the trigger frame. The trigger frame includes a resource unit allocation subfield used to indicate to allocate a resource to a station, the resource unit allocation subfield occupies N bits, and an index indicated by the N bits directly represents an absolute location of a multi-resource unit MRU in a bandwidth, where N is greater than 0.

It may be learned that in the communication apparatus 500, in the resource unit allocation subfield, no distinction is made for a bit specifically used to indicate a specific frequency band range, and the corresponding MRU may be directly searched for based on the index indicated by the N bits in the resource unit allocation subfield. Therefore, processing logic is greatly simplified, to help reduce processing complexity of the station.

In addition, the communication apparatus may perform a related implementation in any one of the foregoing method embodiments. Details are not described herein.

Figure 21:
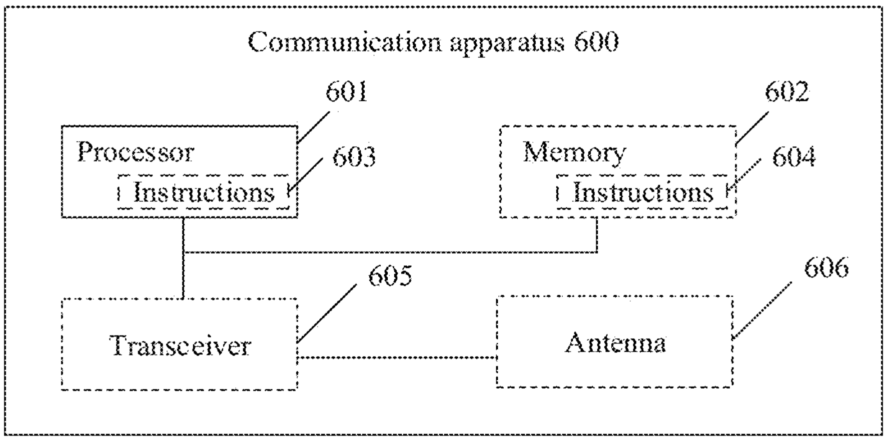
FIG. 21 is a schematic diagram of a structure of another communication apparatus 600 according to an embodiment of this application.

FIG. 21 a schematic diagram of a structure of a communication apparatus 600 according to an embodiment of this application. The communication apparatus 600 may be an access point, a station, or a chip, a chip system, a processor, or the like that supports an access point in implementing the foregoing method, or may be a chip, a chip system, a processor, or the like that supports a station in implementing the foregoing method. The communication apparatus may be configured to implement the methods described in the foregoing method embodiments. For details, refer to the descriptions in the foregoing method embodiments.

The communication apparatus 600 may include one or more processors 601. The processor 601 may be a general-purpose processor, a dedicated processor, or the like. The processor 601 may be configured to: control the communication apparatus (for example, an access point, an access point chip, a station, or a station chip), execute a software program, and process data of the software program.

Optionally, the communication apparatus 600 may include one or more memories 602. The memory stores instructions 604, and the instructions may be run on the processor 601, so that the communication apparatus 600 is enabled to execute the methods described in the foregoing method embodiments. Optionally, the memory 602 may further store data. The processor 601 and the memory 602 may be separately disposed, or may be integrated together.

Optionally, the communication apparatus 600 may further include a transceiver 605 and an antenna 606. The transceiver 605 may be referred to as a transceiver unit, a transceiver, a transceiver circuit, or the like, and is configured to implement a transceiver function. The transceiver 605 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

In an implementation, the communication apparatus 600 may be a station, an apparatus in a station, or the like.

In this implementation, in the communication apparatus 600, the transceiver 605 is configured to: perform the operation in S113 in FIG. 6, perform the operation in S123 in FIG. 15, perform the operation in S213 in FIG. 16, perform the operation in S223 in FIG. 17, perform the operation in S313 in FIG. 18, and perform the operation in S413 in FIG. 19; and the processor 601 is configured to: perform the operation in S114 in FIG. 6, perform the operation in S124 in FIG. 15, perform the operation in S214 in FIG. 16, perform the operation in S224 in FIG. 17, perform the operation in S314 in FIG. 18, and perform the operation in S414 in FIG. 19.

In another implementation, the communication apparatus 600 may be an access point, an apparatus in an access point, or the like.

In this implementation, in the communication apparatus 600, the transceiver 605 is configured to: perform the operation in S112 in FIG. 6, perform the operation in S122 in FIG. 15, perform the operation in S212 in FIG. 16, perform the operation in S222 in FIG. 17, perform the operation in S312 in FIG. 18, and perform the operation in S412 in FIG. 19; and the processor 601 is configured to: perform the operation in S111 in FIG. 6, perform the operation in S121 in FIG. 15, perform the operation in S211 in FIG. 16, perform the operation in S221 in FIG. 17, perform the operation in S311 in FIG. 18, and perform the operation in S411 in FIG. 19.

It may be learned that the communication apparatus 600 can allocate the MRU to the station, so that the MRU is more flexibly allocated, to help improve frequency band utilization. In addition, a frequency band range indication in this application carries more information, and therefore the number of indexes required for a resource unit indication to indicate each MRU is reduced. Alternatively, the communication apparatus 600 performs a related operation in FIG. 19, to simplify processing logic, so as to alleviate a processing burden of the station.

For related content of this implementation, refer to related content of the foregoing method embodiments. Details are not described herein again.

In another possible design, the transceiver may be a transceiver circuit, an interface, or an interface circuit. A transceiver circuit, an interface, or an interface circuit configured to implement the sending function and the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In still another possible design, optionally, the processor 601 may store instructions 603. When the instructions 603 are run on the processor 601, the communication apparatus 600 may be enabled to perform the methods described in the foregoing method embodiments. The instructions 603 may be fixed in the processor 601. In this case, the processor 601 may be implemented by hardware.

In another possible design, the communication apparatus 600 may include a circuit. The circuit may implement a sending, receiving, or communication function in the foregoing method embodiments.

The processor and the transceiver that are described in this application may be implemented on an integrated circuit (integrated circuit, IC), an analog IC, a radio frequency integrated circuit RFIC, a hybrid signal IC, an application-specific integrated circuit (application-specific integrated circuit, ASIC), a printed circuit board (printed circuit board, PCB), an electronic device, or the like.

The communication apparatus in the foregoing embodiment may be an access point or a station. However, a scope of the communication apparatus described in this application is not limited thereto, and a structure of the communication apparatus may not be limited by FIG. 21. The communication apparatus may be an independent device or a part of a relatively large device. For example, the communication apparatus may be:

(1) an independent integrated circuit IC, a chip, or a chip system or subsystem;

(2) a set including one or more ICs, where optionally, the IC set may further include a storage component configured to store data and instructions;

(3) an ASIC, for example, a modem (Modem);

(4) a module that can be embedded in another device;

(5) a receiver, an intelligent terminal, a wireless device, a handset, a mobile unit, a vehicle-mounted device, a cloud device, an artificial intelligence device, or the like; or (6) others, or the like.

Figure 22:
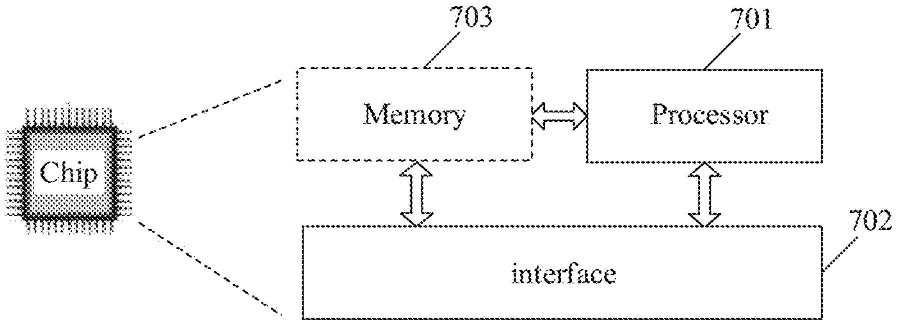
FIG. 22 is a schematic diagram of a structure of a chip according to an embodiment of this application.

In a case in which the communication apparatus may be a chip or a chip system, refer to a schematic diagram of a structure of a chip shown in FIG. 22. The chip 700 shown in FIG. 22 includes a processor 701 and an interface 702. There may be one or more processors 701, and there may be a plurality of interfaces 702.

In a case in which the chip is configured to implement a function of the station in embodiments of this application, the interface 702 is configured to: perform the operation in S113 in FIG. 6, perform the operation in S123 in FIG. 15, perform the operation in S213 in FIG. 16, perform the operation in S223 in FIG. 17, perform the operation in S313 in FIG. 18, and perform the operation in S413 in FIG. 19. The processor 701 is configured to: perform the operation in S114 in FIG. 6, perform the operation in S124 in FIG. 15, perform the operation in S214 in FIG. 16, perform the operation in S224 in FIG. 17, perform the operation in S314 in FIG. 18, and perform the operation in S414 in FIG. 19.

In a case in which the chip is configured to implement a function of the access point in embodiments of this application, the interface 702 is configured to: perform the operation in S112 in FIG. 6, perform the operation in S122 in FIG. 15, perform the operation in S212 in FIG. 16, perform the operation in S222 in FIG. 17, perform the operation in S312 in FIG. 18, and perform the operation in S412 in FIG. 19. The processor 701 is configured to: perform the operation in S111 in FIG. 6, perform the operation in S121 in FIG. 15, perform the operation in S211 in FIG. 16, perform the operation in S221 in FIG. 17, perform the operation in S311 in FIG. 18, and perform the operation in S411 in FIG. 19.

It may be learned that the chip can allocate the MRU to the station, so that the MRU is more flexibly allocated, to help improve frequency band utilization. In addition, a frequency band range indication in this application carries more information, and therefore the number of indexes required for a resource unit indication to indicate each MRU is reduced. Alternatively, the chip performs a related operation in FIG. 19, to simplify processing logic, so as to alleviate a processing burden of the station.

Optionally, the chip further includes a memory 703 coupled to the processor 701, and the memory 703 is configured to store program instructions and data that are necessary for the chip.

For related content of this implementation, refer to related content of the foregoing method embodiments. Details are not described herein again.

A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of embodiments of this application.

This application further provides a computer-readable storage medium. The computer-readable storage medium stores a computer program. When the computer-readable storage medium is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-dense digital video disc (digital video disc, DVD)), a semiconductor medium (for example, a solid-state drive (solid-state drive, SSD)), or the like.

A person of ordinary skill in the art may understand that various numbers such as “first” and “second” in this application are merely used for differentiation for ease of description, and are not used to limit the scope of embodiments of this application, or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed on the foregoing tables. Names of the parameters shown in titles of the foregoing tables may also be other names that can be understood by a communication apparatus, and values or representation manners of the parameters may also be other values or representation manners that can be understood by the communication apparatus. During implementation of the foregoing tables, another data structure such as an array, a queue, a container, a stack, a linear table, a pointer, a linked list, a tree, a graph, a structure, a class, a pile, or a hash table may be used.

“Predefine” in this application may be understood as “define”, “predefine”, “store”, “pre-store”, “pre-negotiate”, “pre-configure”, “solidify”, or “pre-burn”.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, wherein the method comprises:

determining, by an access point, a trigger frame; and sending, by the access point, the trigger frame; wherein:

the trigger frame comprises a resource unit allocation subfield used to indicate a resource allocated to a station, the resource unit allocation subfield comprises a frequency band range indication and a resource unit indication, the resource unit indication is used to indicate a multi-resource unit (MRU) allocated to the station, and the frequency band range indication is used to indicate a frequency band range in which a smallest resource unit (RU) in the MRU corresponds to; and wherein the MRU indicated by the resource unit indication corresponds to one of the following:

the MRU comprises one 26-tone RU whose size is 26 subcarriers and one 52-tone RU whose size is 52 subcarriers, and the frequency band range indicated by the frequency band range indication is a frequency band range in which the 26-tone RU in the MRU corresponds to; or the MRU comprises one 106-tone RU whose size is 106 subcarriers and one 26-tone RU, and the frequency band range indicated by the frequency band range indication is a frequency band range in which the 26-tone RU in the MRU corresponds to; or the MRU comprises one 484-tone RU whose size is 484 subcarriers and one 242-tone RU whose size is 242 subcarriers, and the frequency band range indicated by the frequency band range indication is a frequency band range in which the 242-tone RU in the MRU corresponds to; or the MRU comprises one 996-tone RU whose size is 996 subcarriers and one 484-tone RU, and the frequency band range indicated by the frequency band range indication is a frequency band range in which the 484-tone RU in the MRU corresponds to; or the MRU comprises two 996-tone RUs and one 484-tone RU, and the frequency band range indicated by the frequency band range indication is a frequency band range in which the 484-tone RU in the MRU corresponds to; or the MRU comprises two 996-tone RUs, and the frequency band range indicated by the frequency band range indication is a frequency band range in which one of the 996-tone RUs in the MRU corresponds to; or the MRU comprises three 996-tone RUs and one 484-tone RU, and the frequency band range indicated by the frequency band range indication is a frequency band range in which the 484-tone RU in the MRU corresponds to; or the MRU comprises one 996-tone RU, one 484-tone RU, and one 242-tone RU, and the frequency band range indicated by the frequency band range indication is a frequency band range in which the 242-tone RU in the MRU corresponds to; or the MRU comprises two 996-tone RUs, and one 484-tone RU whose size is 484 subcarriers, and the frequency band range indicated by the frequency band range indication is a frequency band range in which the 484-tone RU in the MRU corresponds to.

2. The method according to claim 1, wherein:

the frequency band range indication is used to indicate an 80 MHz frequency band range in which the smallest RU in the MRU corresponds to.

3. The method according to claim 1, wherein:

the frequency band range indication is used to indicate a 160 MHz frequency band range in which the smallest RU in the MRU corresponds to.

4. The method according to claim 1, wherein the MRU indicated by the resource unit indication is a (2*996+484)-tone RU, and a 240 MHz frequency band in which the (2*996+484)-tone RU corresponds to spans from a first 80 MHz frequency band range to a third 80 MHz frequency band range in a 320 MHz frequency band range or from a second 80 MHz to a fourth 80 MHz in the 320 MHz frequency band range.

5. The method according to claim 1, wherein:

indexes of MRUs of a same size in ascending order correspond to start frequencies of the MRUs in ascending order.

6. The method according to claim 1, wherein:

indexes of MRUs of a same size in ascending order correspond to start frequencies of punctured RUs in a bandwidth in which the MRUs are located in ascending order.

7. The method according to claim 1, wherein the resource unit allocation subfield comprises 9 bits, the frequency band range indication comprises 2 bits, and the resource unit indication comprises 7 bits.

8. The method according to claim 1, wherein the resource unit indication comprises an index, wherein the index indicates a size of the MRU, or the index indicates a size of the MRU and a relative location of the MRU.

9. The method according to claim 1, wherein the resource unit indication comprises an index, and the index is one of multiple indexes in the following:

index "68," which indicates an MRU comprising two 484-tone RUs allocated to the station;

index "69," which indicates an MRU comprising four 996-tone RUs allocated to the station;

indexes "70-81," each of which indicates an MRU comprising one 52-tone RU and one 26-tone RU allocated to the station;

indexes "82-89," each of which indicates an MRU comprising one 106-tone RU and one 26-tone RU allocated to the station;

indexes "90-93," each of which indicates an MRU comprising one 484-tone RU and one 242-tone RU allocated to the station;

indexes "94-95," each of which indicates an MRU comprising one 996-tone RU and one 484-tone RU allocated to the station;

indexes "96-99," each of which indicates an MRU comprising one 996-tone RU, one 484-tone RU and one 242-tone RU allocated to the station;

indexes "96-99," each of which indicates an MRU comprising one 996-tone RU, one 484-tone RU and one 242-tone RU allocated to the station;

indexes "100-103," each of which indicates an MRU comprising two 996-tone RUs and one 484-tone RU allocated to the station;

index "104," which indicates an MRU comprising three 996-tone RUs allocated to the station;

indexes "105-106," each of which indicates an MRU comprising three 996-tone RUs and one 484-tone RU allocated to the station; and indexes "107-127," each of which is reserved.

10. The method according to claim 1, wherein the frequency band range indication and the resource unit indication are used to indicate a size and a location of the MRU.

11. A communication apparatus, comprising:

at least one processor and at least one memory, wherein the memory stores instructions or a computer program for execution by the at least one processor to cause the communication apparatus to perform operations comprising:

determining a trigger frame; and sending the trigger frame; wherein the trigger frame comprises a resource unit allocation subfield used to indicate a resource to a station, the resource unit allocation subfield comprises a frequency band range indication and a resource unit indication, the resource unit indication is used to indicate a multi-resource unit (MRU) allocated to the station, and the frequency band range indication is used to indicate a frequency band range in which a smallest resource unit (RU) in the MRU corresponds to; and wherein the MRU indicated by the resource unit indication corresponds to one of the following:

the MRU comprises one 26-tone RU whose size is 26 subcarriers and one 52-tone RU whose size is 52 subcarriers, and the frequency band range indicated by the frequency band range indication is a frequency band range in which the 26-tone RU in the MRU corresponds to; or the MRU comprises one 106-tone RU whose size is 106 subcarriers and one 26-tone RU, and the frequency band range indicated by the frequency band range indication is a frequency band range in which the 26-tone RU in the MRU corresponds to; or the MRU comprises one 484-tone RU whose size is 484 subcarriers and one 242-tone RU whose size is 242 subcarriers, and the frequency band range indicated by the frequency band range indication is a frequency band range in which the 242-tone RU in the MRU corresponds to; or the MRU comprises one 996-tone RU whose size is 996 subcarriers and one 484-tone RU, and the frequency band range indicated by the frequency band range indication is a frequency band range in which the 484-tone RU in the MRU corresponds to; or the MRU comprises two 996-tone RUs and one 484-tone RU, and the frequency band range indicated by the frequency band range indication is a frequency band range in which the 484-tone RU in the MRU corresponds to; or the MRU comprises two 996-tone RUs, and the frequency band range indicated by the frequency band range indication is a frequency band range in which one of the 996-tone RUs in the MRU corresponds to; or the MRU comprises three 996-tone RUs and one 484-tone RU, and the frequency band range indicated by the frequency band range indication is a frequency band range in which the 484-tone RU in the MRU corresponds to; or the MRU comprises one 996-tone RU, one 484-tone RU, and one 242-tone RU, and the frequency band range indicated by the frequency band range indication is a frequency band range in which the 242-tone RU in the MRU corresponds to; or the MRU comprises two 996-tone RUs, and one 484-tone RU whose size is 484 subcarriers, and the frequency band range indicated by the frequency band range indication is a frequency band range in which the 484-tone RU in the MRU corresponds to.

12. The communication apparatus according to claim 11, wherein:

the frequency band range indication is used to indicate an 80 MHz frequency band range in which the smallest RU in the MRU corresponds to.

13. The communication apparatus according to claim 11, wherein:

the frequency band range indication is used to indicate a 160 MHz frequency band range in which the smallest RU in the MRU corresponds to.

14. The communication apparatus according to claim 11, wherein the MRU indicated by the resource unit indication is a (2*996+484)-tone RU, and a 240 MHz frequency band range in which the (2*996+484)-tone RU corresponds to spans from a first 80 MHz frequency band range to a third 80 MHz frequency band range in a 320 MHz frequency band range or from a second 80 MHz frequency band range to a fourth 80 MHz in the 320 MHz frequency band range.

15. The communication apparatus according to claim 11, wherein the resource unit allocation subfield comprises 9 bits, the frequency band range indication comprises 2 bits, and the resource unit indication comprises 7 bits.

16. The communication apparatus according to claim 11, wherein the resource unit indication comprises an index, and the index is one of multiple indexes in the following:

index “68,” which indicates an MRU comprising two 484-tone RUs allocated to the communication apparatus;

index “69,” which indicates an MRU comprising four 996-tone RUs allocated to the communication apparatus;

indexes “70-81,” each of which indicates an MRU comprising one 52-tone RU and one 26-tone RU allocated to the communication apparatus;

indexes “82-89,” each of which indicates an MRU comprising one 106-tone RU and one 26-tone RU allocated to the communication apparatus;

indexes “90-93,” each of which indicates an MRU comprising one 484-tone RU and one 242-tone RU allocated to the communication apparatus;

indexes “94-95,” each of which indicates an MRU comprising one 996-tone RU and one 484-tone RU allocated to the communication apparatus;

indexes “96-99,” each of which indicates an MRU comprising one 996-tone RU, one 484-tone RU and one 242-tone RU allocated to the communication apparatus;

indexes “96-99,” each of which indicates an MRU comprising one 996-tone RU, one 484-tone RU and one 242-tone RU allocated to the communication apparatus;

indexes “100-103,” each of which indicates an MRU comprising two 996-tone RUs and one 484-tone RU allocated to the communication apparatus;

index “104,” which indicates an MRU comprising three 996-tone RUs allocated to the communication apparatus;

indexes “105-106,” each of which indicates an MRU comprising three 996-tone RUs and one 484-tone RU allocated to the communication apparatus; and indexes “107-127,” each of which is reserved.

17. A chip, comprising at least one processor and an interface, wherein the interface is configured to obtain a computer program, and the at least one processor is configured to invoke the computer program to perform operations comprising:

determining a trigger frame; and sending the trigger frame; wherein:

the trigger frame comprises a resource unit allocation subfield used to indicate a resource allocated to a station, the resource unit allocation subfield comprises a frequency band range indication and a resource unit indication, the resource unit indication is used to indicate a multi-resource unit (MRU) allocated to the station, and the frequency band range indication is used to indicate a frequency band range in which a smallest resource unit (RU) in the MRU corresponds to; and wherein the MRU indicated by the resource unit indication corresponds to one of the following:

the MRU comprises one 26-tone RU whose size is 26 subcarriers and one 52-tone RU whose size is 52 subcarriers, and the frequency band range indicated by the frequency band range indication is a frequency band range in which the 26-tone RU in the MRU corresponds to; or the MRU comprises one 106-tone RU whose size is 106 subcarriers and one 26-tone RU, and the frequency band range indicated by the frequency band range indication is a frequency band range in which the 26-tone RU in the MRU corresponds to; or the MRU comprises one 484-tone RU whose size is 484 subcarriers and one 242-tone RU whose size is 242 subcarriers, and the frequency band range indicated by the frequency band range indication is a frequency band range in which the 242-tone RU in the MRU corresponds to; or the MRU comprises one 996-tone RU whose size is 996 subcarriers and one 484-tone RU, and the frequency band range indicated by the frequency band range indication is a frequency band range in which the 484-tone RU in the MRU corresponds to; or the MRU comprises two 996-tone RUs and one 484-tone RU, and the frequency band range indicated by the frequency band range indication is a frequency band range in which the 484-tone RU in the MRU corresponds to; or the MRU comprises two 996-tone RUs, and the frequency band range indicated by the frequency band range indication is a frequency band range in which one of the 996-tone RUs in the MRU corresponds to; or the MRU comprises three 996-tone RUs and one 484-tone RU, and the frequency band range indicated by the frequency band range indication is a frequency band range in which the 484-tone RU in the MRU corresponds to; or the MRU comprises one 996-tone RU, one 484-tone RU, and one 242-tone RU, and the frequency band range indicated by the frequency band range indication is a frequency band range in which the 242-tone RU in the MRU corresponds to; or the MRU comprises two 996-tone RUs, and one 484-tone RU whose size is 484 subcarriers, and the frequency band range indicated by the frequency band range indication is a frequency band range in which the 484-tone RU in the MRU corresponds to.

18. The chip according to claim 17, wherein:

the frequency band range indication is used to indicate an 80 MHz frequency band range in which the smallest RU in the MRU corresponds to.

19. The chip according to claim 17, wherein:

the frequency band range indication is used to indicate a 160 MHz frequency band range in which the smallest RU in the MRU corresponds to.

20. The chip according to claim 17, wherein the resource unit allocation subfield comprises 9 bits, the frequency band range indication comprises 2 bits, and the resource unit indication comprises 7 bits.

* * * * *